(12) United States Patent
Pariseau et al.

(10) Patent No.: US 12,055,474 B2
(45) Date of Patent: Aug. 6, 2024

(54) MODULAR OPTICAL PARTICLE COUNTER SENSOR AND APPARATUS

(71) Applicant: Particles Plus, Inc., Stoughton, MA (US)

(72) Inventors: David Pariseau, Los Altos, CA (US); Adam Giandomenico, Walpole, MA (US)

(73) Assignee: Particles Plus, Inc., Stoughton, MA (US)

( * ) Notice: Subject to any disclaimer, the term of this patent is extended or adjusted under 35 U.S.C. 154(b) by 17 days.

(21) Appl. No.: 18/013,990

(22) PCT Filed: Jul. 1, 2021

(86) PCT No.: PCT/US2021/040194
§ 371 (c)(1),
(2) Date: Dec. 30, 2022

(87) PCT Pub. No.: WO2022/006464
PCT Pub. Date: Jan. 6, 2022

(65) Prior Publication Data
US 2023/0304914 A1  Sep. 28, 2023

Related U.S. Application Data

(60) Provisional application No. 63/061,761, filed on Aug. 5, 2020, provisional application No. 63/047,230, filed on Jul. 1, 2020.

(51) Int. Cl.
*G01N 15/00* (2024.01)
*G01N 15/1404* (2024.01)
(Continued)

(52) U.S. Cl.
CPC ..... *G01N 15/1429* (2013.01); *G01N 15/1404* (2013.01); *G01N 2015/1402* (2013.01); *G01N 2015/1486* (2013.01)

(58) Field of Classification Search
CPC ........ G01N 15/00; G01N 15/14; G01N 21/00; G01N 15/1429; G01N 15/1404;
(Continued)

(56) References Cited

U.S. PATENT DOCUMENTS 3,361,030 A  1/1968  Goldberg
3,696,399 A  10/1972 Klein et al.
(Continued)

FOREIGN PATENT DOCUMENTS

CN  100478670 C  4/2009
CN  202720173 U  2/2013
(Continued)

OTHER PUBLICATIONS

Dylos Corporation, DC1100-PRO Air Quality Monitor, User Manual. 19 pages, (2008).
(Continued)

*Primary Examiner* — Abdullahi Nur
(74) *Attorney, Agent, or Firm* — McCarter & English, LLP

(57) ABSTRACT

A modular optical particle counter sensor and apparatus are described that consolidates counting functionality on a single main counter board and has expandable functionality through connections to plug-in system boards. The modular optical particle sensor may be directly connected to a manifold with an integrated Venturi for better controlling the flow rate of the air stream passing through the apparatus for sampling.

29 Claims, 34 Drawing Sheets

US 12,055,474 B2

Page 2

(51) Int. Cl.
*G01N 15/1429* (2024.01)
*G01N 15/14* (2006.01)

(58) Field of Classification Search
CPC ... G01N 2015/1402; G01N 2015/1486; G01N 15/0205; G01N 15/06; G01N 2015/0046; G01N 2015/0693; G01N 15/1012; G01N 2015/1493; G01N 15/1459; G01N 15/1431
See application file for complete search history.

(56) References Cited

U.S. PATENT DOCUMENTS

| | | | |
|---|---|---|---|
| 3,710,933 A | 1/1973 | Fulwyler et al. | |
| 3,919,050 A | 11/1975 | Curby | |
| 3,941,982 A | 3/1976 | Knollenberg et al. | |
| 4,011,459 A | 3/1977 | Knollenberg et al. | |
| 4,153,541 A | 5/1979 | Rumpf et al. | |
| 4,232,967 A | 11/1980 | Grachev et al. | |
| 4,276,472 A | 6/1981 | Costantino et al. | |
| 4,361,403 A | 11/1982 | Loos | |
| 4,383,917 A | 5/1983 | Wells | |
| 4,506,678 A | 3/1985 | Russell et al. | |
| 4,571,079 A | 2/1986 | Knollenberg | |
| 4,594,715 A | 6/1986 | Knollenberg | |
| 4,607,228 A | 8/1986 | Reif | |
| 4,636,075 A | 1/1987 | Knollenberg | |
| 4,728,190 A | 3/1988 | Knollenberg | |
| 4,740,988 A | 4/1988 | Knollenberg et al. | |
| 4,798,465 A | 1/1989 | Knollenberg | |
| 4,832,011 A | 5/1989 | Busch | |
| 4,872,972 A | 10/1989 | Wakabayashi et al. | |
| 4,893,928 A | 1/1990 | Knollenberg | |
| 4,893,932 A | 1/1990 | Knollenberg | |
| 4,928,153 A | 5/1990 | Glass | |
| 4,984,889 A | 1/1991 | Sommer | |
| 4,999,498 A | 3/1991 | Hunt et al. | |
| 5,000,052 A | 3/1991 | Sipin | |
| 5,001,463 A | 3/1991 | Hamburger | |
| 5,059,395 A | 10/1991 | Brittenham et al. | |
| 5,093,571 A | 3/1992 | Inomata et al. | |
| 5,096,474 A | 3/1992 | Miller, Jr. et al. | |
| 5,235,625 A | 8/1993 | Stolz et al. | |
| 5,257,087 A | 10/1993 | Furuya | |
| 5,269,659 A | 12/1993 | Hampton et al. | |
| 5,282,151 A | 1/1994 | Knollenberg | |
| 5,317,930 A | 6/1994 | Wedding | |
| 5,410,403 A | 4/1995 | Wells | |
| 5,426,501 A | 6/1995 | Hokanson et al. | |
| 5,428,964 A | 7/1995 | Lobdell | |
| 5,467,189 A | 11/1995 | Kreikbaum et al. | |
| 5,493,123 A | 2/1996 | Knollenberg et al. | |
| 5,498,273 A | 3/1996 | Mann | |
| 5,515,164 A | 5/1996 | Kreikbaum et al. | |
| 5,553,507 A | 9/1996 | Basch et al. | |
| 5,553,795 A | 9/1996 | Tsai et al. | |
| 5,600,438 A | 2/1997 | Kreikbaum et al. | |
| 5,671,046 A | 9/1997 | Knowlton | |
| 5,751,422 A | 5/1998 | Mitchell | |
| 5,805,281 A | 9/1998 | Knowlton | |
| 5,825,487 A | 10/1998 | Felbinger et al. | |
| 5,861,950 A | 1/1999 | Knowlton | |
| 5,903,338 A | 5/1999 | Mavliev et al. | |
| 5,946,091 A | 8/1999 | Yufa | |
| 5,961,291 A | 10/1999 | Sakagami et al. | |
| 6,016,194 A | 1/2000 | Girvin et al. | |
| 6,031,610 A | 2/2000 | Adams | |
| 6,035,551 A | 3/2000 | Scheufler et al. | |
| 6,061,132 A | 5/2000 | Girvin et al. | |
| 6,091,502 A | 7/2000 | Weigl et al. | |
| 6,111,642 A * | 8/2000 | DeFreez | G01N 15/0211 356/337 |
| 6,137,572 A | 10/2000 | DeFreez et al. | |
| 6,167,107 A | 12/2000 | Bates | |
| 6,246,474 B1 | 6/2001 | Cerni et al. | |
| 6,275,290 B1 | 8/2001 | Cerni et al. | |
| 6,284,025 B1 | 9/2001 | Kreisberg et al. | |
| 6,327,918 B1 | 12/2001 | Lawless | |
| 6,386,015 B1 | 5/2002 | Rader et al. | |
| 6,398,118 B1 | 6/2002 | Rosen et al. | |
| 6,508,631 B1 | 1/2003 | Smith et al. | |
| 6,592,822 B1 | 7/2003 | Chandler | |
| 6,615,679 B1 | 9/2003 | Knollenberg et al. | |
| 6,705,844 B2 | 3/2004 | Englander | |
| 6,709,311 B2 | 3/2004 | Cerni | |
| 6,788,152 B2 | 9/2004 | Nishizono | |
| 6,859,277 B2 | 2/2005 | Wagner et al. | |
| 6,900,439 B2 | 5/2005 | Komiyama et al. | |
| 6,903,818 B2 | 6/2005 | Cerni et al. | |
| 6,945,090 B2 | 9/2005 | Rodier | |
| 6,988,671 B2 | 1/2006 | DeLuca | |
| 7,011,491 B2 | 3/2006 | Englander | |
| 7,030,980 B1 | 4/2006 | Sehler et al. | |
| 7,058,477 B1 | 6/2006 | Rosen | |
| 7,088,446 B2 | 8/2006 | Cerni | |
| 7,088,447 B1 | 8/2006 | Bates et al. | |
| 7,150,408 B2 | 12/2006 | DeLuca | |
| 7,208,123 B2 | 4/2007 | Knollenberg et al. | |
| 7,235,214 B2 | 6/2007 | Rodier et al. | |
| RE39,783 E | 8/2007 | Cerni et al. | |
| 7,343,751 B2 | 3/2008 | Kates | |
| 7,439,855 B1 | 10/2008 | Yufa | |
| 7,456,960 B2 | 11/2008 | Cerni et al. | |
| 7,457,709 B2 | 11/2008 | Zhang et al. | |
| 7,473,216 B2 | 1/2009 | Lolachi et al. | |
| 7,521,682 B1 | 4/2009 | Holland et al. | |
| 7,576,857 B2 | 8/2009 | Wagner | |
| 7,598,878 B2 | 10/2009 | Goldreich | |
| 7,604,676 B2 | 10/2009 | Braziunas | |
| 7,616,126 B2 | 11/2009 | Kadwell et al. | |
| 7,667,839 B2 | 2/2010 | Bates | |
| 7,724,150 B2 | 5/2010 | Chandler et al. | |
| 7,724,368 B2 * | 5/2010 | Ahn | G01N 15/065 356/336 |
| 7,796,255 B2 | 9/2010 | Miller | |
| 7,799,567 B1 | 9/2010 | Call | |
| 7,831,801 B1 | 11/2010 | Anderson | |
| 7,867,779 B2 | 1/2011 | McDermott et al. | |
| 7,895,000 B2 | 2/2011 | Chandler et al. | |
| 7,916,293 B2 | 3/2011 | Mitchell et al. | |
| 7,932,490 B2 | 4/2011 | Wang et al. | |
| 7,973,929 B2 | 7/2011 | Bates | |
| 7,985,949 B2 | 7/2011 | Rodier | |
| 8,009,290 B2 | 8/2011 | Unger | |
| 8,027,035 B2 | 9/2011 | Mitchell et al. | |
| 8,047,055 B2 | 11/2011 | Wang et al. | |
| 8,146,376 B1 | 4/2012 | Williams et al. | |
| 8,154,724 B2 | 4/2012 | Mitchell et al. | |
| 8,174,697 B2 | 5/2012 | Mitchell et al. | |
| 8,219,249 B2 | 7/2012 | Harrod et al. | |
| 8,415,635 B2 | 4/2013 | Marks et al. | |
| 8,424,397 B2 | 4/2013 | Fjerdingstad | |
| 8,427,642 B2 | 4/2013 | Mitchell et al. | |
| 8,534,116 B2 | 9/2013 | Wang et al. | |
| 8,708,708 B1 | 4/2014 | Carideo et al. | |
| 8,800,383 B2 | 8/2014 | Bates | |
| 9,070,272 B2 | 6/2015 | Gettings et al. | |
| 9,116,121 B2 | 8/2015 | Kaye et al. | |
| 9,140,638 B2 | 9/2015 | Pariseau et al. | |
| 9,140,639 B2 | 9/2015 | Pariseau | |
| 9,141,094 B2 | 9/2015 | Pariseau et al. | |
| 9,157,847 B2 | 10/2015 | Pariseau et al. | |
| 9,158,652 B2 | 10/2015 | Pariseau | |
| 9,170,180 B2 | 10/2015 | Shinohara et al. | |
| 9,261,287 B2 | 2/2016 | Warren et al. | |
| 9,335,244 B2 | 5/2016 | Han | |
| 9,470,627 B2 | 10/2016 | Alexander et al. | |
| 9,541,475 B2 | 1/2017 | Chu et al. | |
| 9,677,990 B2 | 6/2017 | Pariseau et al. | |
| 9,726,579 B2 | 8/2017 | Han et al. | |
| 10,041,862 B2 | 8/2018 | Han et al. | |
| 10,054,534 B1 | 8/2018 | Nourbakhsh et al. | |
| 10,229,563 B2 | 3/2019 | Salton et al. | |
| 10,352,844 B2 | 7/2019 | Pariseau | |

(56) References Cited

U.S. PATENT DOCUMENTS

| | | |
|---|---|---|
| 10,365,197 B2 | 7/2019 | Jongerius et al. |
| 10,718,703 B2 | 7/2020 | Pariseau et al. |
| 10,983,040 B2 | 4/2021 | Pariseau |
| 11,169,077 B2 | 11/2021 | Pariseau et al. |
| 11,519,842 B2 | 12/2022 | Pariseau |
| 11,579,072 B2 | 2/2023 | Pariseau et al. |
| 2002/0083780 A1 | 7/2002 | Lutz et al. |
| 2002/0135764 A1 | 9/2002 | Oka et al. |
| 2003/0009334 A1 | 1/2003 | Printz et al. |
| 2003/0051023 A1 | 3/2003 | Reichel et al. |
| 2003/0078751 A1 | 4/2003 | Juhasz |
| 2003/0105546 A1 | 6/2003 | Robinson et al. |
| 2004/0068359 A1 | 4/2004 | Neiss et al. |
| 2004/0068389 A1 | 4/2004 | Kleefstra |
| 2004/0222307 A1 | 11/2004 | DeLuca |
| 2004/0260702 A1 | 12/2004 | Cragun et al. |
| 2005/0028593 A1 | 2/2005 | Rodier |
| 2005/0043926 A1 | 2/2005 | Hayzen et al. |
| 2005/0100181 A1 | 5/2005 | Croft et al. |
| 2005/0161517 A1 | 7/2005 | Helt et al. |
| 2005/0270151 A1 | 12/2005 | Winick |
| 2006/0038998 A1 | 2/2006 | Wagner |
| 2006/0049815 A1 | 3/2006 | Ho et al. |
| 2006/0071803 A1 | 4/2006 | Hamburger et al. |
| 2006/0234621 A1 | 10/2006 | Desrochers et al. |
| 2007/0048863 A1 | 3/2007 | Rodgers et al. |
| 2007/0092976 A1 | 4/2007 | Watson et al. |
| 2007/0147702 A1 | 6/2007 | Scoullar et al. |
| 2007/0159156 A1 | 7/2007 | Hu et al. |
| 2007/0178529 A1 | 8/2007 | Breidford et al. |
| 2007/0229825 A1 | 10/2007 | Bates |
| 2008/0057931 A1 | 3/2008 | Nass et al. |
| 2008/0146890 A1* | 6/2008 | LeBoeuf ............... A61B 7/003 600/300 |
| 2008/0182506 A1 | 7/2008 | Jackson et al. |
| 2008/0215345 A1 | 9/2008 | Hollingsworth et al. |
| 2008/0221812 A1 | 9/2008 | Pittaro et al. |
| 2008/0246963 A1 | 10/2008 | Nakajima |
| 2009/0050538 A1 | 2/2009 | Lean et al. |
| 2009/0128810 A1 | 5/2009 | Bates |
| 2009/0190128 A1 | 7/2009 | Cerni et al. |
| 2009/0237659 A1 | 9/2009 | Miers |
| 2009/0242799 A1 | 10/2009 | Bolotin et al. |
| 2009/0259709 A1 | 10/2009 | Nikitin |
| 2009/0268202 A1 | 10/2009 | Wagner |
| 2009/0283456 A1 | 11/2009 | Le Vot et al. |
| 2010/0212670 A1 | 8/2010 | Amighi et al. |
| 2010/0225913 A1 | 9/2010 | Trainer |
| 2010/0253509 A1 | 10/2010 | Fu et al. |
| 2010/0264301 A1 | 10/2010 | Borosak |
| 2010/0282260 A1 | 11/2010 | Sung |
| 2011/0175661 A1 | 7/2011 | Quesada et al. |
| 2011/0277679 A1 | 11/2011 | Good et al. |
| 2011/0303859 A1 | 12/2011 | Lofstrom et al. |
| 2012/0012744 A1 | 1/2012 | Wang et al. |
| 2012/0085831 A1 | 4/2012 | Kopp |
| 2012/0140231 A1 | 6/2012 | Knox et al. |
| 2012/0295301 A1 | 11/2012 | Miyashita et al. |
| 2013/0040857 A1 | 2/2013 | Anderson |
| 2013/0166251 A1 | 6/2013 | Latimer et al. |
| 2013/0270287 A1 | 10/2013 | Guo et al. |
| 2013/0286392 A1 | 10/2013 | Erdtmann |
| 2013/0295588 A1 | 11/2013 | Watkins et al. |
| 2014/0022547 A1 | 1/2014 | Knox et al. |
| 2014/0053586 A1 | 2/2014 | Poecher et al. |
| 2014/0134608 A1 | 5/2014 | Hanashi et al. |
| 2014/0281659 A1 | 9/2014 | Pariseau |
| 2014/0354976 A1 | 12/2014 | Evenstad et al. |
| 2015/0063982 A1 | 3/2015 | Pariseau et al. |
| 2015/0200083 A1 | 7/2015 | Brown et al. |
| 2015/0316463 A1 | 11/2015 | Pariseau et al. |
| 2015/0323941 A1 | 11/2015 | Pariseau et al. |
| 2016/0000358 A1 | 1/2016 | Lundin et al. |
| 2016/0067531 A1 | 3/2016 | Pariseau et al. |
| 2017/0241893 A1 | 8/2017 | Walls et al. |
| 2017/0336312 A1 | 11/2017 | Stoeber et al. |
| 2019/0195765 A1 | 6/2019 | Chen et al. |
| 2019/0301998 A1 | 10/2019 | Pariseau |
| 2020/0011779 A1 | 1/2020 | Lavrovsky et al. |
| 2020/0371015 A1 | 11/2020 | Pariseau et al. |
| 2020/0378940 A1 | 12/2020 | Pariseau |
| 2021/0025805 A1 | 1/2021 | Pariseau et al. |
| 2021/0025806 A1 | 1/2021 | Pariseau et al. |
| 2021/0025807 A1 | 1/2021 | Pariseau et al. |
| 2021/0063299 A1 | 3/2021 | Pariseau et al. |
| 2021/0088437 A1 | 3/2021 | Pariseau et al. |
| 2022/0003654 A1 | 1/2022 | Pariseau et al. |
| 2022/0042899 A1 | 2/2022 | Pariseau |

FOREIGN PATENT DOCUMENTS

| | | |
|---|---|---|
| EP | 2145171 B1 | 12/2018 |
| GB | 674265 A | 6/1952 |
| GB | 2233462 A | 1/1991 |
| GB | 2420616 A | 5/2006 |
| GB | 2474235 A | 4/2011 |
| JP | 56-39420 A | 4/1981 |
| JP | 3-296622 A | 12/1991 |
| JP | 2001-281128 A | 10/2001 |
| JP | 5005704 B2 | 8/2012 |
| WO | 1994/29716 A1 | 12/1994 |
| WO | 1998/56426 A1 | 12/1998 |
| WO | 1999/22219 A1 | 5/1999 |
| WO | 1999/56106 A1 | 11/1999 |
| WO | 2001/06333 A2 | 1/2001 |
| WO | 2001/63250 A1 | 8/2001 |
| WO | 2002/063294 A2 | 8/2002 |
| WO | 2004/010113 A1 | 1/2004 |
| WO | 2007/076188 A2 | 7/2007 |
| WO | 2007/126681 A1 | 11/2007 |
| WO | 2008/140816 A1 | 11/2008 |
| WO | 2009/073649 A1 | 6/2009 |
| WO | 2009/073652 A1 | 6/2009 |
| WO | 2011/025763 A1 | 3/2011 |
| WO | 2012/055048 A1 | 5/2012 |
| WO | 2012/064878 A2 | 5/2012 |
| WO | 2013/017832 A1 | 2/2013 |
| WO | 2014/043413 A1 | 3/2014 |
| WO | 2016/065465 A1 | 5/2016 |
| WO | 2017/054098 A1 | 4/2017 |

OTHER PUBLICATIONS

Dylos Corporation, DC1700 Air Quality Monitor, User Manual. 27 pages, (2010).

Erickson et al., Design of a Small, Battery-Operated Nanoparticle Sizer. NSTI-Nanotech. 2012;1:34-37.

Hal Technology, HAL-HPC301, Handheld Particle Counter, Operational Manual. 33 pages, (2016).

Hal Technology, HAL-HPC600 Handheld Particle Counter, Operational Manual. 30 pages, (2008).

Hal Technology, Six-Channel Hybrid Handheld Particle Counter. 2 pages.

SAS, Sentry Air Systems, Inc., Portable Particle Counter, Model #PPC-1. 1 page.

U.S. Appl. No. 14/214,899, filed Mar. 15, 2014, U.S. Pat. No. 10,983,040, Issued.

U.S. Appl. No. 17/233,204, filed Apr. 16, 2021, 2022-0042899, Published.

U.S. Appl. No. 14/214,876, filed Mar. 15, 2014, U.S. Pat. No. 10,352,844, Issued.

U.S. Appl. No. 16/443,508, filed Jun. 17, 2019, U.S. Pat. No. 11,519,842, Issued.

U.S. Appl. No. 16/537,492, filed Aug. 9, 2019, U.S. Pat. No. 11,169,077, Issued.

U.S. Appl. No. 17/512,406, filed Oct. 27, 2021, U.S. Pat. No. 11,579,072, Issued.

U.S. Appl. No. 18/102,208, filed Jan. 27, 2023, 2023-0400403, Allowed.

U.S. Appl. No. 14/701,485, filed Apr. 30, 2015, U.S. Pat. No. 9,677,990, Issued.

(56) References Cited

OTHER PUBLICATIONS

U.S. Appl. No. 15/620,781, filed Jun. 12, 2017, U.S. Pat. No. 10,718,703, Issued.
U.S. Appl. No. 16/917,830, filed Jun. 30, 2020, U.S. Pat. No. 11,846,581, Issued.
U.S. Appl. No. 16/900,787, filed Jun. 12, 2020, U.S. Pat. No. 11,841,313, Issued.
U.S. Appl. No. 16/894,666, filed Jun. 5, 2020, 2021-0063299, Published.
U.S. Appl. No. 16/933,967, filed Jul. 20, 2020, 2021-0088437, Published.
U.S. Appl. No. 16/896,112, filed Jun. 8, 2020, U.S. Pat. No. 11,835,443, Issued.
U.S. Appl. No. 16/901,939, filed Jul. 15, 2020, 2020-0371015, Published.
U.S. Appl. No. 17/139,625, filed Dec. 31, 2020, 2022-0003654, Allowed.
Alphasense Ltd., Alphasense User Manual OPC-N2 Optical Particle Counter. www.alphasense.com. 072-0300, Issue 3, 15 pages, Apr. 2015.
Bauer et al., Monitoring personal fine particle exposure with a particle counter. J Expo Anal Environ Epidemiol. May-Jun. 1999;9(3):228-36.
Bell et al., Reassessment of the lethal London fog of 1952: novel indicators of acute and chronic consequences of acute exposure to air pollution. Environ Health Perspect. Jun. 2001;109(Suppl 3):389-94.
Chua et al., Electrical Mobility Separation of Airborne Particles Using Integrated Microfabricated Corona ionizer and Separator Electrodes. Journal of Microelectromechanical Systems. Feb. 2009;18(1):4-13.
Chung et al., Comparison of real-time instruments used to monitor airborne particulate matter. J Air Waste Manag Assoc. Jan. 2001;51(1):109-20.
Dylos Corporation, DC1100 Air Quality Monitor. User Manual. 19 pages, (2008).
Esmen et al., Theoretical Investigation of the Interrelationship Between Stationary and Personal Sampling in Exposure Estimation. Applied Occupational and Environmental Hygiene. Nov. 30, 2010;15(1):114-119.
Fluke, 985, Airborne Particle Counter, Users Manual, 32 pages, Mar. 2012.
Freescale Semiconductor, Inc., Data Sheet: Technical Data: High Temperature Accuracy Integrated Silicon Pressure Sensor for Measuring Absolute Pressure, On-Chip Signal Conditioned, Temperature Compensated and Calibrated. Document No. MP3H6115A, Rev 5.1, 13 pages, May 2012.
Freescale Semiconductor, Inc., Integrated Silicon Pressure Sensor On-Chip Conditioned Temperature Compensated and Calibrated. MPXV5004G, Rev 12, 22 pages, Sep. 2009.
Giorio et al., Field comparison of a personal cascade impactor sampler, an optical particle counter and CEN-EU standard methods for PM10, PM2.5 and PM1 measurement in urban environment. Journal of Aerosol Science. 2013;65:111-120.
Golczewski et al., Performance Modelling and Response of the Dual-wavelength Optical Particle Spectrometer (DWOPS). Abstracts of the European Aerosol Conference. 2004, pp. S839-S840.
Hach, Met One 7000: 7005, 7015, Doc026.53.80360, Edition 1. User Manual. 32 pages, Jul. 2013.
Howard-Reed et al., Use of a continuous nephelometer to measure personal exposure to particles during the U.S. Environmental Protection Agency Baltimore and Fresno Panel studies. J Air Waste Manag Assoc. Jul. 2000;50(7):1125-32.
Li et al., On the Feasibility of a Number Concentration Calibration Using a Wafer Surface Scanner. Aerosol Science and Technology. 2014;48:747-57.
Particles Plus, 8306 Handheld Airborne Particle Counter. Retrieved online at: https://www.emlab.com/m/store/Particles%20Plus%208306Handheld%20Particle%20Counter%20Spec%20Sheet.pdf. 2 pages, (2019).
Pope et al., Lung cancer, cardiopulmonary mortality, and long-term exposure to fine particulate air pollution. JAMA. Mar. 6, 2002;287(9):1132-41.
RTI International, MicroPEM™—PM2.5 Personal Exposure Monitor. www.rti.org, 2 pages.
Schaap et al., Continuous Size-Separation of Airborne Particles in a Microchannel for Aerosol Monitoring. IEEE Sensors Journal. Nov. 2011;11(11):2790-7.
Schaap et al., Transport of airborne particles in straight and curved microchannels. Physics of Fluids. 2012;24(8):083301, 14 pages.
Sharp, GP2Y1010AU0F, Compact Optical Dust Sensor. Sharp Corporation. Data Sheet, 9 pages, Dec. 1, 2006.
Thermo Electron Corporation, Models: PDR-1000AN & PDR-1200S, Personal Dataram Particulate Monitoring, Instruction Manual. www.thermo.com/ih. 54 pages, Jan. 2004.
Thermo Scientific, MIE pDR-1500. Instruction Manual, Active Personal Particulate Monitor, Part No. 105983-00. Thermo Fisher Scientific, Inc. 112 pages, Jan. 31, 2014.
Thermo Scientific, Model pDR-AN/1200, personalDATARAM Instruction Manual. Particulate Monitor, Part No. 100181-00. Thermo Fisher Scientific, Inc. 56 pages, May 15, 2013.
TSI Incorporated, TSI Aerotrak Portable Particle Counter Model 9110, Application Note CC-107. Retrieved online at: https://www.tsi.com/getmedia/f7a6a0a2-cb7d-4c25-9674-b920b77d5835/AeroTrak_Portable_Particle_Counter_9110_A4_CC-107?ext=.pdf. 9 pages, (2013).
TSI, Aerosol Instrument Manager Software for Scanner Mobility Particle Sizer (SMPS) Spectrometer. User's Manual. P/N 1930038, Revision H. 119 pages, Apr. 2010.
TSI, AeroTrak Handheld Airborne Particle Counter, Model 9306, Operation Manual. P/N 6004215, Revision C. 81 pages, Feb. 2011.
TSI, AeroTrak Portable Airborne Particle Counter, Model 9110, Operation Manual, P/N 6004345, Revision A. 93 pages, Jul. 2010.
TSI, Model 3330 Optical Particle Sizer Spectrometer, Operation and Service Manual. P/N 6004403, Revision C. 114 pages, Jan. 2011.
TSI, Optical Particle Sizer, Model 3330, Specifications. 4 pages, (2010).
TSI, Sidepak™ Personal Aerosol Monitor, Model AM510, User Guide. TSI Incorporated, 74 pages, (2012).
Walton et al., Aerosol Instrumentation in Occupational Hygiene: An Historical Perspective. Aerosol Science and Technology. 1998;28(5):417-38.
Wikipedia, peer-to peer. Retrieved online at: https://web.archive.org/web/20161228184346/https://en.wikipedia.org/wiki/Peer-to-peer. 9 pages, Dec. 4, 2016.
International Search Report and Written Opinion for Application No. PCT/US2021/040194, dated Oct. 20, 2021, 15 pages.

\* cited by examiner

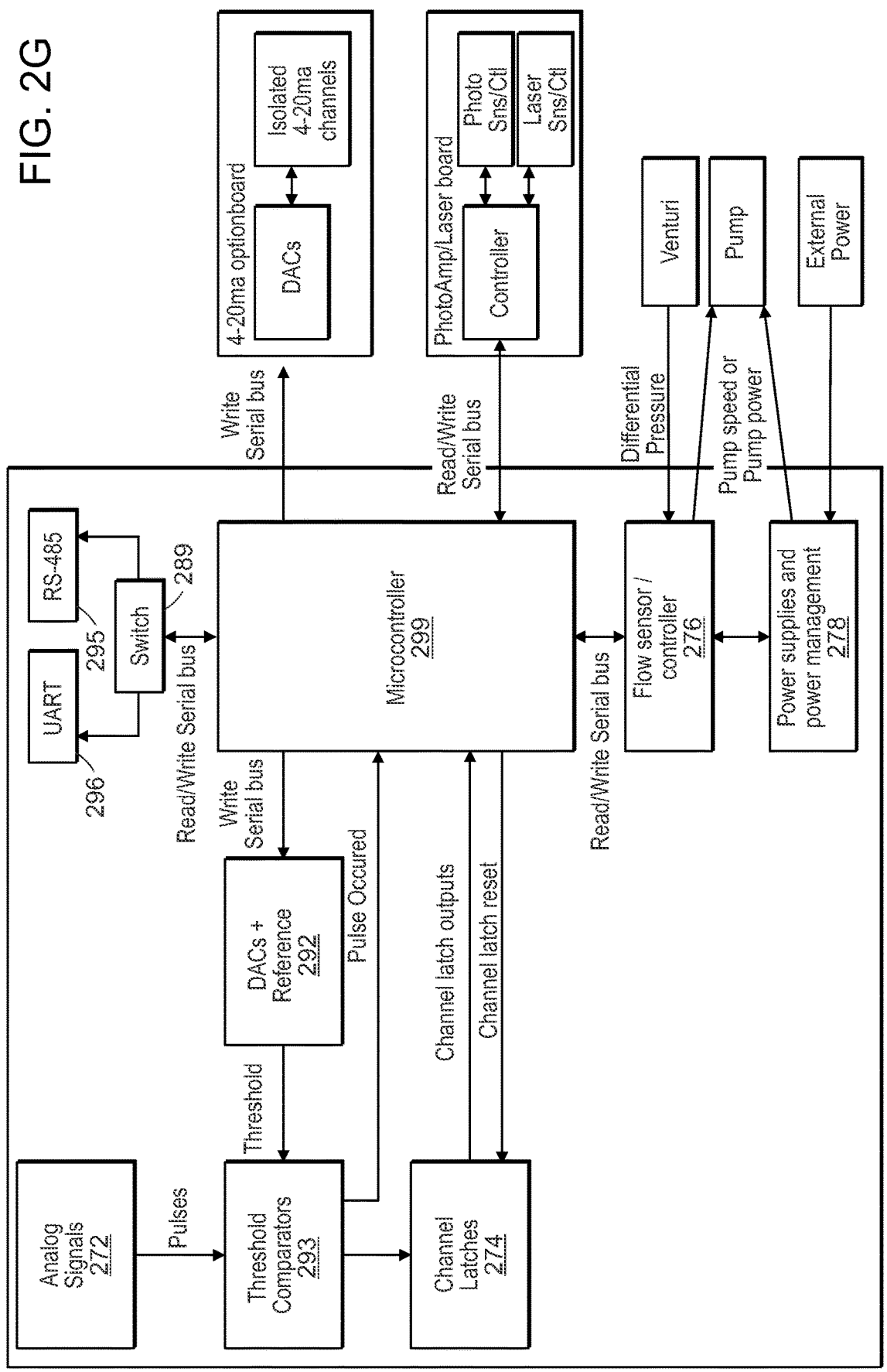

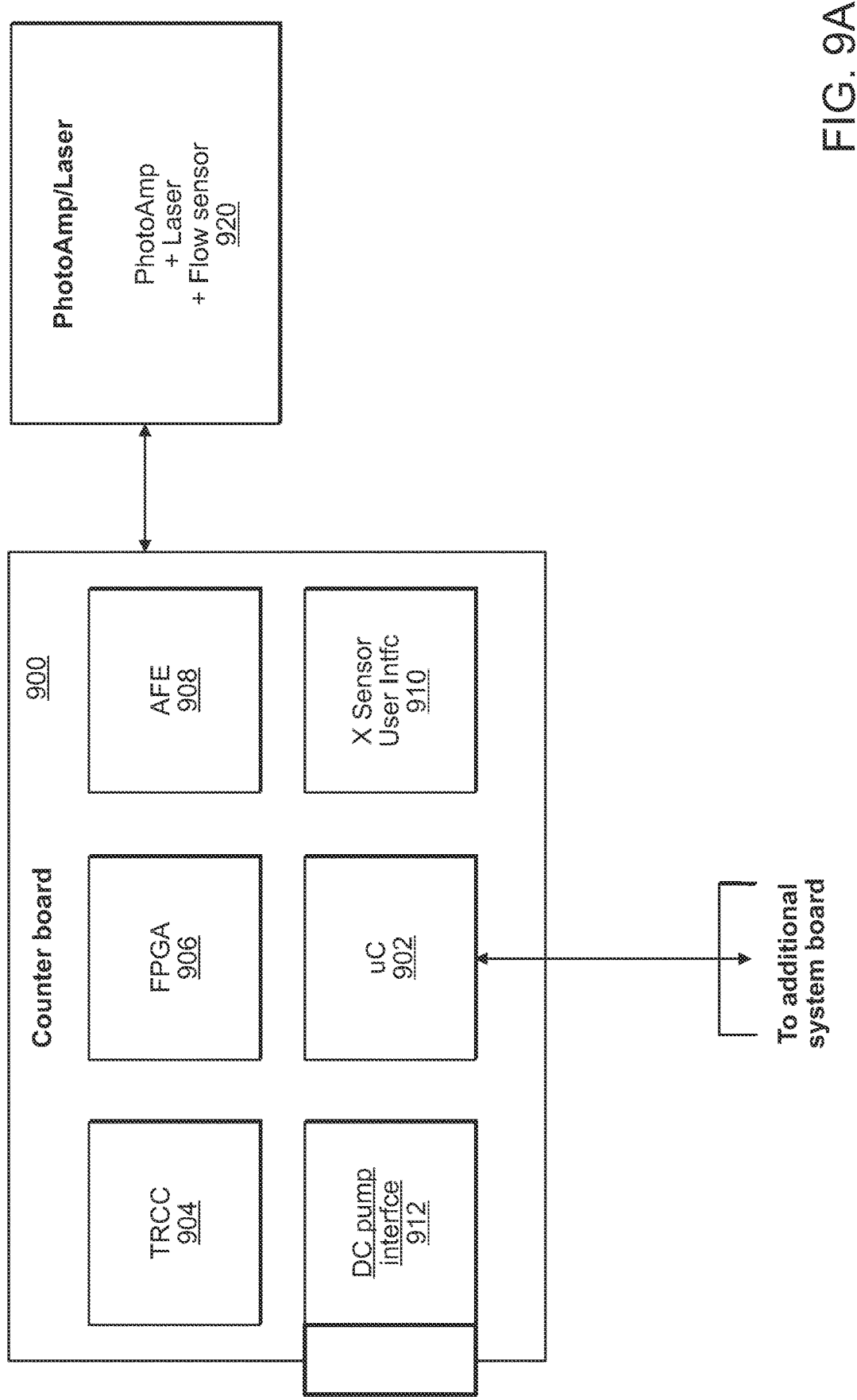

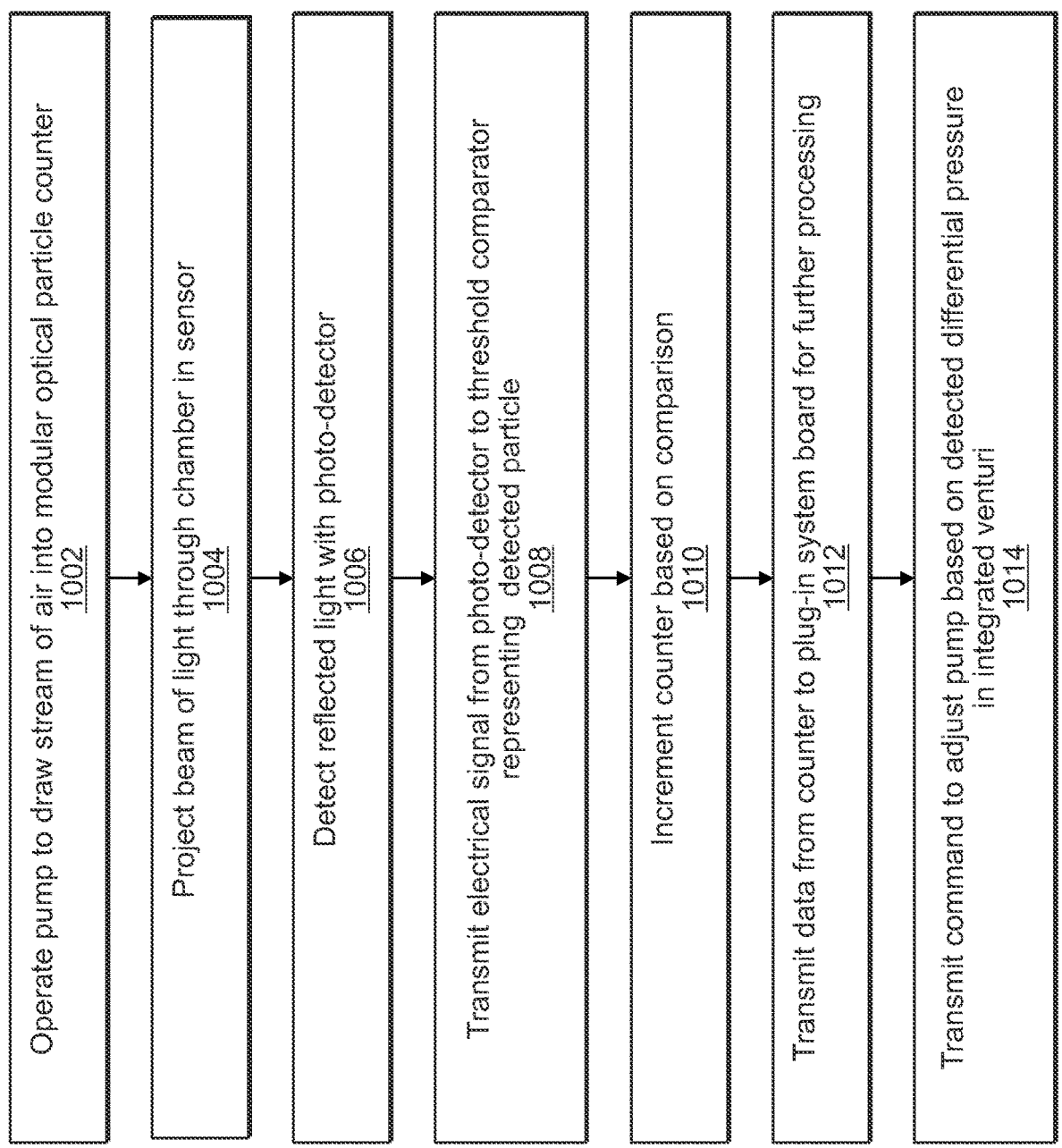

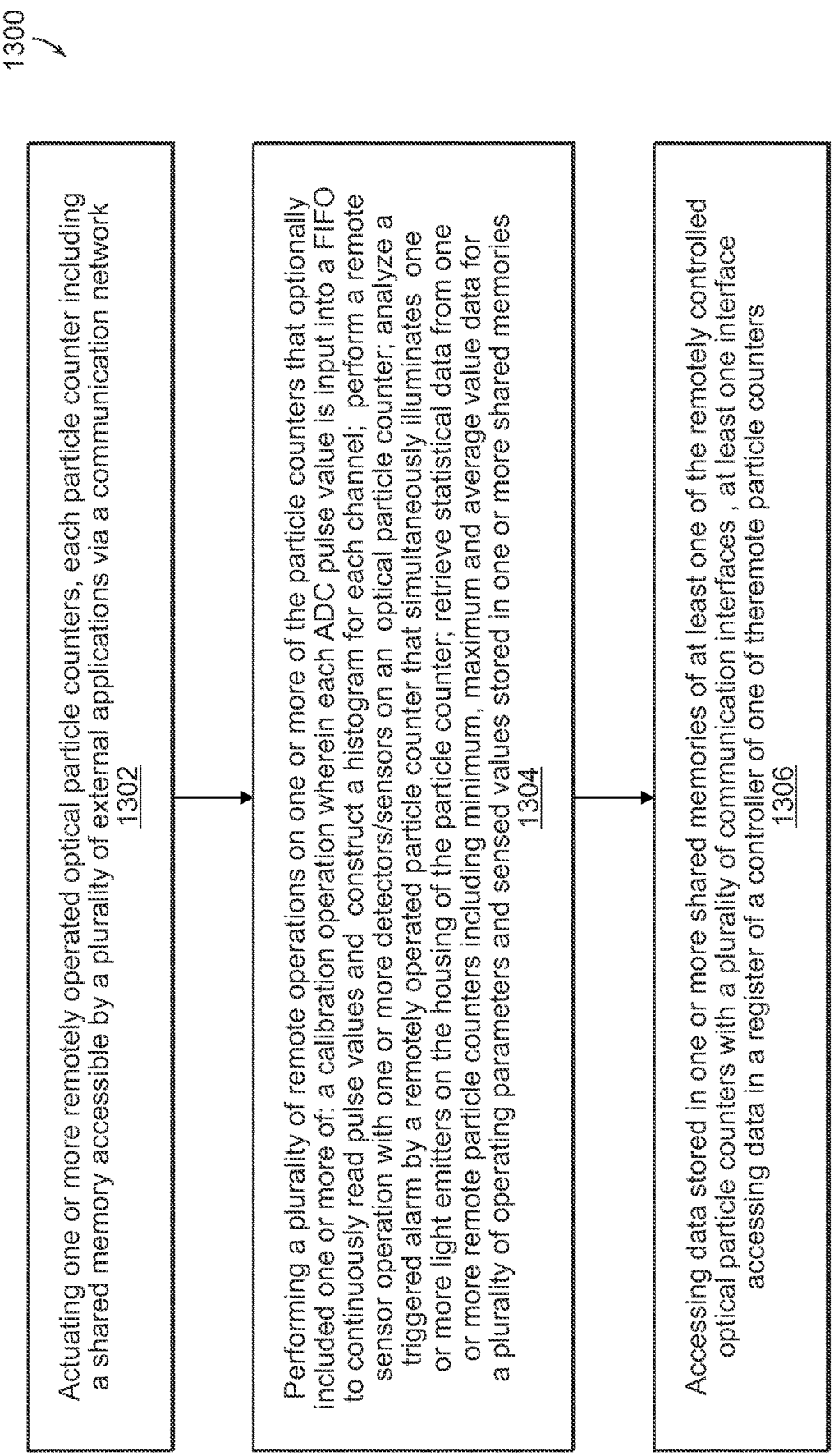

| Size (μm) | Alarm Enabled | Threshold Value | Color |
|---|---|---|---|
| PM 0.3 | ☒ | 100.0 0 | Red |
| PM 0.5 | ☒ | 20.0 0 | Red |
| PM 0.7 | ☐ | 0 | Green |
| PM 1.0 | ☒ | 5.000 | Red |
| PM 2.0 | ☐ | 0 | Green |
| PM 2.5 | ☒ | 1.000 | Red |
| PM 3.0 | ☐ | 0 | Green |
| PM 5.0 | ☒ | 100 | Red |
| PM 10.0 | ☐ | 0 | Green |

FIG. 15A

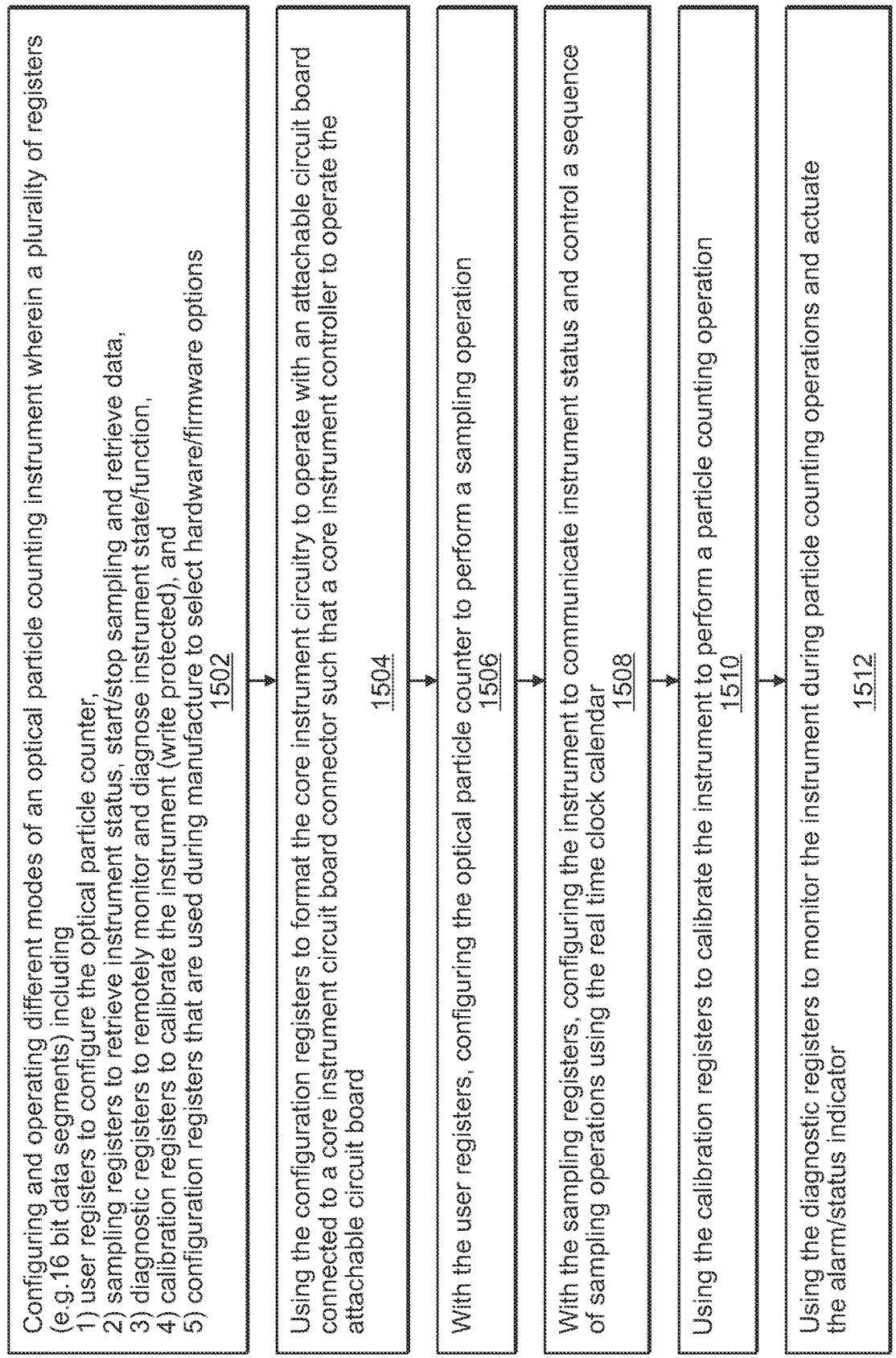

MODULAR OPTICAL PARTICLE COUNTER SENSOR AND APPARATUS

CROSS-REFERENCE TO RELATED APPLICATIONS

This application is a 35 U.S.C. § 371 national stage filing of International Application No. PCT/US2021/040194, filed on Jul. 1, 2021, which claims priority to U.S. patent application Ser. No. 17/139,625 filed Dec. 31, 2020, which claims priority to U.S. Provisional Application No. 63/061,761, filed on Aug. 5, 2020, and U.S. Provisional Application No. 63/047,230, filed Jul. 1, 2020, the contents of all of the above applications being incorporated herein by reference in their entirety.

BACKGROUND

Optical Particle counters (OPC) used in air quality applications can provide an indication of particulate levels in a variety of ways. They can be used to provide absolute counts by channel size, or to provide estimated particulate concentrations by size, or even to estimate particle mass within some size range. Particle counters were initially designed and used in manufacturing applications to help ensure a minimum desired air quality for critical manufacturing operations. Particle counters are also increasingly being used in commercial and residential air quality monitoring to provide information about airborne particulates. This information can be used by occupants to make decisions about changing their environment should these levels increase beyond some desired threshold. Changing the environment might entail engaging air filtration equipment, or reducing/excluding external air sources temporarily during an event, etc. Airborne particulates can be caused by many factors, some particulates are naturally occurring (pollen and other allergens) while some are man-made (manufacturing, construction, combustion, etc.).

Optical particle counters (either a light-blocking or light-scattering) detect particulates passing through a light beam and generate a corresponding signal representing the detected particle, with some characteristic (typically amplitude) of that signal being related to the particulate's size. Typically these pulses are grouped in "size bins" with each bin corresponding to the number of particulates in a specific size range seen over some (usually user-specified) sample period.

An instrument with more "size bins" or channels provides increased performance in that it allows for a more detailed particulate size distribution to be collected. A more detailed size distribution more accurately describes the make-up of particles by size in an environment. This has particular benefit when using an OPC to estimate mass in that in order to estimate mass with an OPC one has to calculate the volume of each particle channel. An average size for the channel is determined and then the volume for a particle of that size is calculated. The volume of a sphere can be calculated by $4/3 \pi r^3$. Since the radius is cubed it is highly influenced by the average size chosen. So, an OPC with more channels (to a limit) can provide more of a granular size distribution and thus can better estimate the mass for each individual channel. Typically these are then added to provide a mass estimate for particulates below some threshold size (e.g. PM2.5 would provide the estimated mass of all particulates below 2.5 um).

SUMMARY OF THE INVENTION

The devices and methods described herein pertain to optical particle counting in an airflow of particles is formed and passed through a beam of light wherein a light detector detects light scattered by the particles as they pass through a beam, or alternatively, detects the shadows created by the particles as they pass through the beam. One or more circuit boards have circuit components mounted thereon that serve to process the detected light signals to count the number of particles and can detect further characteristics of the particles such as size and mass, for example. The circuitry can be configured to process and record particulate data in a variety of different configurations where a core module performs basic functions and one or more additional circuit boards can be attached to the core module or base unit so that a particle counting system can be constructed as needed by different users. The system can be configured for hand carried portable particle counting or for fixed position operation within a specific facility, for example. A system can be controlled locally by a single user, or within a local area network, or entirely remotely using a public communication network with wired and/or wireless communication.

Preferred configurations are assembled into a compact housing in which the core module is contained with one or more additional circuit modules attached to connectors on a single core module circuit board assembly. The flow path within the compact housing can be configured with the circuitry to reduce the volume and weight of the system relative to prior art systems that cannot be adapted to a large variety of operating modes and capabilities. A flow channel manifold includes a Venturi to provide a more uniform flow in conjunction with a flow actuator such as a pump that draws a fluid through a chamber where the beam of light traverses the flow path containing the particles being counted. The flow channel manifold can eliminate tube connectors between the chamber, the venture and the pump, for example, to provide a smaller, lower weight particle counting assembly that can be adapted to a variety of different applications.

Preferred embodiments can employ a controller on the core module circuit board that can communicate with the attachable circuit board modules and thereby manage system operations. Further embodiments include a signal processing circuit such as an application specific integrated circuit (ASIC) or an FPGA to perform signal processing functions on the detected light signals associated with each of the particles detected by the light sensor. The signal processing circuit can be used to manage analog front end circuitry that processes one or more channels of signals generated by the light sensor that can be configured to separate detected signals based on particle size. The system can be configured to process one, two or up to thirty or more channels depending on the particle size resolution required for specific applications. Embodiments of the compact system housing can have a volume of 30 cubic inches or less (about 500 cubic centimeters or less), or in further embodiments that can also include a pump to provide fluid flow through the housing, a volume of 24 cubic inches or less (about 400 cubic centimeters or less), or embodiments with or without a pump, the housing can have a volume of 20 cubic inches or less (about 325 cubic centimeters or less), or in further embodiments (e.g. without a pump) the housing volume can preferably be 15 cubic centimeters or less (i.e. about 245 cubic centimeters or less. The weight of the system is preferably less than 2.5 pounds (less than about 1140 grams), and more preferably less than 2 pounds (less than about 910 grams) and in some embodiments less than 1 pound (less than about 460 grams).

The system can utilize a plurality of communication and data management protocols for processing of particle count information and control pf particle counting operations. Preferred embodiments can use a Modbus format in which a plurality of registers are used to configure and manage a particle counting instrument. An Ethernet network protocol can be employed for networked operations including remote communications with one or more servers. As other operations such as data logging can require other communication formats, a second remote communication interface can be used. Further preferred embodiments can also employ a third communication interface to enable remote monitoring and control of instrument operation. For example, it is frequently desirable to monitor the operating states and functions of particle counting instruments. If an instrument operation is disrupted, for example, it is advantageous to promptly communicate a change in operating status, or to anticipate a change in status, so as to facilitate servicing of an instrument. The monitoring and servicing of particle count instruments can be conducted both locally at an installation site or by using a remote computing device at a distant geographic location to manage such processes. Each instrument can be configured with a light source, or light sources operating with different colors, to indicate to a local user either by line of sight viewing at the instrument location such as in a clean room, or via a local network in the same building or campus by camera or networked display to visually determine an instrument condition. The light indicator can serve as an alarm to a local and/or remote user concerning a disruption of one or more instrument operations. The light indicator can communicate that the instrument is operating within normal limits, can indicate the need for calibration, or can indicate the imminent failure of particular instrument functions. For example, the light indicator can be configured to indicate that the core module functions are normal, but that an attached module operation, such as an attached environmental sensor, is not operating normally. Preferred embodiments enable a remote user to monitor an instrument, and can remotely reset an operation of the instrument either in response to an alarm notification signal, or by reconfiguring the light indicator settings so that a specific light source or combination of light sources are changed to monitor different instruments operations or conditions. A user interface can be provided to the remote and/or local user to enable the reset of light indicator operations. If a particle counting instrument includes an electronic display, the display can also show the alarm or indicator status and enable a local user to communicate with a remote user or other local users concerning instrument operation such as by touchscreen operation of the display or by keypad or keyboard operation.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 2G illustrates a data flow diagram for the circuit board assembly shown in FIG. 2F;

FIGS. 9A-9I depict a counter main board and additional system boards in exemplary embodiments; and FIG. 10 depicts a sequence of steps for using a modular optical particle counter in an exemplary embodiment.

FIGS. 12A-12H illustrate screenshots of user interfaces for particle counting devices as described herein.

FIG. 13 depicts a process flow diagram for operating a plurality of remotely controlled optical particle counters having a shared memory.

FIG. 15A illustrates operation of allocation of alarm/status light indicator features in an optical particle counter.

FIG. 15B illustrates methods for configuring and operating optical particle counter instruments with a plurality of dedicated registers performing discrete functions.

DETAILED DESCRIPTION

Conventionally, particle counters have included a large number of disparate components including one or more main boards, a particle counting sensor block, a large amount of tubing, a differential pressure sensor used for determining and controlling a flow rate, filters, pump, fittings, etc. This type of architectural arrangement makes these systems bulky and challenging to fit into a small compact apparatus which is the desired form factor for compact particle counters. Embodiments of the present invention address this configuration challenge by making a number of design changes to reduce complexity, improve functionality and reduce size. More particularly, embodiments consolidate the counting functionality into a removable optical particle counter sensor module with a single main board that manages all of the optical particle counting. The module can be used in an optical particle counting apparatus with a variety of different plug-in system boards (referred to hereafter as "system boards") to implement a complete instrument or provided as an OEM (original equipment manufacturer) module to integrators to use in their systems or products. In one embodiment, the modular optical particle counter may include 30 size channels. Further, embodiments may utilize a manifold directly connected to a sensor outlet. The manifold may include an integrated Venturi for accurately determining a differential pressure in order to control the airflow rate through the counter. Embodiments may additionally include a pre-filter integrated into the manifold for filtering air entering a pump attached to or integrated within the manifold. In further embodiments, an exhaust filter may also be attached to or integrated within the manifold for cleaning air exiting the pump before returning it to the sampled environment.

Before discussing the embodiments in greater detail, exemplary conventional optical particle counter configurations will be first discussed. It should be appreciated that the configurations are discussed for the purpose of illustrating exemplary functioning of optical particle counting apparatuses and that the embodiments of the present invention are not limited to the specifically described configurations.

Figure 1:
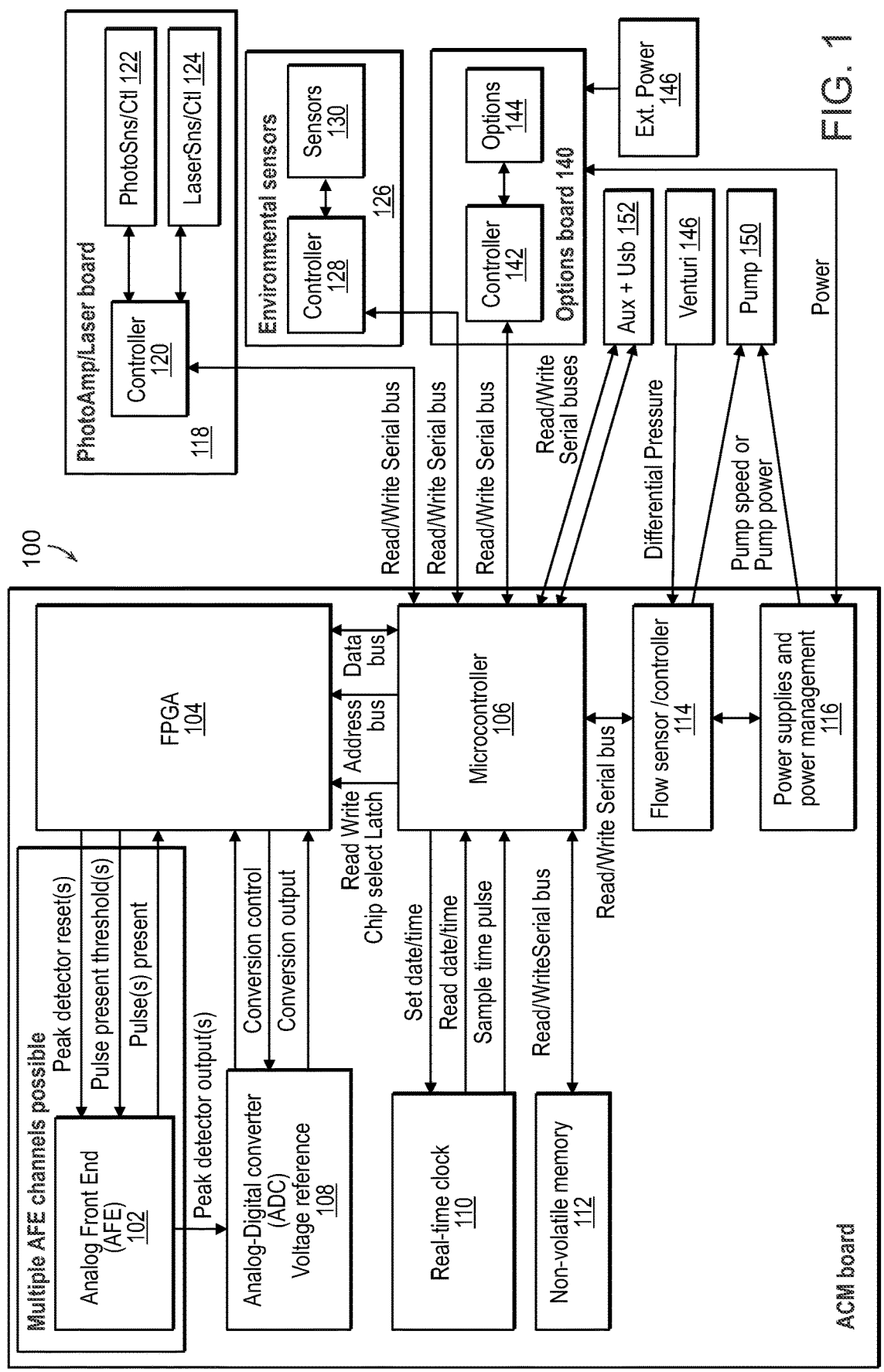
FIG. 1 depicts an exemplary data flow diagram for an optical particle counter system.

FIG. 1 depicts an exemplary functional layout for an optical particle counting apparatus in an exemplary embodiment. ACM (core module) board 100, photo-amp laser board 118, environmental sensors board 126 and options board 140 represent circuit boards. The remaining blocks represent functional blocks with the arrows showing the direction of information flow with labels above each arrow describing the type of information (which can be data, control signals, status information, etc.). Blocks that are not encapsulated within the circuit boards are discrete functions not on circuit boards. It should be appreciated that while this block diagram shows a particular implementation, other implementations where all the components are on a single board (or spread across different boards, but in a similar configuration are envisioned). It should similarly be appreciated that in some embodiments some depicted items, for example the auxiliary port and the USB port, may be excluded without departing from the scope of the present invention.

A description of the block diagram modules in FIG. 1 follows below of a first embodiment in which a first processor comprises a system controller that is connected to a signal processing circuit where the system controller can be connected to one or more attachable circuit boards that can have a plurality of different operational configurations or modes.

The signal processing circuitry can include an analog-front-end (AFE) 102 that takes signals (pulses) from photo-amp board 118 and detects when they cross above a pulse present threshold (e.g. using a comparator). The pulse present threshold is setup via a heavily low-pass filtered PWM signal from FPGA 104. FPGA 104 also controls the peak-detector reset signals which hold the peak detectors in reset until a pulse is encountered and then processed. Finally, the peak-detector outputs are buffered and sent to the ADC 108 for conversion. There is at least one AFE 102 but additional AFEs are can be employed (e.g.: one per photo-amp gain channel).

FPGA 104 manages the analog-front-end(s) 102 setting pulse threshold(s) (via PWM(s)), resetting the peak detector(s) and managing pulse presence for the pulse processing state machine. Once a pulse has been identified (photo-amp signal above present pulse threshold) the peak detectors are enabled and once the pulse is detected and processed (photo-amp signal below pulse present threshold) then an ADC conversion is started for the captured peak. Once the ADC conversion is complete, that ADC value is compared against the pulse threshold for all enabled counters, and if the ADC value exceeds the threshold on a particular counter, then that counter is incremented. FPGA 104 implements the desired number of counters along with an enable/disable bit, an associated gain selection (if there are multiple gain channels implemented) and a threshold value for each counter. The threshold/gain values are determined during calibration and are stored by system controller 106 in non-volatile memory and loaded into the FPGA 104 on startup (or when the values or changed, or when sampling is started, if that is desired).

During calibration, instead of the pulses being processed by the counters, each pulse ADC value (and gain value if there are multiple gain channels) is added to a FIFO. The controller reads that FIFO continually during the calibration process (until the calibration sample time is reached) and builds a histogram of the pulses by ADC value. This histogram is used to plot the distribution of pulse heights (ADC values) for a given calibrated particle size. The mean of that distribution is used to set the pulse threshold for that particle size. This is repeated for each particle size to be calibrated. Intermediate sizes can be calculated at runtime either through interpolation or by fitting the other sizes via a linear or curve fit to arrive at a mapping function. FPGA 104 may also implement a traditional bus interface to microcontroller 106 with read/write/chip select signals. The internal FPGA control structure is implemented as a set of registers accessible by the microcontroller to control operation and read status and data. A further latch signal is used to latch all of the internal counters within FPGA 104 so that the data read is all sampled at the same time and so there are no issues with counters being updated during read access by microcontroller 106.

Microcontroller 106 implements the top-level functionality for the ACM 100. It interfaces to most of the internal subsystems and manages them, and provides links to the external interfaces and provides services to those interfaces.

Analog-digital-converter (ADC) 108 is controlled by FPGA 104. Once a pulse has been captured (and held at the ADC input by a peak-detector) FPGA initiates an ADC conversion and retrieves that output for processing by the FPGA (either fed to the counters during normal operation or added to the FIFO during calibration). If there are multiple AFEs 102 in a system FPGA 104 also controls the channel selection (in order to process the desired ADC input for the associated AFE). An external voltage reference provides a precision voltage source to ensure a reliable and repeatable peak-voltage conversion.

Real-time clock/calendar (RTCC) 110 provides an accurate date/time base for the instrument. The date/time are used when writing the data to non-volatile memory 112 to give it a clearly recognized sample time. The RTCC chip also provides an accurate pulse output that is used internally for the sampling state machine, assuring a tight sample time tolerance even for very short (1 second) samples. The clocking of the particle counter serves to automate the operation of the particle counter that can also be synchronized with additional particle counters operating on a network.

Non-volatile memory 112 is used to store configuration parameters, calibration data, user preferences for the instrument and the FPGA image that can be reset by a bootloader operation such as that described in US Patent publication 2014/0281476 filed on Mar. 15, 2014, the entire contents of which is incorporated herein by reference. The balance of the memory is used to store the sample data for the instrument. Whenever a sample has completed, that sample data is written to this memory. The data can also be sent to various external interfaces (if thus configured) but the data can also be retrieved at some later time from multiple interfaces.

Flow sensor/controller 114 manages the airflow rate during sampling. When sampling, the air flow rate is monitored continually (via a Venturi and differential pressure sensor) and averaged to remove pump noise and turbulence noise from the air flow measurement. Then the pump speed is controlled either by controlling the power to a DC pump 150 or by controlling a speed input to a variable pump controller. This is done to maintain a reasonably constant airflow rate during sampling (as the amount of scattered light from a particle is directly proportional to its velocity through the beam).

Power supplies and power management circuitry 116 controls and manages power to pump 150 and communicates with flow sensor/controller 114. The pump can be incorporated into the instrument core instrument or be operated as an attached module as described herein.

Photo-amp/laser board 118 includes controller 120 in communication with microcontroller 106. There is a serial bus interface (UART, SPI, I2C, etc.) between microcontroller 106 and other connectable circuit boards such as the sensor sub-system 126, for example. This interface allows the laser to be turned on for sampling and to monitor various parameters for laser control and photo-amplification. Photoamplifier/laser board 118 includes controller 120 that controls operation of and receives data from the photodetector and photoamplifier 122 and the light source such as laser 124. As described further herein, the amplified signals from the photodetector can provide input signals to a plurality of different channels. In one embodiment, a laser diode projects a beam of light to a beam stop that results in scattered light as particles in an input air stream cross that beam. A light source (laser or LED) controller 120 provides control of the laser which can be integrated within the small photoamplifier board 118 and monitored with an emission sensor. This functionality can provide closed loop control of the laser to ensure the light intensity remains reasonably constant (when operating) throughout the life of the laser and in varying conditions (i.e. temperature). The scattered light is focused by one or more reflectors or lenses onto the face of a photo detector such as photodiode. The photodiode converts light into electric current. The tiny current in the photodiode can be pre-amplified by a trans-impedance amplifier.

A serial bus connects board controller 120 to the main controller 106 on circuit (ACM) board 100. Microcontroller 106 transmits amplified signals from board 118 to field programmable gate array (FPGA) 104 which controls analog front end 102 which can process one or more channels of data to produce peak detector signals delivered to the analog to digital converter 108 which, based on a reference voltage, delivers digital data to the FPGA. The FPGA 104 transmits data to microcontroller 106 for storage and/or display. The microcontroller also performs other functions such as flow control based on flow sensor data from flow sensor/controller 114 measuring differential pressure at Venturi 146. The measured flow data is used to control pump 150 that adjusts the flow through Venturi 146 which maintains flow rates that are within an optimal flow range for accurate particle detection. A battery or other external power source 148 provides power to the system under the control of power management circuitry 116. Power supplies and power management 116 can deliver power to pump 150 and to a modular (options) board 140 that can be connected to circuit board 100 and interface with the microcontroller 106. The options 144 that options board 140 can implement via controller 142, optionally powered by external battery or power source 148, are described in further detail below. Microcontroller 106 is also connectable to an environmental sensor board 126 in which a dedicated controller 128 to control sensors 130 and transmit sensor data to the options board 140 and/or microcontroller 106.

In some embodiments, an auxiliary and USB port 152 can be used to interface with serial printers, radiosonde telemetry, an enclosure management controller (for use with outdoor enclosures) or other ancillary functions. The auxiliary and USB port 152 may be used for configuration and calibration, but may also be used to communicate with an options controller or external OEM controller.

With the above functional layout (or corresponding architectures), embodiments provide a core engine that encompasses the bulk of the particle counting functionality. This core engine interfaces with other components to make up a system or instrument. Some of these components are critical components, like the photo-amp/laser board (and its associated mechanical-optical assembly) and the air pump and associated pressure (flow) sensor. These components may also include filters, tubing and fittings. In the case of the ACM much of that is captured in the manifold design (an integral mechanical assembly with internal routing for the airflow that also captures the Venturi and pre-filter and eliminates most of the tubing and fittings in a traditional particle counter).

However, in addition to the critical components the core engine may also be mated to a large variety of option boards. These boards allow the core engine to be used to provide particle counting functionality in a variety of applications without the other elements of that system having to be aware of any of the implementation details. The option board controls the particle counter (turn it on/off, changing sampling parameters, etc.) and is then able to access both real-time and historical particle count data (in a variety of formats (raw, concentration, mass) for either differential or cumulative counts.

In addition to the option boards, an environmental sensor board (a variety of sensors may be used to monitor various gases and other environmental parameters like temperature, relative humidity, dew point, barometric pressure, etc.) can be connected to the core engine (usually through the option board), with its data being averaged and captured in conjunction with particle count data so that all sample data is grouped together. It should be appreciated that a third-party integrator may choose to connect the environmental sensor board(s) to their own electronics and manage that data separately.

Some examples of options are:
a) An instrument with a touchscreen and a battery. The option board implements the display and touch interface and also implements the battery/power management. The option board controls the particle counter based on user selections and displays the received data or makes it available through some external interface. This makes creating a particle counting instrument, with traditional functionality, much easier than having to re-create all of the functionality.
b) A remote sensor with an external interface. Many communication protocols exist and embodiments may handle requests for an instrument to support either a physical communication standard and/or a protocol running on that interface. Previously making changes to traditional instruments to support such requests was often problematic because of the constraints of their architectures. Similarly, developing gateways to convert existing interfaces to support new ones is often cumbersome and adds additional hardware which is typically captured externally in its own enclosure and often requires separate power. In contrast, embodiments may implement the desired external interface on an option board (integral to the instrument) and substitute for other functionality to provide only the desired functionality. Since the optical particle counting system described herein is designed to be a completely independent core with a well-defined interface integrating such is much easier as it provides complete control of the particle counter and data.

c. An OEM component with a custom interface. Such a core component can be integrated much more easily into an OEM application. As above in b) a small option board may be designed to provide the desired interface (if the base interface is insufficient) and the small compact design makes integration much simpler. Integrating traditional instruments with a plethora of boards, wires, tubes, fittings, pumps, etc. that are often captured by an enclosure makes it challenging to make room for all of that in an OEM enclosure and ensure that all tubing, wire harnesses, etc. are managed effectively. The compact fully integrated design of the ACM described herein where the assembly is a monolithic block on a plate with mounting holes makes integration of it very straightforward in most circumstances.

Optical particle counters may also use a light-blocking rather than a light-scattering configuration, with light-blocking configurations resulting in pulses that register a decrease in light as the particles pass through the beam. A similar system may function for fluids generally including gases other than air, or a system to detect particles in liquids.

Traditionally, only a single sensor block and photo-amplifier board 100 was used in an optical particle counting instrument. This was largely due to the cost, and complexity of these sub-assemblies which often make-up the bulk of the cost of an instrument. It was also due to the processing requirements on the counter board. However, with the advent of miniaturization, lower-cost components, and increases in processing power, the possibility of combining multiple particle sensor blocks into a single instrument became possible and particle counters that included multiple sensor block/photo-amplifier sub-assemblies within a single counter instrument were developed. Each of these blocks were communicatively coupled to a common counter board, or alternatively used individual counter interface boards which provided processed data to a common instrument board to manage the display and external interfaces.

Further, optical particle counters have been developed in which the airstream is split into multiple segments, each with a respective sensor block. Such a configuration means that the particle velocity is slowed for each sensor given a fixed sample volume, with the result that the system gets more signal per particle and thus can develop a more sensitive instrument (on all channels). These systems may use a count comparator to correlate counts between multiple sensors, which allows for failure notification, since one failed sensor means a loss of count uniformity, calibration notification, since count uniformity will degrade, and redundancy, the ability for remaining sensors to estimate counts for a failed sensor. Additionally, systems have been developed that can assign different sensors for different size ranges that results in a sensor with a much larger dynamic range.

Optical particle counters may also allow separate sensor blocks to sample different airstreams. For example, instruments with multiple sensors can check that filtration is working as expected. By sampling air from either side of a filter simultaneously, the system can check that particulate counts from two or more sensors reflect a functioning filter. Instruments may also check that manufacturing equipment is operating as expected. By sampling air from various areas around a particular piece of equipment, the system can ensure that particulate levels are what is expected. Doing so with a single instrument allows correlation of these counts and decision making that involves more than a single threshold. Optical particle counters may also allow for an upgrade path for manifold systems that currently share a sensor block and switch airstreams between samples so that there is no continuous sampling of all channels as the sensor block is shared. By replacing this counter with multiple chambers and sensor blocks, the manifold installation is made continuous at a lower cost than providing individual instruments for each channel.

Figure 2A:
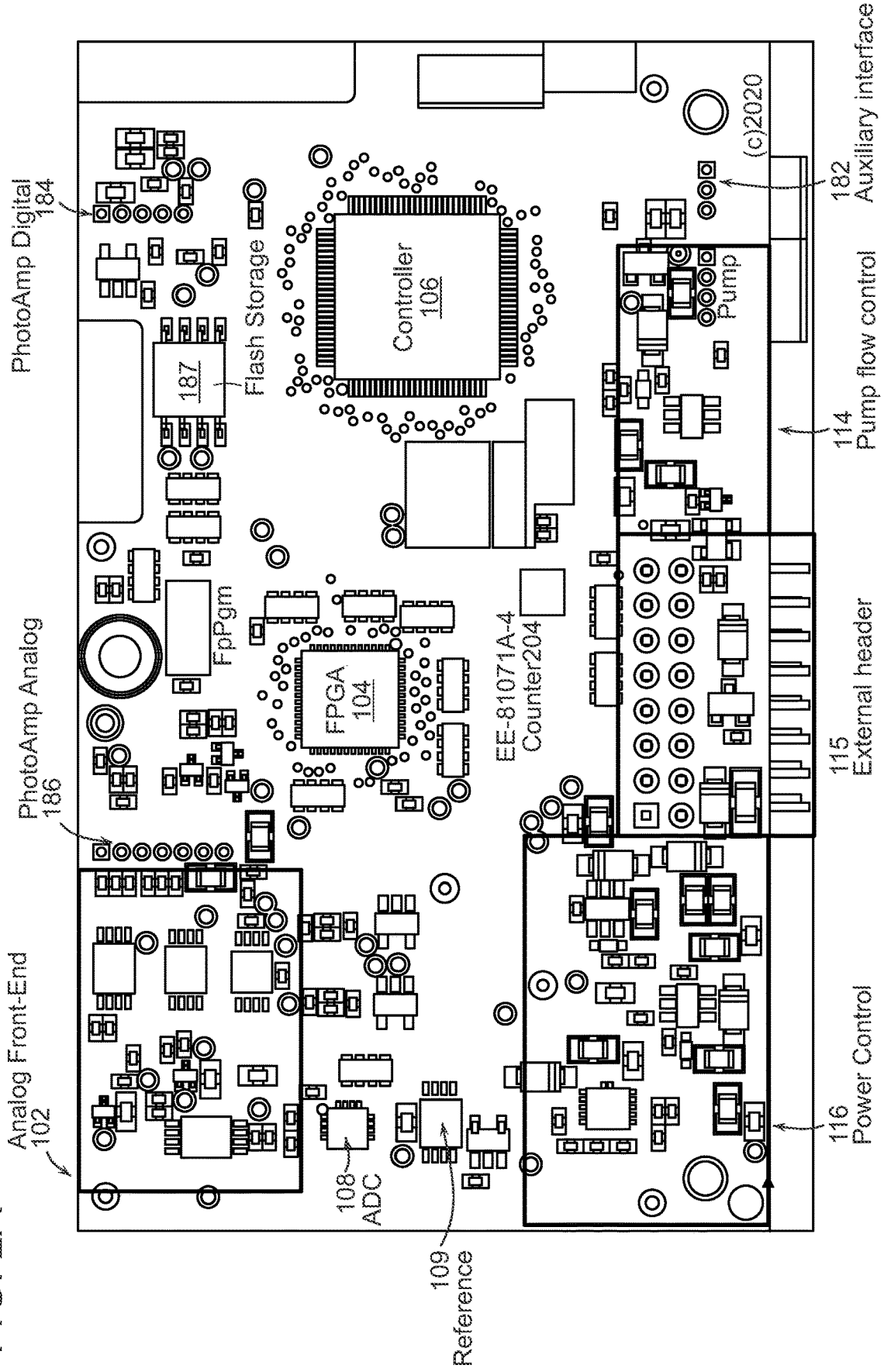
FIGS. 2A and 2B depict an exemplary circuit board assembly for a core module having first and second sides.
Figure 2B:
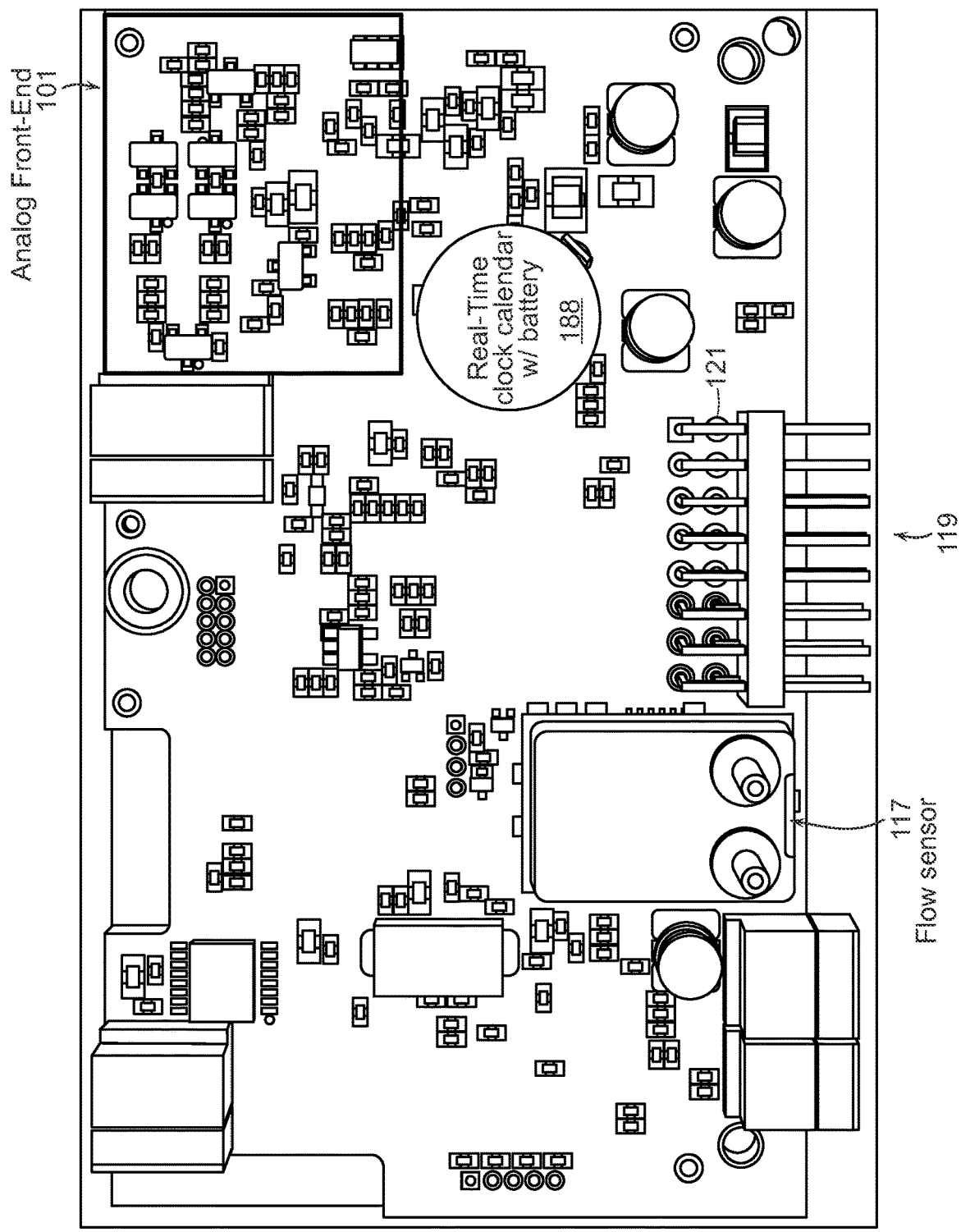

FIGS. 2A and 2B depict additional exemplary optical particle counter circuit board configurations. These show opposite sides of a single board in this embodiment where a first side shows a plurality of circuit devices including an analog photo-amplifier circuit 186, a controller 106, an FPGA 104, a flash storage or memory 187, a digital photo-amplifier 184, an auxiliary interface 182, and an external header 115 as described herein. The second side of the core module circuit board shown in FIG. 2B includes additional elements of AFE 101 that connect to AFE components 102 on the first side. Feedthrough connections, such as 121, to the connector 119 for the external header 115 can be utilized. The real time clock calendar components 188 are mounted on the second side and can include an internal battery. The circuit board operations have been described in connection with FIG. 1 and in further detail below.

Figure 2C:
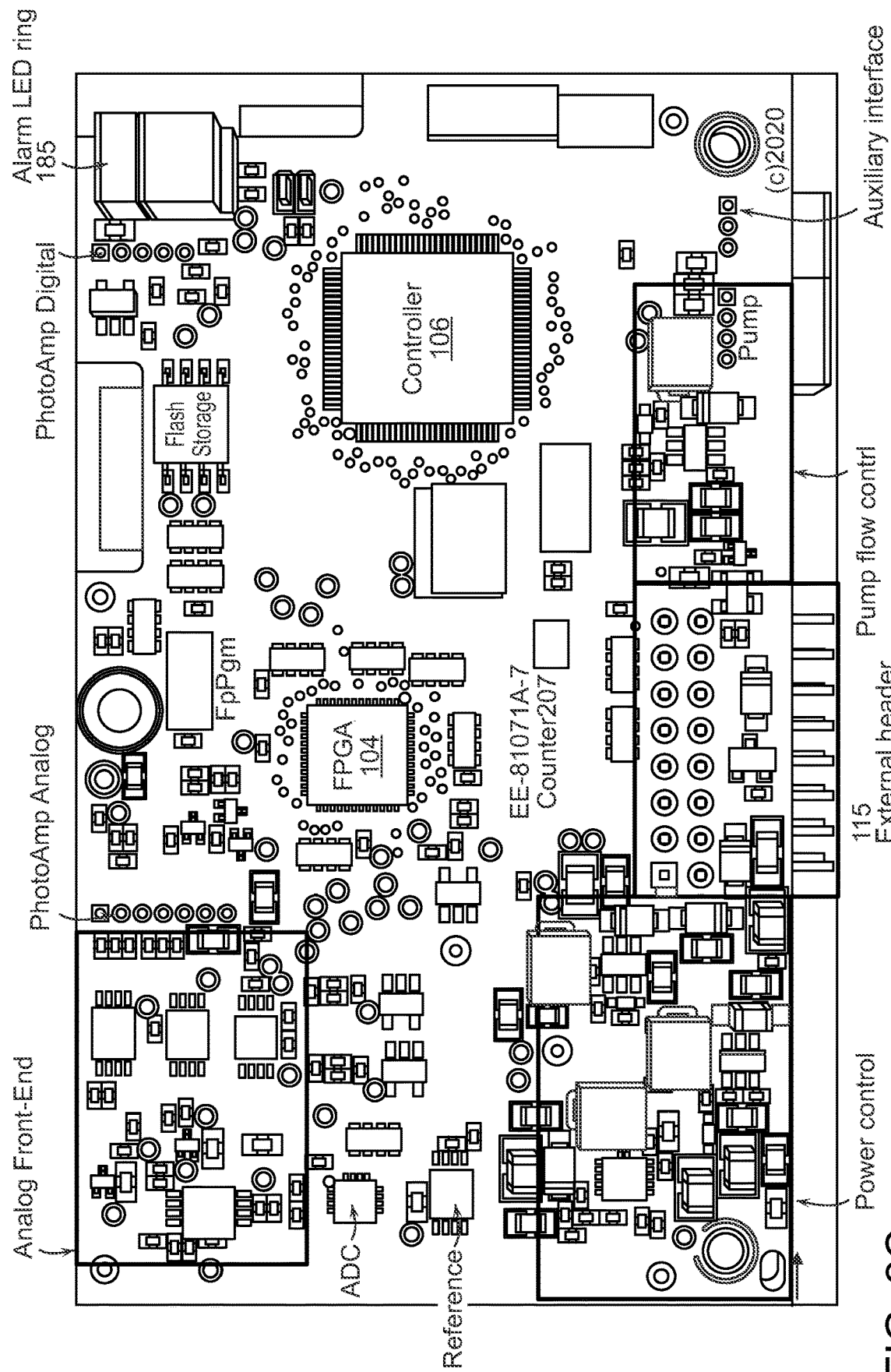
FIGS. 2C and 2D illustrate further exemplary circuit board assembly for a core module having first and second sides.
Figure 2D:
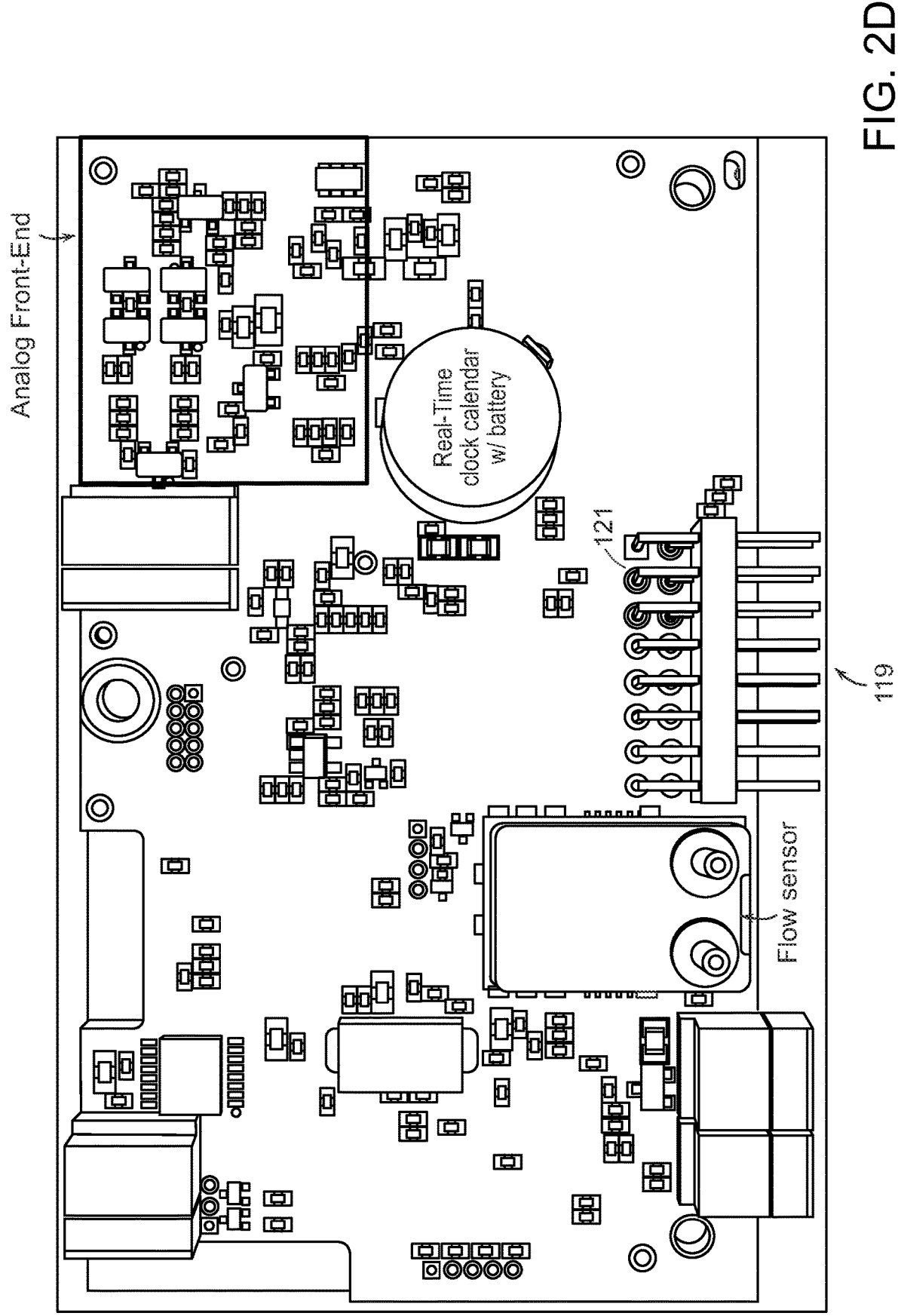

Preferred embodiments include an optical particle counter product that encapsulates all the particle counting functionality on a single subsystem that can be then integrated into a variety of products. The embodiments shown in FIGS. 2C-2E use an external header 115 can be used as an interface to connect to attached internal or external systems, these interfaces can be simple UART, SPI, etc. interfaces or more sophisticated interfaces like WiFi, LoRA, Fiber, Cellular, etc. or these external boards can also include batteries and battery management, displays, actuators, environmental controls, etc. The first side of an exemplary circuit board including a light indicator circuit 185 is shown in FIG. 2C and the second side of this circuit board is shown in FIG. 2D wherein feedthroughs 121 electrically connect the external header 115 to connector 119. A simpler design described below in connection with FIGS. 2F and 2G utilizes a simpler system and functionality without the external header.

The PCB layout for the top of the counter board (clockwise from top left) starts with the analog front end from the photo-amp analog input connector as described herein. This includes buffers, peak-detectors, pulse present thresholds and the interface to the ADC (below this block, with the reference for the ADC below that). Note that further details concerning devices and methods for pulse threshold analysis and other optical particle counter operations have been described in U.S. Pat. Nos. 9,140,638, 9,140,639, 9,158,652 and 9,677,990, wherein the entire contents of each of these patents are incorporated herein by reference. The FPGA 104 controls the peak-detectors in the analog front-end based on inputs from the pulse present signals, it also interfaces with the ADC to manage capturing pulses and provides these pulses to the integrated counter channels. In addition to the counters the FPGA also implements a pulse FIFO used for calibration. Finally the FPGA also implements a register based interface to communicate with the controller. The controller 106 manages the bulk of the functionality for this board. It manages the FPGA as previously described but also monitors board voltages, communicates with the PhotoAmp over the digital interface, manages the flash storage, manages the current date/time via the real-time-clock-calendar subsystem, counter 207, manages air flow via the pump flow control subsystem and implements communications channels with the auxiliary interface, external sensor board and external option board and USB port.

Flash storage memory chip stores sampling information for the particle counter channels and for the configurable external environmental sensor channels (discussed below). The digital interface provides for a communication channel to the photo-amp allowing control of the laser and retrieval of status and health information.

Figure 2E:
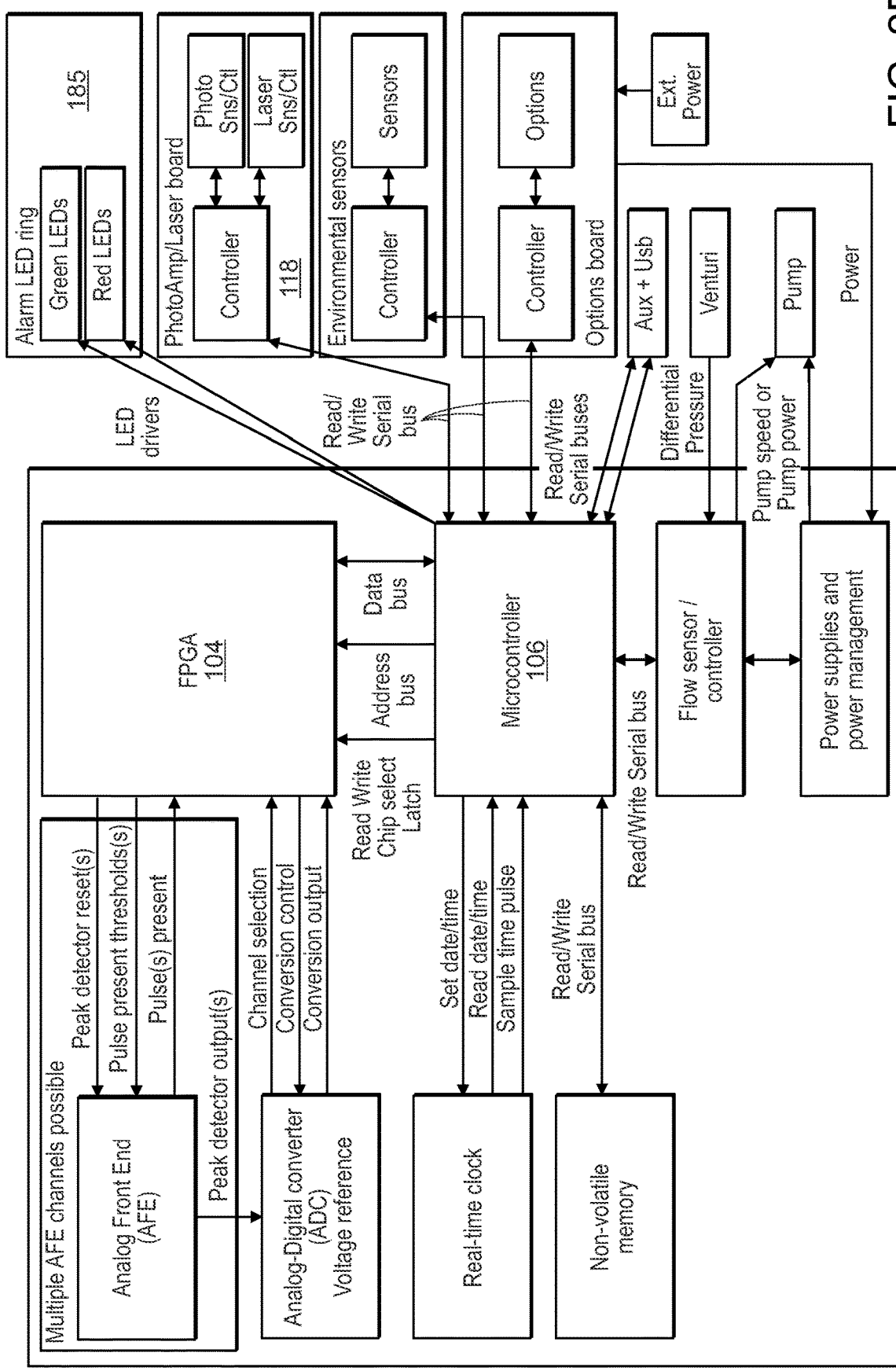
FIG. 2E illustrates a further exemplary data flow diagram for an optical particle counter system.

The alarm LED ring interfaces to board 185 circuitry or a separate small board where the LED ring is mounted around the inlet nozzle and drives the bi-color (green/red) or tri-color LEDs placed mounted thereon. See FIGS. 14A-14C as described herein. This allows visual indication as to the system status. This status can vary depending on firmware implementation. In the embodiment of FIGS. 2C-2E, the LED status is as follows: Both LEDs are off when not sampling, only green LEDs on when sampling and not external sensor or particulate channel alarms, only red LEDs on when sampling and one or more particulate channel alarms, both green/red LEDs on (amber) when sampling and no particulate channel alarms and external sensor alarms present. Remote or local users can reset the assignment of light indicators using the interface shown in FIG. 15A which illustrates the specific example of associating different light indicators with different channel sizes as described herein. The user can scroll through each of a plurality of such light indicator menus to select specific instruments or features to be shown at preselected times. Each menu can be associated with a specific light indicator to indicate to users the functions presently being displayed or a user can manually reset the displayed menu. Thus, a user can select the menu showing the status of each size channel in the example of FIG. 15A.

The auxiliary interface is used to interface with a variety of auxiliary systems like environmental control boards, telemetry transmitters (such as those available from Radiosonde) or other such interfaces. A pump power management section controls the pump power to control the air flow rate through the sensor.

The external header 115 is the main interface for the sensor to external and/or remote systems. It receives input power and has both the USB signals (for board configuration, calibration and management) as well as the communication interface to external boards (either integrated options boards, or external OEM equipment). These interfaces provide control of the sensor as well as retrieval of status and data.

The power control section 116 has several regulators to provide the various voltages required by the board as well as monitoring signals used to track board health. The bottom of the board (shown in FIG. 2D) also has the real-time-clock-calendar circuitry and its associated backup battery and a flow sensor used in regulating the air flow rate through the sensor via the pump control circuitry. Thus, the various embodiments described herein employ voltage monitoring to identify operational deficits in the system and can activate alarms or status indicators as described generally herein.

A functional layout with some options for the off-board subsystems shown, the exemplary block diagram of FIG. 2E illustrates an example of the data flow features. The blocks show circuit boards, the sub-blocks show functional features and the arrows show the direction of information flow with labels above each arrow describing the type of information (which can be data, control signals, status information, etc.). The sub-blocks that are not encapsulated on circuit boards are shown as discrete functions (not on circuit boards). Note that this diagram shows a particular implementation, other implementations where all the components are on a single board (or spread across different boards, but in a similar configuration are envisaged). Also, some items on this configuration, for example the auxiliary port and the USB port can certainly be excluded from the this example without impacting certain preferred embodiments.

This embodiment includes a core engine that encompasses the bulk of the particle counting functionality. This core engine interfaces with other components to make up a system or instrument. Some of these components are critical components, like the photo-amp/laser board (and its associated mechanical-optical assembly) and the air pump and associated pressure (flow) sensor. These might also entail filters, tubing and fittings. Additional features relate to the manifold design (an integral mechanical assembly with internal routing for the airflow that also captures the Venturi and pre-filter and eliminates most of the tubing and fittings in a traditional particle counter.

In addition to the critical components, this concept is based on the idea that the core engine can be mated to a large variety of option boards. These boards allow the core engine to be used to provide particle counting functionality in a variety of applications without the other elements of that system having to be aware of any of the implementation details. The option board(s) control the particle counter (turn it on/off, changing sampling parameters, etc.) and then be able to access both real-time and historical particle count data (in a variety of formats (raw, concentration, mass) for either differential or cumulative counts.

In addition to the attachable option boards, an environmental sensor board (a variety of these are possible as well to monitor various gases and other environmental parameters like temperature, relative humidity, dew point, barometric pressure, etc.) can be connected to the core engine (usually through the option board), with its data being averaged and captured in conjunction with particle count data, so that all sample data is grouped together. The integrator can, of course, choose to connect the environmental sensor board(s) to their own electronics and manage that data separately.

Some examples of options are:
a) An instrument with a touchscreen, battery. The option board would implement the display and touch interface and would also implement the battery/power management. It would control the particle counter based on user selections and display received data from it to be displayed or made available through some external interface. This would make creating a particle counting instrument, with traditional functionality, much easier than having to re-create all of the functionality.
b) A remote sensor with some external interface. Many communication protocols exist and there are always requests for an instrument to support either some physical communication standard and/or some protocol running on that interface. Making changes to traditional instruments to support such options is often problematic because of the constraints of their architectures. Alternatively, developing gateways to convert existing interfaces to support new ones is often cumbersome and adds additional hardware which is typically executed externally in its own enclosure and often requiring separate power. But, using this concept, the desired external interface can be implemented on an option board (integral to the instrument) and substituted for other functionality to provide only the desired capabilities. Since the system is designed to be a completely independent core with a well-defined interface integrating the core module is much easier (complete control of the particle counter is possible and all the data is available).

c) An OEM component with a custom interface. Such a core component can much more easily be integrated into an OEM application. As above in example b) a small option board can provide the desired interface (if the base interface is insufficient) and the small compact design makes integration much simpler. Integrating traditional instruments with a plethora of boards, wires, tubes, fittings, pumps, etc. that are often captured by an enclosure makes it challenging to make room for all of that in an OEM enclosure and ensure that all tubing, wire harnesses, etc. are managed effectively. The compact fully integrated design of the systems of FIGS. 2A-2E where the assembly is a monolithic block on a plate with mounting holes makes integration of it very straightforward.

Below is a description of the block diagram modules shown in the FIG. 2E which illustrates the flow of control signals and data:

1) Microcontroller. The main microcontroller 106 implements the top-level functionality for the product. It interfaces to most of the internal subsystems and manages them, and provides links to the external interfaces and provides services to them. Details are described in more depth while discussing the other modules.

2) The FPGA 104 manages the analog-front-end(s) (described generally herein) setting pulse threshold(s) via pulse width modulators (PWM(s)), resetting the peak detector(s) and managing pulse presence for the pulse processing state machine. Once a pulse has been detected (photo-amp signal above pulse present threshold) the peak detectors are enabled and once the pulse is done (photo-amp signal below pulse present threshold) then the ADC conversion is started for the captured peak. Once the ADC conversion is complete that ADC value is compared against the pulse threshold for all enabled counters, and if the ADC value exceeds threshold on a particular counter, then that counter is incremented. The FPGA implements the desired number of counters along with an enable/disable bit, an associated gain selection (if there are multiple gain channels implemented) and a threshold value for each counter. The threshold/gain values are determined during calibration and are stored by the microcontroller in non-volatile memory and loaded into the FPGA on startup (or whenever the values are changed, or whenever sampling is started, if that's desired).

During calibration, instead of the pulses being processed by the counters, each pulse ADC value (and gain value if there are multiple gain channels) is added to a FIFO. The controller reads that FIFO continually during the calibration process (until the calibration sample time is reached) and builds a histogram of the pulses by ADC value. This histogram is used to plot the distribution of pulse heights (ADC values) for a given calibrated particle size. The mean of that distribution is used to set the pulse threshold for that particle size. This is repeated for each particle size to be calibrated. Intermediate sizes can be calculated at runtime either through interpolation or by fitting the other sizes via a linear or curve fit to arrive at a mapping function. The FPGA also implements a traditional bus interface to the microcontroller with read/write/chip select signals. The internal FPGA control structure is implemented as a set of registers accessible by the microcontroller to control operation, read status and data management. A further latch signal is used to latch all of the internal counters within the FPGA so that the data read is all sampled at the same time and so there are no issues with counters being updated during read access by the microcontroller.

1) Analog-front-end (AFE). There analog-front-end 101/102 takes signals (pulses) from the photo-amp board and detects when they cross above a pulse present threshold (via a comparator). The pulse present threshold is setup via a heavily low-pass filtered PWM signal from the FPGA. The FPGA also controls the peak-detector reset signals which hold the peak detectors in reset until a pulse is encountered and then processed. Finally the peak-detector outputs are buffered and sent to the ADC for conversion. There is at least one AFE but additional AFEs are possible (typically one per photo-amp gain channel.

2) Analog-digital-converter (ADC). The analog-digital-converter 108 is controlled by the FPGA. Once a pulse has been captured (and held at the ADC input by a peak-detector) the FPGA will initiate an ADC conversion and retrieve that output for processing by the FPGA (either fed to the counters during normal operation or added to the FIFO during calibration). If there are multiple AFEs in a system the FPGA also controls the channel selection (in order to process the desired ADC input for the associated AFE). An external voltage reference provides a precision voltage source to ensure a reliable and repeatable peak-voltage conversion.

3) Real-time clock/calendar (RTCC). The real-time-clock-calendar 118 provides an accurate date/time base for the instrument. The date/time are used when writing the data to non-volatile memory, to give it a clearly recognized sample time. The RTCC chip also provides an accurate pulse output that is used internally for the sampling state machine, assuring that we might a tight sample time tolerance even for very short (1 second) samples.

4) Non-volatile memory. The non-volatile memory is used to store configuration parameters, calibration data, user preferences for the instrument and the FPGA image. The balance of the memory is used to store the sample data for the instrument. Whenever a sample has completed that sample data is written to this memory. It can also be sent to various external interfaces (if thus configured) but the data can also be retrieved at some later time from multiple interfaces.

5) Flow sensor/controller. The flow sensor/controller 114 manages the airflow rate during sampling. When sampling the air flow rate is monitored continually (via a Venturi and differential pressure sensor) and averaged to remove pump noise and turbulence noise from the air flow measurement. Then the pump speed is controlled (either by controlling the power to a DC pump) or by controlling a speed input to a variable pump controller. This is done to maintain a reasonably constant airflow rate during sampling (as the amount of scattered light from a particle is directly proportional to its velocity through the beam).

6) Photo-amp/laser board. There is a serial bus interface (UART, SPI, I2C, etc.) between the microcontroller and the sensor sub-system 118. This allows the laser to be turned on for sampling and to monitor various parameters for laser control and photo-amplification.

7) Alarm LED ring, panel and/or display illuminator board 185. This is a small optional board that can be mounted internally or externally to provide status. At present this is a small board that has LEDs mounted around the air inlet for the instrument. The LEDs illuminate a plastic ring mounted at the base of the inlet (see FIG. 14A-B). This is used to convey an operational mode and/or status for the instrument at a distance. However this output can be used to drive any number of indicators like a light tree, or a buzzer, etc., or on an display on the particle sensor, and/or sent to a wireless mobile communication device 8) Miscellaneous. The auxiliary port 182 can be used to interface with serial printers, radiosonde telemetry, an enclosure management controller (for use with outdoor enclosures) or other ancillary functions. The USB port 152 is used for configuration and calibration, but can also be used to communicate with an options board controller or external OEM controller.

The embodiments described herein relate to optical particle counter products that encapsulate all the essential particle counting functionality on a single board that can be then integrated into a variety of products. A further embodiment implements a basic particle counter on a single board as illustrated in connection with FIGS. 2F and 2G that does not include the external header or FPGA shown in FIGS. 2A-2D and consequently has fewer auxiliary board options.

Figure 2F:
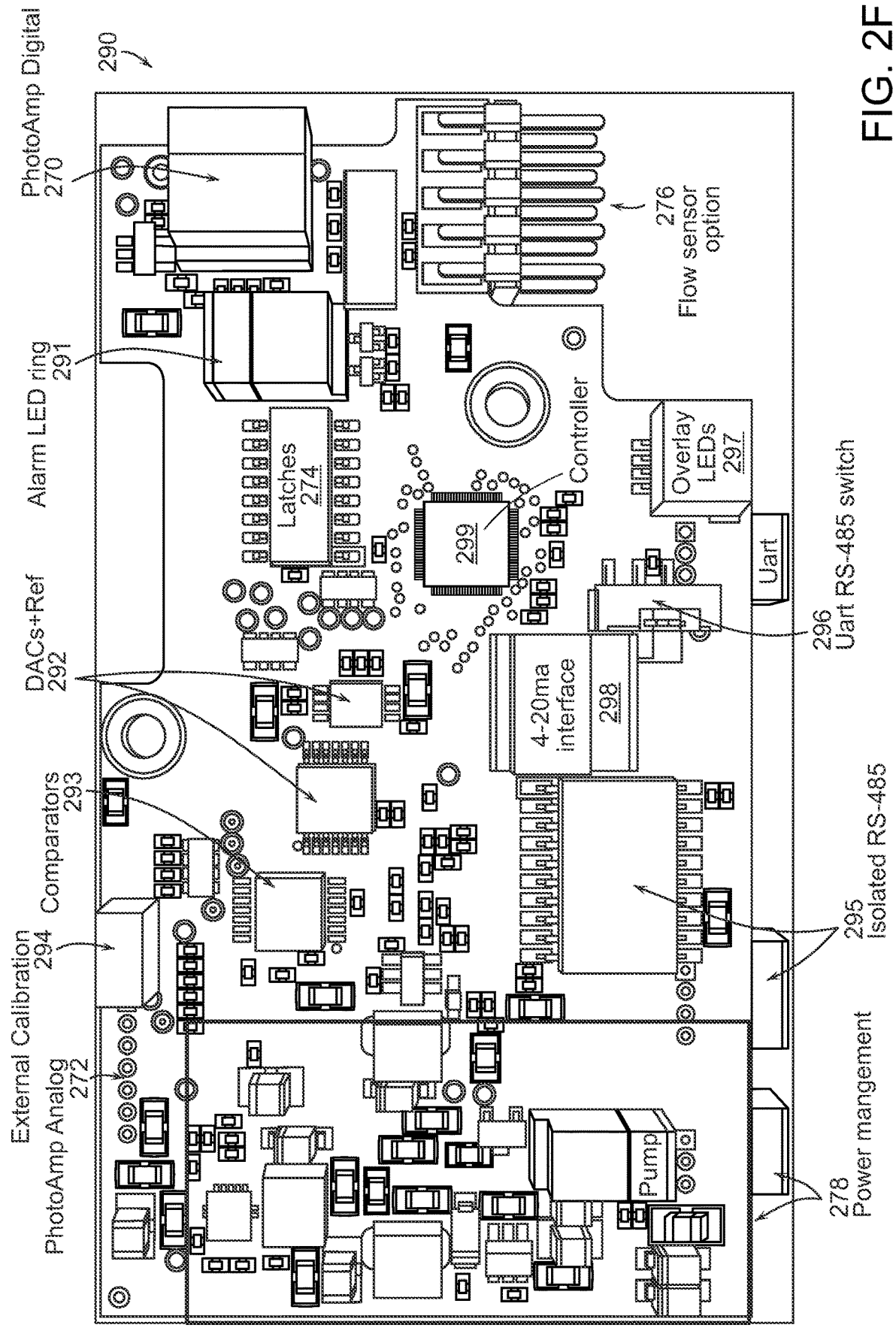
FIG. 2F illustrates a further exemplary circuit board assembly of a core module for an optical particle counter system.

The PCB layout for the counter board shown in FIG. 2F (clockwise from top left) starts with the photo-amp analog input connector 272. Power is provided to the photo-amp analog circuitry over this connector and the high-gain and low-gain and calibration signals are received over this interface. These signals are coupled to the board via passive low-pass filters. An external calibration circuit 294 makes these same signals available to an external calibration system (unlike the circuit boards shown in FIGS. 2A-2D, this board requires particle size thresholds to be calibrated externally). The signals connect to comparators which are also be fed by DACs in order to set the size thresholds). The DACs use a local voltage reference (to improve accuracy), the output of the comparators feed latches to capture events on all the size channels for each pulse. The alarm LED ring 291 is used to convey instrument status visually to users or operators near the instrument. The photoamp digital interface provides for a communication channel to the photo-amp allowing control of the laser and retrieval of status and health information. There is a header to receive an optional flow sensor that can provide airflow monitoring and/or pump-control (either open-loop or closed-loop) via the pump control circuit in the power management section (described later). The microcontroller manages the entire board functionality including the particle counting. A flat-panel connector connects to a couple of status LEDs which can be, for example, embedded within the graphic overlay on an enclosure. There are various output options on this board. A UART interface or an isolated RS-485 interface (selected by a switch) as well as an independent 4-20 interface connector that connects to an optional board that implements that isolated interface (with a 2 channel or 4 channel option).

In FIG. 2G a more functional layout with some of the off-board subsystems is shown. The circuit board blocks show circuit boards, the sub-block show functional blocks and the arrows show the direction of information flow with labels above each arrow (in most places) describing the type of information (which can be data, control signals, status information, etc.). The sub-blocks that are not encapsulated within circuit board blocks are shown as discrete functions not on circuit boards. Note that this block diagram shows is a particular implementation, other implementation where all the components are on a single board (or spread across different boards, but in a similar configuration are envisaged). Also, some items on this configuration, for example some of the auxiliary ports can certainly be excluded from the basic concept without impacting the core idea.

The basic design of FIGS. 2F and 2G provide basic counter functionality with fewer features than the embodiments of FIGS. 2A-2E. It is intended either as an OEM module to be included in a larger instrument or within a larger manufacturing system with remote control and storage. Below are some of the limitations of this product series:

A maximum of 4 particle channels,
Requires external calibration,
Channels are fixed sizes (can only be changed during calibration),
No real-time clock or onboard data storage (instrument has current value and last value only and relies on external system to provide data storage),
No external environmental sensors,
Reduced maximum particle concentration limit,
No particle concentration or particle mass reporting (only raw particle counts reported),
Limited external outputs (no external header to provide extensive output options).

The counting is implemented on the microcontroller 299 (there is no separate dedicated hardware e.g. FPGA to manage the counting). Once the external calibration 294 is complete, the various size thresholds are written to non-volatile storage (in the controller via Modbus registers). When the board 290 is counting these thresholds are written to the DACs 292 to set the thresholds for each comparator 293. Pulses above the comparator thresholds signal outputs on the comparators that are then latched in hardware. When a pulse occurs the latches are read by the controller and the counts for each channel are updated for that pulse, at which point the latches are reset for the next pulse.

Since the controller implements all the counting it limits the maximum number of pulses per second that can be managed. But, using a reasonably fast controller, having dedicated latches and limiting the processing in the controller interrupt provide reasonable performance (which outperforms competitive instruments).

The two serial interfaces (UART+isolated RS-485, switch selected) implement a Modbus (either RTU or ASCII) that is used to control and monitor the instrument. The registers are split into several sections the operation of which is illustrated in the flow schematic 1500 of FIG. 15B:

User registers: used to configure the instrument by the user,
Sampling registers: used to retrieve instrument status, start/stop sampling and retrieve data,
Diagnostic registers: used to remotely monitor or diagnose instrument state/function,
Calibration registers: write-protected registers used to calibrate the instrument,
Configuration registers: write-protected registers used during instrument manufacture to select various hardware options, etc.

In this embodiment, the registers 1502 serve to enable configuration 1504 to operate with selected board options described in FIGS. 9B-9G, for example. The user registers 1506 configure the instrument for operation, the sampling registers 1508 configure the details for sampling operation and to communicate instrument status functions. The calibration registers 1510 are used to calibrate the instrument as described herein and the diagnostic registers 1512 operate to monitor system status. An optional flow sensor 276 can be connected and used to monitor airflow rate status and optionally also provide open or closed-loop pump control to maintain a target airflow rate. The circuit board accepts a wide input voltage range (7-24 vdc) for normal operation. It converts the incoming voltage to all the required internal voltage rails. A couple of the outputs (RS-485 and 4-20 ma) are isolated from the power supply to avoid ground loop issues in large systems. The basic design in the embodiment of FIGS. 2F and 2G is that the main board encompasses the bulk of the particle counting functionality. This board interfaces with other components to make up an instrument. Some of these components are critical components, like the photo-amp/laser board (and its associated mechanical-optical assembly) and in some cases the air pump and associated pressure (flow) sensor 276. These features can also entail air filters, tubing and fittings for this compact housing modular system. In the case of this exemplary system, these aspects can be implemented in the manifold design (an integral mechanical assembly with internal routing for the airflow that also captures the Venturi and pre-filter and eliminates most of the tubing and fittings in a traditional particle counter). The board controller 299 is connected to a switch 289 that selects between UART 296 or the RS-485 (295) options. The controller 299 further operates DACs 292, threshold comparators 293 that receives analog signals 272 from the light detector board described previously. Channel latches 274 control data output to the controller 299 which stores and/or transmits the data for logging and storage as described previously herein. The flow sensor and controller circuitry 276 and power management circuitry 278 also operate as described previously in this simpler core module circuit board option. This example is connected to a 4-20 ma option board which includes digital to analog converters. The circuit board of FIG. 2F shows the interface 298 to this option board. LED circuitry 291, 297 is used to control status indicators.

Figure 3:
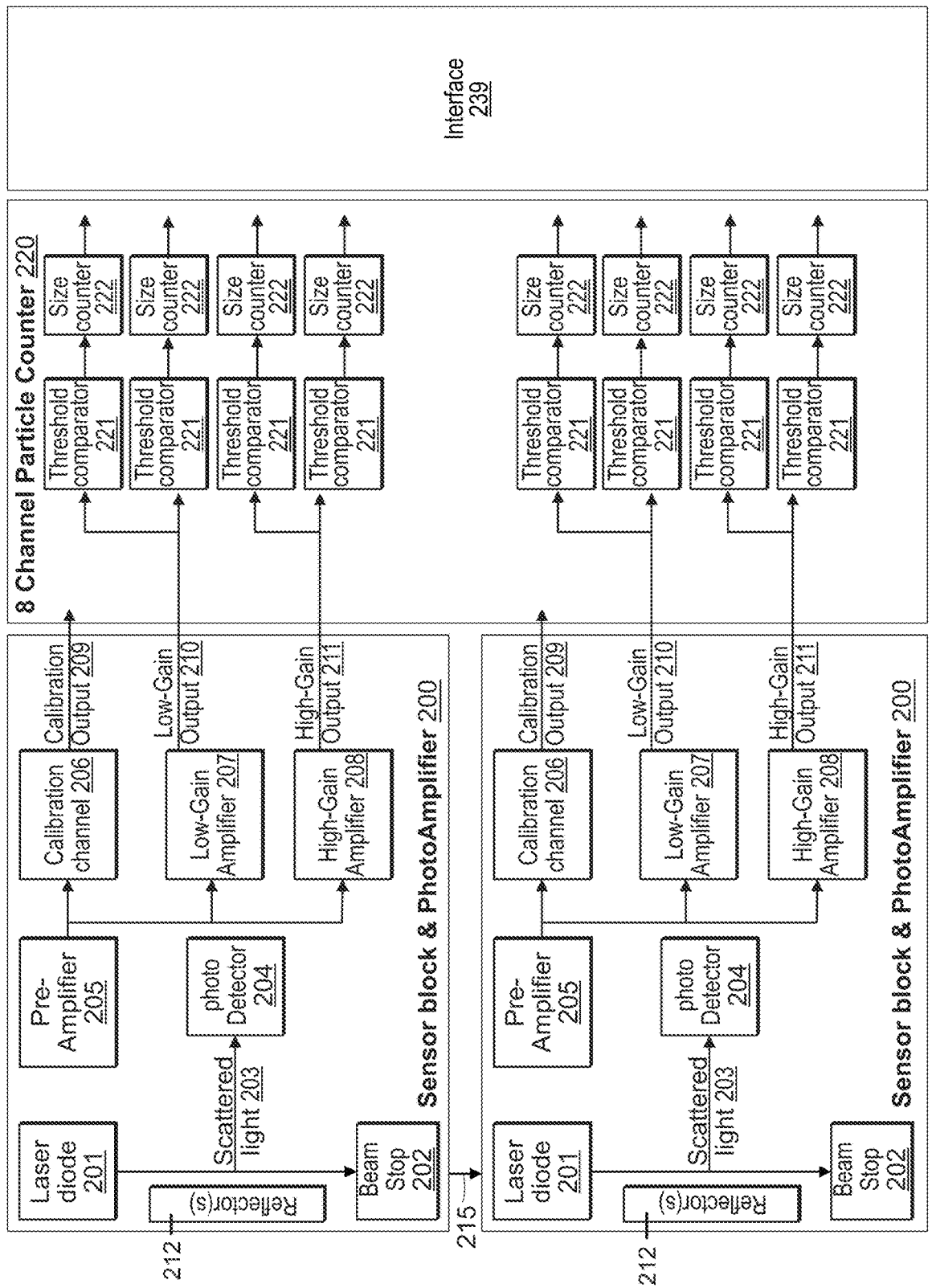
FIG. 3 depicts an exemplary sensor block and integrated counters.

FIG. 3 depicts an exemplary sensor block and integrated counters. FIG. 3 depicts an exemplary eight channel particle counter receive inputs from two sensor blocks and photo-amplifiers, for example. More particularly, FIG. 3 depicts an exemplary eight channel particle counter configuration with two sensor blocks 200 with respective low and high gain outputs communicatively coupled to a common counter board 220 executing eight different threshold comparators 221 and counters 222 to allow counting of eight different sized particles. An onboard interface 239 can facilitate the transmission to the signal processing circuitry such as the FPGA. The system can also enable airflow 215 so that both sensors measure the same flow, optionally at different wavelengths.

Output gain channels can interface to on-board threshold comparators and then to on-board size counters which may be managed and accessed via an external interface. This interface may take a number of forms, from a microcontroller with a type of standard interface such as UART, SPI, I2C, UNIO, PMP, etc. to a custom interface such as a memory mapped I/O interface for an off-board controller. Regardless of the actual interface used, an off-board system may be used to setup and access the counter data for local processing, manipulation, display, etc. or to communicate this data to an external system. An important difference between the preferred architecture herein and previous designs relates to the plumbing and integration of all the external components into a much smaller footprint. The preferred architecture, has an inlet, then the sensor, then an outlet, then a tube, then a Venturi, then another tube, then a pre-filter, then a tube, then a pump, then a tube, then an exhaust filter. Embodiments implement this architecture with an inlet, then a sensor, then an integrated manifold. The manifold includes all those other pieces (outlet, pre-filter, Venturi, pump, exhaust-filter, and replaces all the "tubing" with integrated air channels). In addition to this arrangement, the counter board has been improved to allow up to 30 size channels.

In some configurations, a sensor block has local processing beyond the typical threshold comparator and counter implementation, such that pulse-height is measured for each pulse, and optionally other parameters like pulse-width, time-of-arrival, etc. Such local processing allows the creation of intelligent sensors that have a configurable number of channels, each with configurable thresholds.

In other configurations, the sensors consist of the sensor chamber, the light components, photo-detector and pre-amplifier with everything else being integrated into one or more printed circuit boards.

Figure 4:
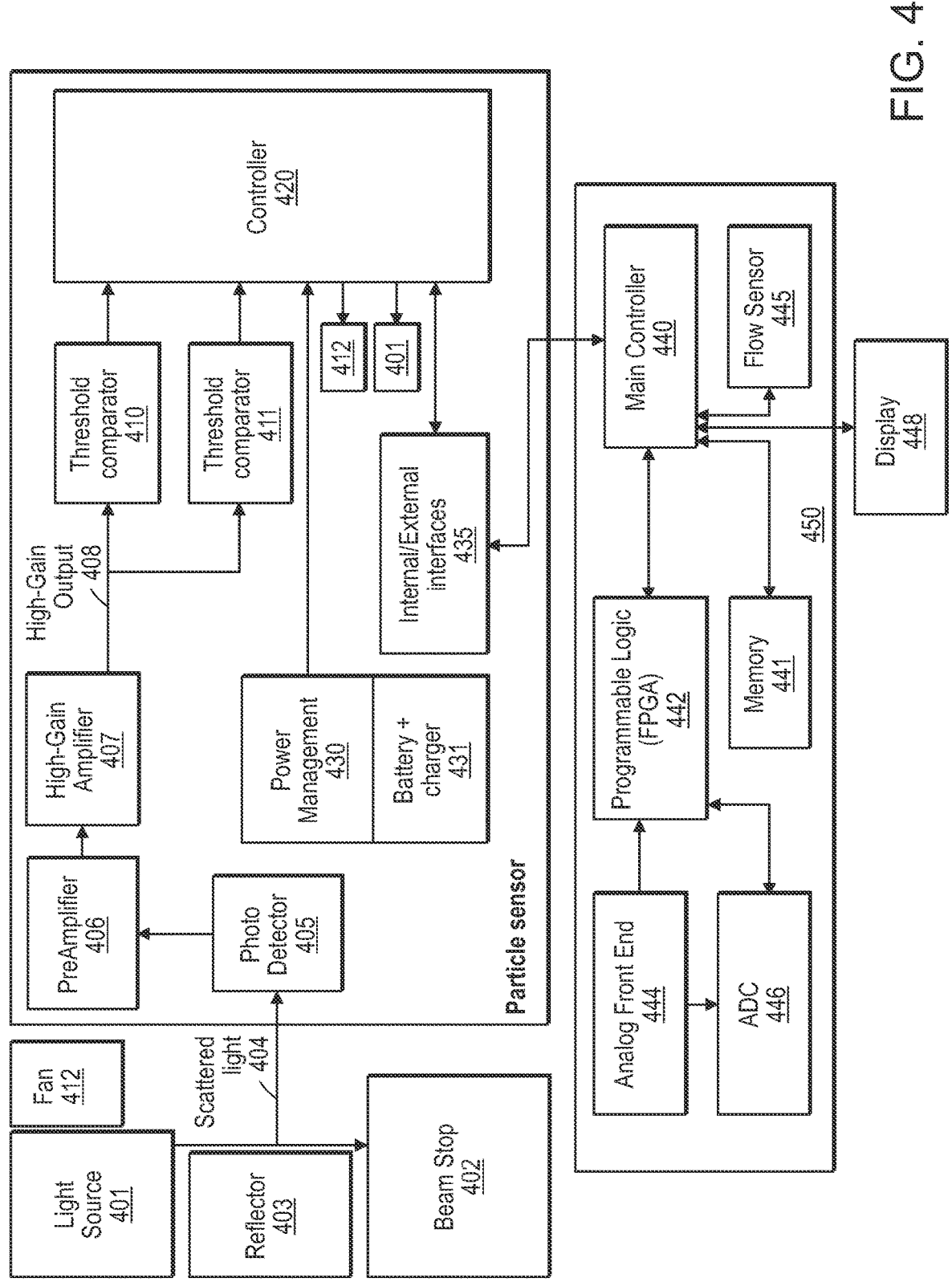
FIG. 4 depicts a further exemplary particle counter sensor equipped with a microcontroller.

FIG. 4 depicts a further exemplary particle sensor equipped with a microcontroller 420. In the optical particle counting device 400, air is passed through a light beam generated by a light source 401 where particles scatter light 404. The airstream is generated by a fan or blower 412 or some other air impeller where air is drawn or pushed into the enclosure and is routed in such a way as to pass through the beam. The light source 401 may be a laser diode, a light-emitting-diode, or the equivalent. The light is focused by a lens to create a ribbon of light through which the airstream passes, in order to provide controlled scattering of light by particle size. Alternatively, in another implementation, a light blocking system is utilized, in which a beam is presented to a photo-diode and particles obscure the beam as they pass through it, thereby providing the signal based on how much light is blocked. In the case of the depicted light-scattering system. Light scattered by particles in the stream 404 gets reflected by a reflector 403 and presented to the photo-detector 405 and the resulting signal is amplified by the pre-amplifier stage 406, such as a trans-impedance amplifier. A second amplifier such as high-gain amplifier 407 may also be utilized and the resulting electrical signal 408 is used to drive one or more threshold comparators 410, 411. The outputs of the threshold comparators 410, 411 are used as inputs to counter channels within the microcontroller 420 which also controls operation of the fan 412 to control the flow and pulsing of light source 401. These particle counts are used to determine the quality of the air. In the depicted configuration, there are two separate channels, which may be setup to count particles of two different sizes.

The particle counting device 400 is powered locally by a battery 431, which is charged from some external power source. A large number of charging techniques are possible including, but not limited to: an external power connector, power from an external wired interface, wireless (inductive) charging, a solar cell, local charging from energy harvesting means, etc. The battery power is managed locally via a power management circuit 430 that provide regulated power to the on-board circuitry (including the analog circuits (amplifiers, comparators, etc.)) and the digital circuitry (microcontroller, internal/external interfaces).

Figure 11A:
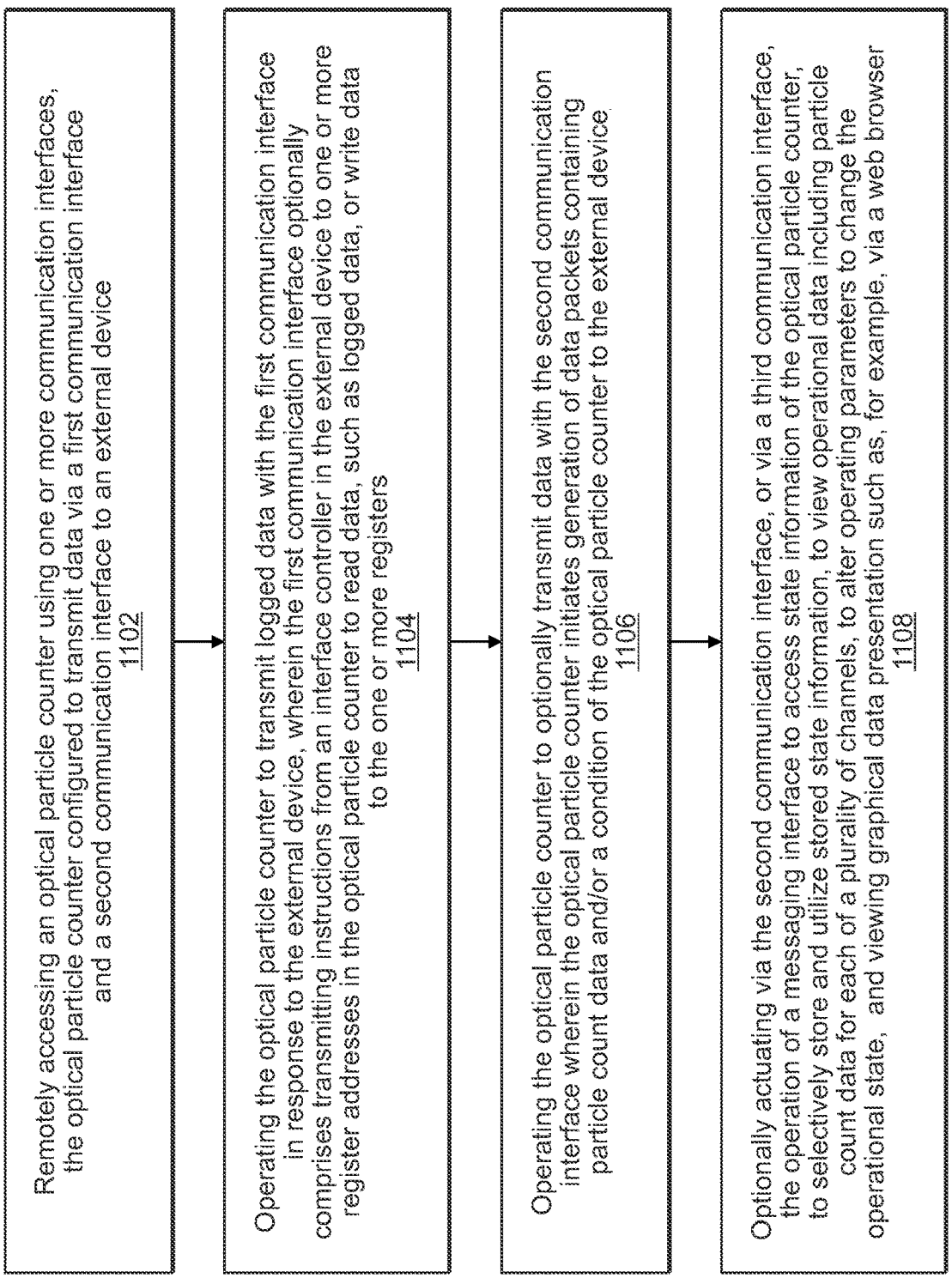
FIG. 11A depicts a process flow diagram for communicating data via a plurality of communication interfaces in an exemplary embodiment.

Internal/External user interfaces 435 are communicatively coupled to the microcontroller 420. The Internal/External user interfaces 435 may include one or more of: an on-board or separate display, liquid-crystal-display (LCD) or other type of display 448, to display current air quality status, air-quality over time, cumulative particulate mass, graphs, charts, etc. or other air quality information; an on-board memory 441 (volatile or non-volatile) to store or log historic air quality data (for display use or later retrieval and reporting or analysis); an on-board eccentric-rotating-mass (ERM) motor, to provide vibration to alert or interface with user; an on-board audio transducer, to provide sound to alert or interface with user; one or more push-buttons on-board, to interface with user; an on-board wired interface channel for communication with external devices; an on-board wired interface to allow the battery to be charged; and/or an on-board wireless communications interface channel for communication with external devices. The device can be a single circuit board or separate boards 450. A second controller 440 can manage operation of a flow sensor 445, display 448, FPGA 442, analog front end 444, and ADC 446. The system can communicate with external devices as described herein using one or more communication interfaces and utilize a shared memory as described in connection with FIGS. 11A and 11B.

Figure 5:
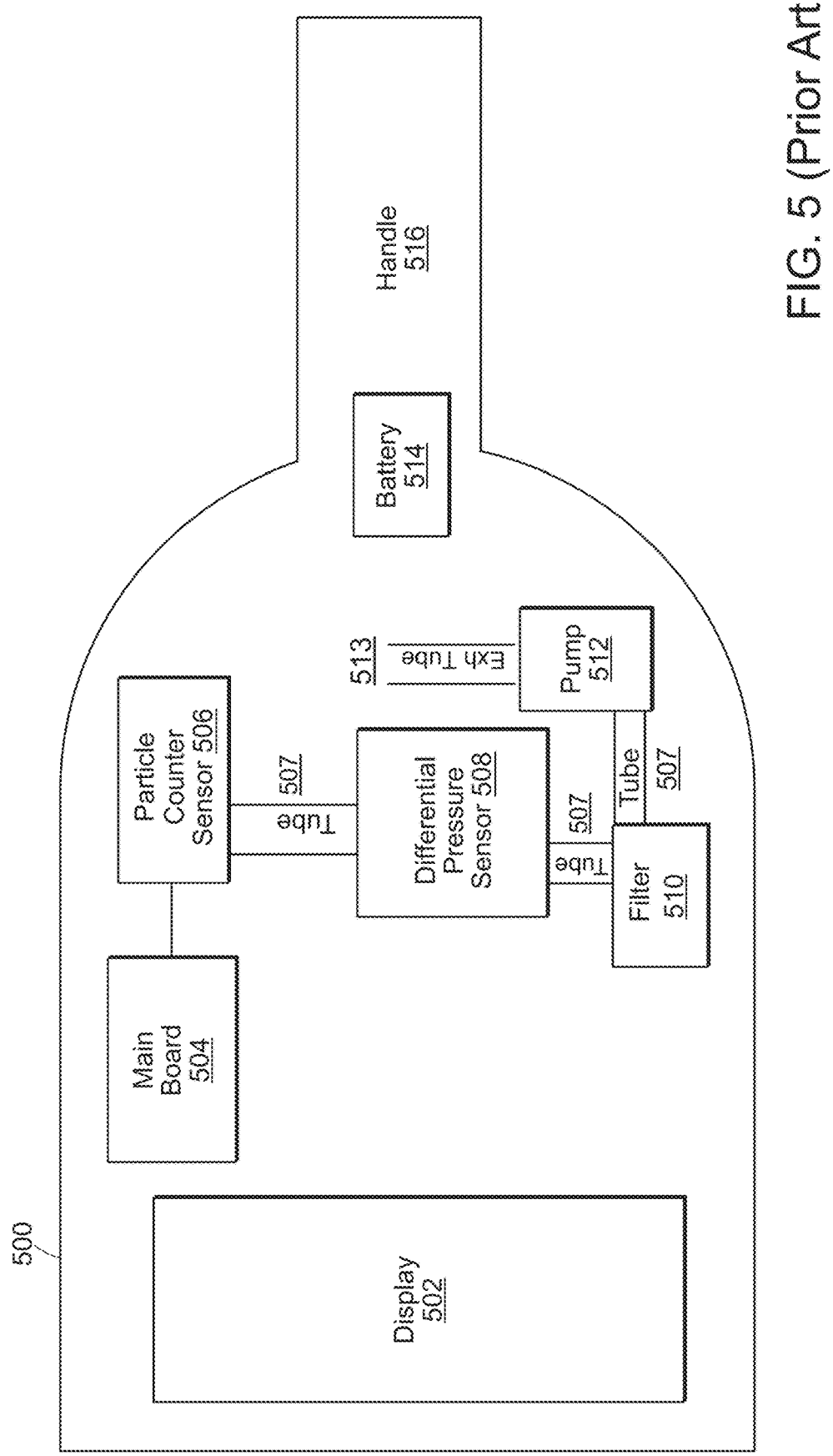
FIG. 5 (prior art) depicts an interior view of a personal particle counter.

While the above-described configurations provide adequate functionality, they do so by utilizing a large number of components that require a large form factor and require full interface support. For example, as depicted in FIG. 5, a typical existing particle counting instrument such as the depicted personal particle counter 500 includes one or more main boards 504 and a sensors, 506, 508, multiple tubes 507, a Venturi, filters 510, a pump 512, fittings, display 502, battery 514 and handle 516, etc. This arrangement makes these systems bulky and more challenging to fit into a small compact package or to OEM the product. Embodiments provide a more efficient design that improves functionality while decreasing size of a particle counting apparatus and limiting the number of required interfaces.

Embodiments concentrate the core components necessary for particle counting into a module that manages all of the particle counting. The redesign drops the overall cost through a more streamlined design that includes not having to support all the potential interfaces on the counter main board and instead only provides the required interfaces on attachable system boards. By combining many of the counter components into a small monolithic module, replacing the tubing and integrating components into an injection-molded manifold, the new design sheds significant cost, volume and weight.

In one embodiment the module comprises a single counter board which includes a microcontroller and a main header interface which enables connection to a variety of different plug-in system boards. This architecture enables the formation of different types of complete instruments or may be provided as an OEM module to integrators to use in their systems or products. For example, the system board could provide support for Modbus and USB outputs along with a power input. Alternatively, the system boards may provide support for other functionality such as WiFi, or a display and user interface, battery management, etc. This approach of supporting additional functionality on the system boards essentially decouples the particle counting from application development.

Figure 6:
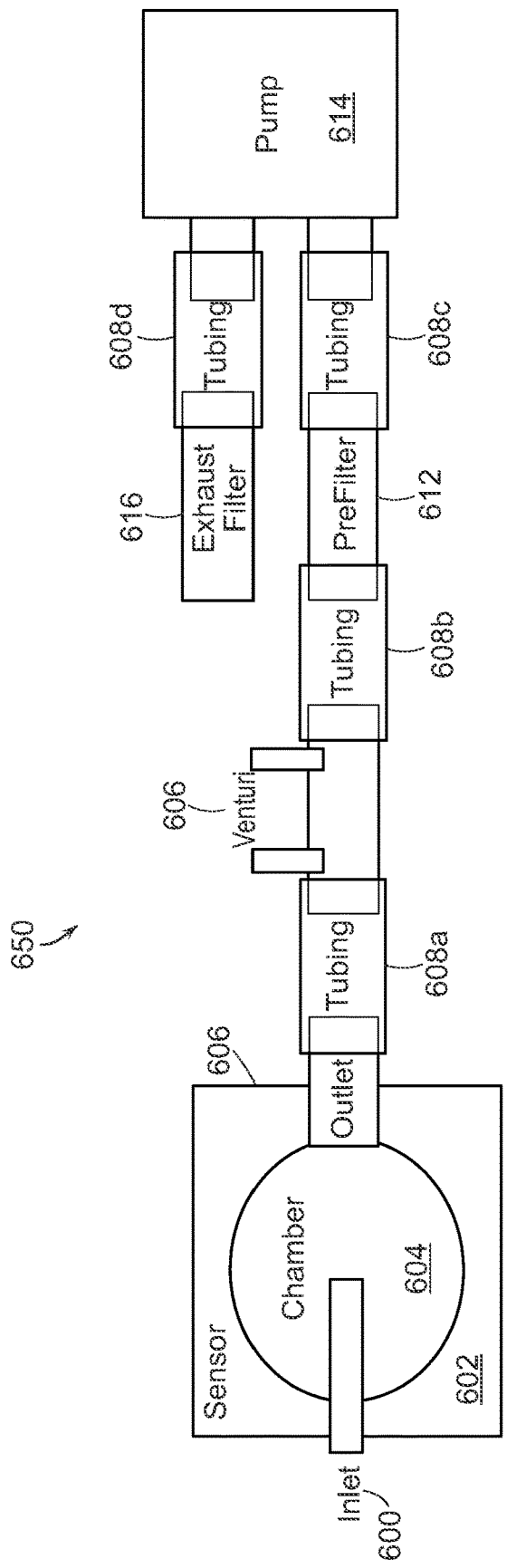
FIG. 6 is a block diagram of a configuration of components for a modular optical particle counter in an exemplary embodiment.

FIG. 6 is a block diagram of an example configuration of components for a modular optical particle counter in an exemplary embodiment. The modular optical particle counter 650 includes an air inlet 600 to allow air to enter the counter. The inlet 600 directs air to the chamber 604 in block sensor 602. The air traverses a projected beam of light in the chamber 602 and, in a light scattering architecture, particles in the air stream reflect light onto a photodetector (e.g. a photodiode) in the block sensor 602 that generates electrical signals representative of the size of the detected particles. The light projection may be provided by a laser diode or other light projecting mechanism as described herein. The signals are amplified, compared in a threshold comparator against a threshold value and provided to a microcontroller on the control board for counting. Once the air traverses the chamber, it exits via outlet 606 and enters tubing 608a. Tubing 608a leads to Venturi 610. The air passes through Venturi 610 which creates a differential pressure across its ports which is monitored by a differential pressure sensor to track the flow rate of air through the modular optical particle counter 650. The identified flow rate may cause an adjustment to the operation parameters of a pump 614 drawing air into, and expelling air from, modular optical particle sensor 650 if the flow rate varies from a pre-determined target flow rate. In one embodiment pump 614 is a rotary vane pump. There are a number of factors in choosing the flow rate. In a manufacturing environment it is preferable to have the flow rate be high enough to provide robust detection of particles in the largest size of interest. Since there are relatively few large particles, in order to ensure detection, enough sampled air is passed during each sample to have them be represented in that sample. The flow rate is a function of the environment for operating the instrument. In cleanrooms flow rate is often set to 2.83 LPM (0.1 cfm) but in some cases can be 10-40 times that value. In air quality applications where there are typically much larger particulate concentrations air flow can be as slow as $1/10^{th}$ that value. A drawback of choosing a much larger flow rate than is necessary for an environment is that the instrument must count enormous numbers of particulates every second and these can also prematurely clog internal filters. Continuing with the description of FIG. 6, the air exits Venturi 610 via tubing 608b which connects to a pre-filter 612 which keeps contamination from entering pump 614 and interfering with its operation.

In one embodiment, the pre-filter is a mesh cylinder which offers a large surface area, which increases the runtime between cleanings (in dirty environments). There may be a clip on the end of the manifold to provide access to the pre-filter so it can be taken out and cleaned (or replaced). From pre-filter 612 the air enters tubing 608c and then enters pump 614 which is controlled by the system in order to keep a desired airflow rate in the modular optical particle counter. The manifold is mounted to the mounting plate, as is the sensor and the pump. The ports of the pump are pressed into the manifold and have O-rings to provide a seal. The air then exits the pump via tubing 608d. In one embodiment, the air exits tubing 608d to exhaust filter 616 before being returned to the environment that is being sampled. In another embodiment, the air may exit directly to the environment. Preferred embodiments eliminate one or more of the tubing elements 608a, 608b, 608c, and/or 608d. Such embodiments provide a more compact configuration in which the Venturi 608 input flow is coupled directly (i.e. without a tube) to the output port 606 for the optical detection chamber 604, the venture output is coupled directly (without a tube connector) to a pre-filter (first filter) 612, which is coupled directly (without a tube connector) to the pump (or airflow actuator) 614, which can be coupled directly (without a tube connector) to exhaust filter 616. It should be appreciated that the modular optical particle counter sensor and other components described herein may be at least partially encompassed by a device housing.

In an embodiment, a Venturi is integrated into a manifold that is directly connected to the outlet of block sensor. The manifold in this case is sealed against the block via an O-ring and fastened in place by two screws. This eliminates the need for a separate outlet from the chamber and for tubing to the integrated Venturi which follows.

In a further embodiment, instead of using a Venturi or in combination therewith, a differential pressure sensor may be used to detect a differential pressure across the sensor block.

Figure 7:
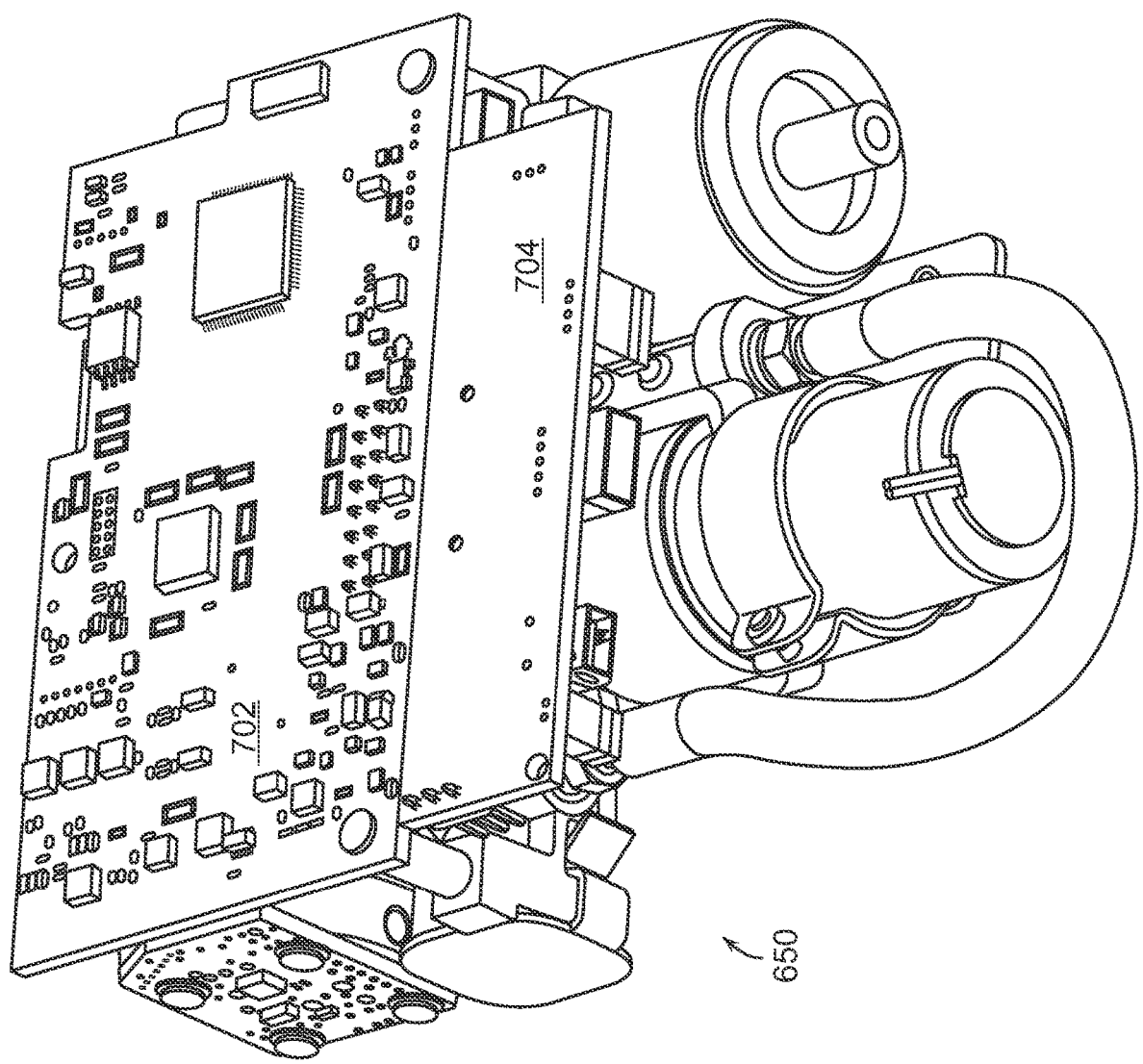
FIG. 7 depicts an external view of a modular optical particle counter in an exemplary embodiment.

FIG. 7 depicts an external view of a modular optical particle counter in an exemplary embodiment. In FIG. 7, the counter circuit board 702 is connected to system board 704. System board 704 includes support for Modbus and USB outputs along with a power input. Various configurations of counter circuit board 702 and other alternative configurations for system board 704 are discussed further below. The laser is mounted to the backside of the printed circuit board and once it's aligned, screws lock it in the position of the laser in X-Y, the barrel beneath that board can be moved in/out to allow alignment in the Z axis.

Figure 8:
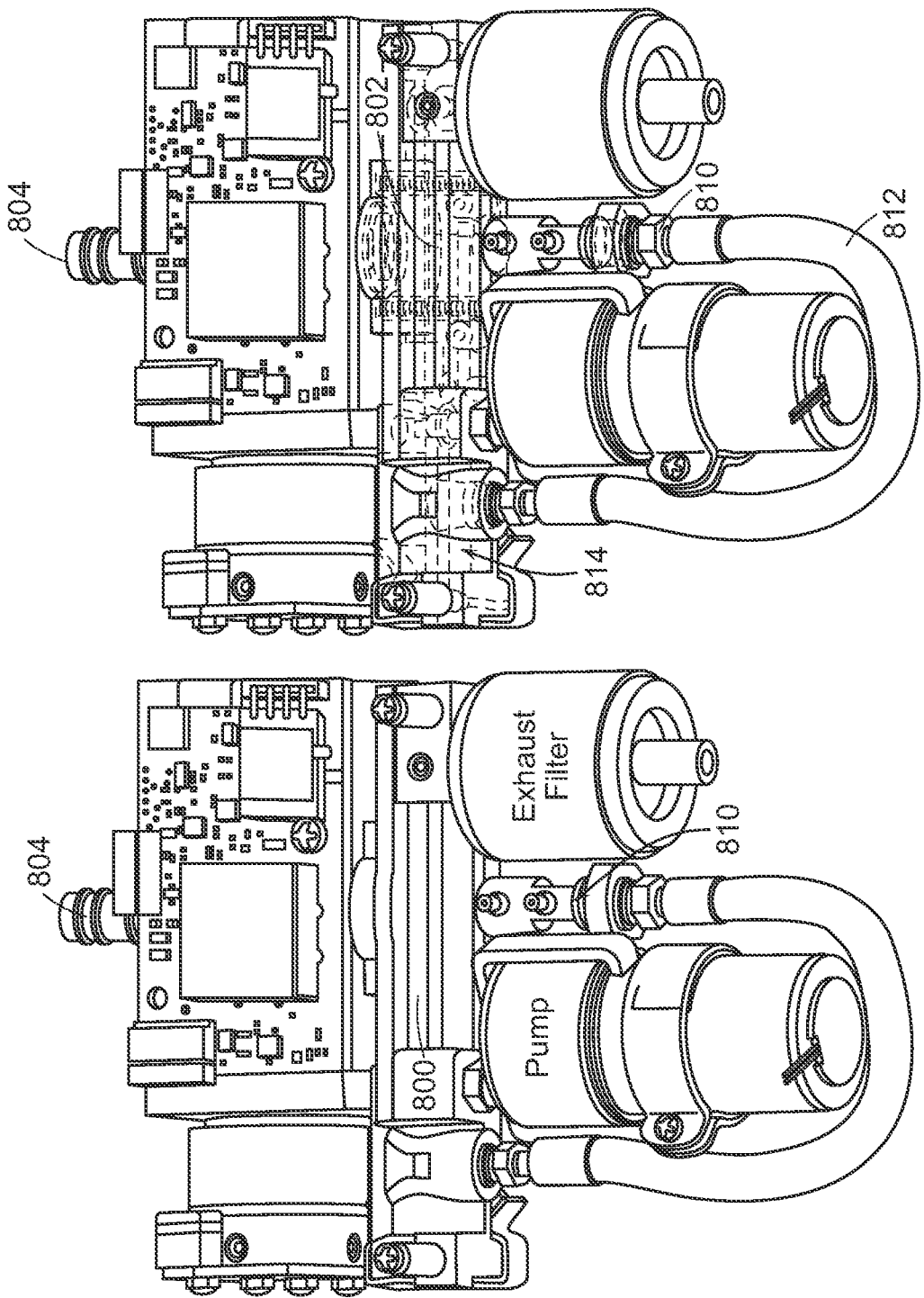
FIG. 8 depicts alternative views of a manifold in a modular optical particle counter in an exemplary embodiment.

FIG. 8 depicts two views 800, 802 of a manifold in a modular optical particle counter in an exemplary embodiment. More particularly, FIG. 8 provides two views of a modular optical particle sensor with the second view 802 depicted with a transparent manifold to allow a view inside. In operation, the air enters the inlet 804 at the top of the figure and transits through the sensor block where particle detection takes place before exiting the sensor at the bottom. The manifold 800, 802 is sealed against the block via an O-ring and fastened in place by two screws. From the Venturi 810, the air traverses a fitting 811 and a tube 812 that returns the air to the manifold 800, 802 for entrance into a cylindrical or other pre-filter 814. In another embodiment the tube 812 be integrated into the manifold 800, 802 to eliminate the exterior tube and the associated fittings.

Figure 9C:
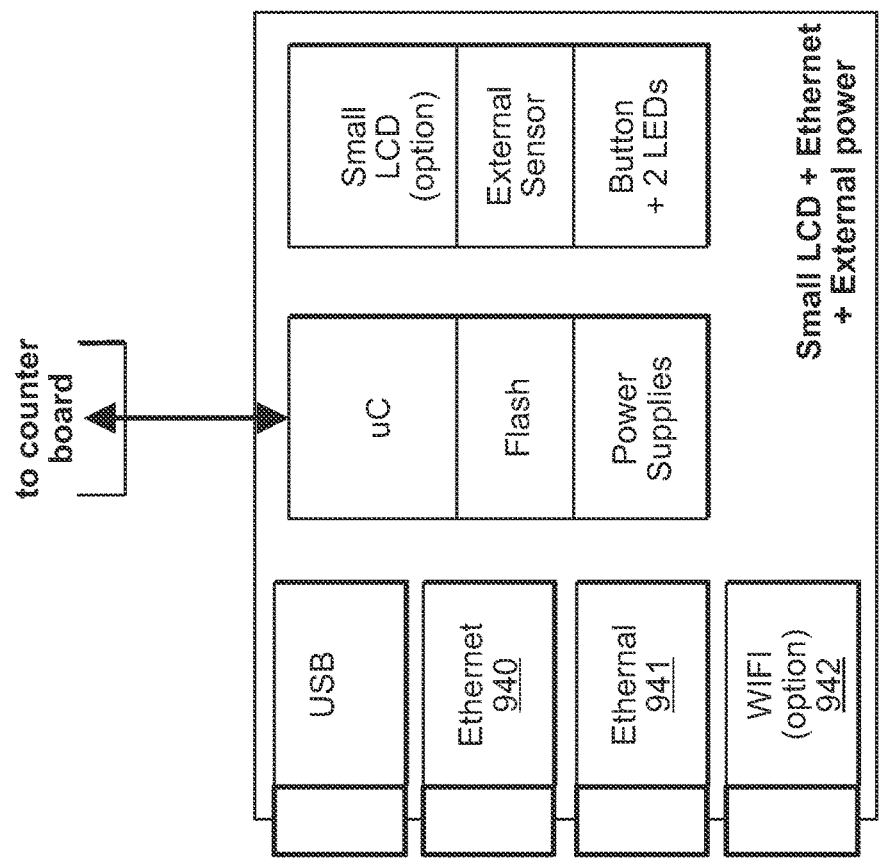
Figure 9B:
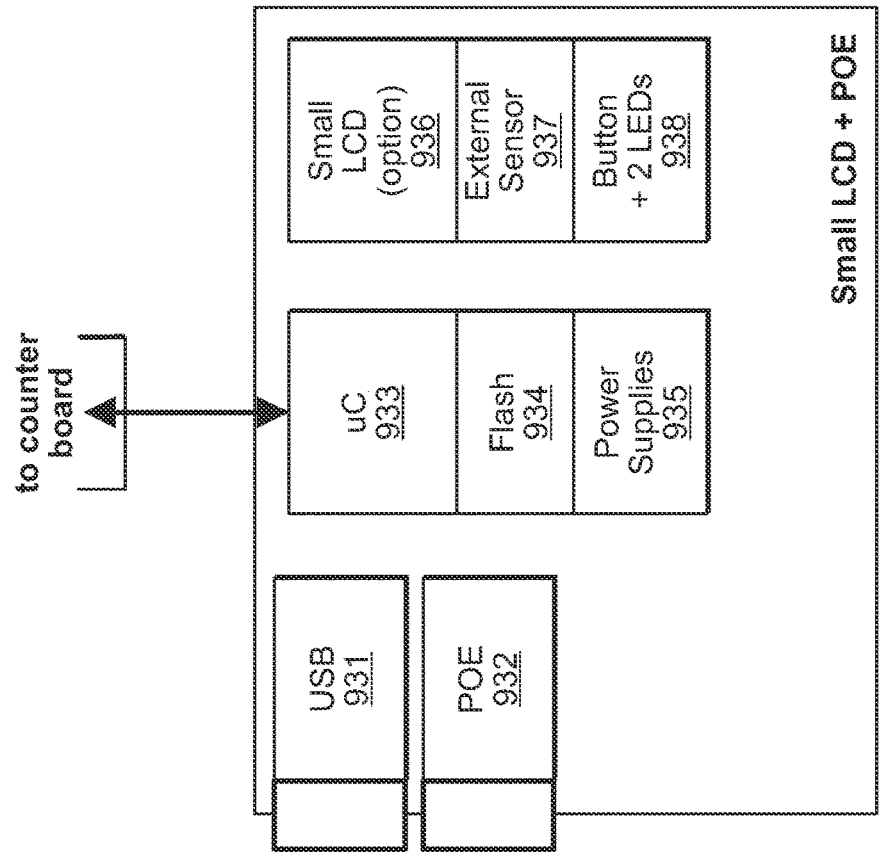
Figure 9E:
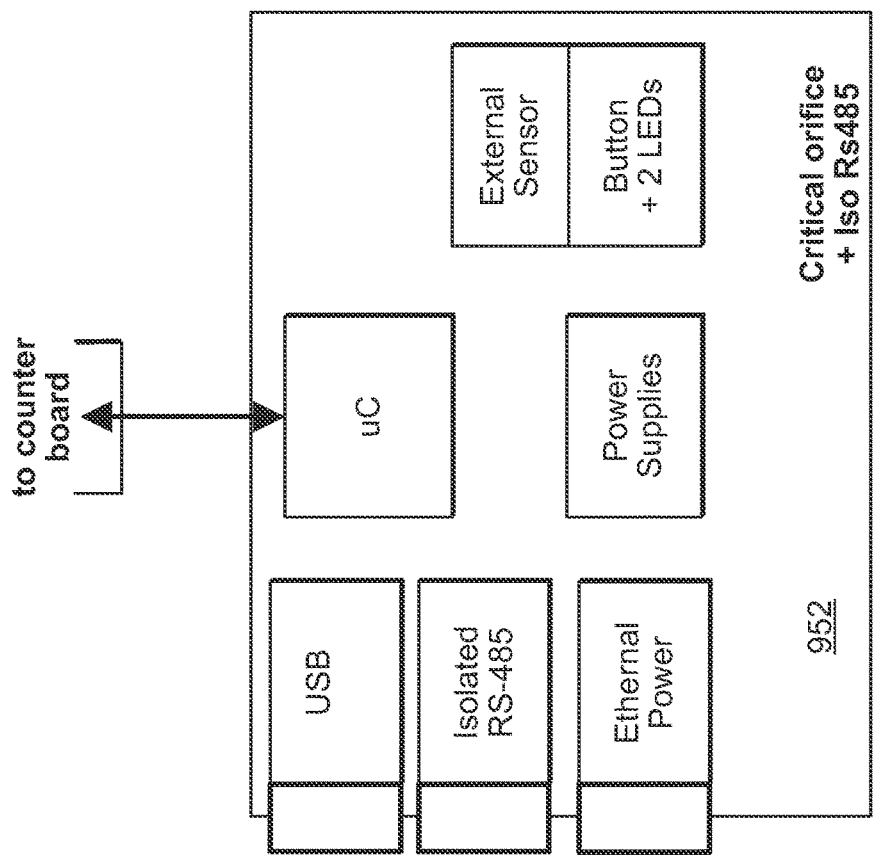

FIGS. 9A-9I depict a counter main board and additional system boards in exemplary embodiments. FIG. 9A depicts a counter main board 900 that works in conjunction with a photo amplifier, laser and sensor 920 to detect and count particles of varying sizes. Photo amplifier, laser and sensor 920 are operable to project light to detect particles in an incoming air stream in the modular optical particle counter as described above. The counter main board 900 includes a microcontroller 902, Real Time Clock Counter (RTCC) 904, Field Programmable Gate Array 906, and Analog Front End (AFE) 908. The counter main board 900 also includes external sensor user interface 910 and a DC Pump Interface 912. In some embodiments, the header connection on the counter main board 900 may support communication UARTs=>COM, USR, XSNS and PMP. FIG. 9A shows the main counter board and photo-amp. This provides the core functionality (everything needed to count particulates, bin them into multiple channels and provide the data in a variety of formats (raw counts, concentrations, mass estimations). To this can be added a large variety of option boards or circuit modules that can be connected to the base unit (core module) so as to add additional functional features or data sources as described generally herein. FIGS. 9B-9I provide a number of these possible options. It should be appreciated that the depicted options are not exhaustive and other options can be provided. A user can plug one of these options boards into the header on the main board to provide external functionality (typically communications of some sort, and/or a user interface, and/or power management with a battery, charger, etc). The microcontroller 902 receives amplified electrical signals generated by the sensor block in response to particle detection, allocates the signal to a size channel, and compares the incoming signals to the predetermined threshold values held in threshold comparators. In some embodiments, the microcontroller may support 30 or more size channels. Signals meeting the threshold result in the increment of a counter for the designated particle size/type. The RTCC 904 is used to track timing of signal receipt/particle detection. The FPGA 906 is used for routing of particle count signals to the analog front end 908. The AFE 908 may amplify the incoming signals and provides an interface for the signals to the microcontroller after conversion to digital signals. The external sensor user interface 910 is used to route sensor data to the controller 902. The DC pump interface 912 provides a connection to control pump 614.

FIGS. 9B-9I depict additional system boards used to extend the functionality of counter main board 902. For example, FIG. 9B supports universal serial bus (USB) 931 and power over Ethernet (POE) 932 ports, may include a microcontroller 933, Flash memory 934 and its own power supplies 935. The system board may also include a small LCD 936, an external sensor connector 937 that can connect a hybrid environmental sensor that can measure CO2, temperature, relative humidity, barometric pressure and optionally, volatile organic compounds (VOC) The sensor can also measure other gases, or some other parameter that can be read by the instrument and recorded as auxiliary data for each sample. A button and two LEDs 938 provide a user-interface, status LED (sampling/not sampling) and optionally an alarm or error LED. The button can either be used to acknowledge an error or start/stop sampling. Similarly FIG. 9C may include all the components of FIG. 9B except that it switches POE connection 932 for Ethernet connection 940 and adds connections for external power 941 and a WiFi chip 942. For optical particle counter systems incorporating one or more additional environmental sensors as described herein, the system can have several low power operating modes or states. In typical operations, if there is a sampling time delay of 15 seconds or more, for example, the system will shut down the light source (e.g. laser or LED) to save power and extend operating life of this and other components. The user can also select to shut off one or more other sensors during the sampling time delay period. There may be a further sleep mode where on-board power supplies are also shut down for a selected delay period in which a memory stores the time delay wherein a wake up signal is transmitted to restart the power supplies to resume a selected sampling rate and period.

Figure 9D:
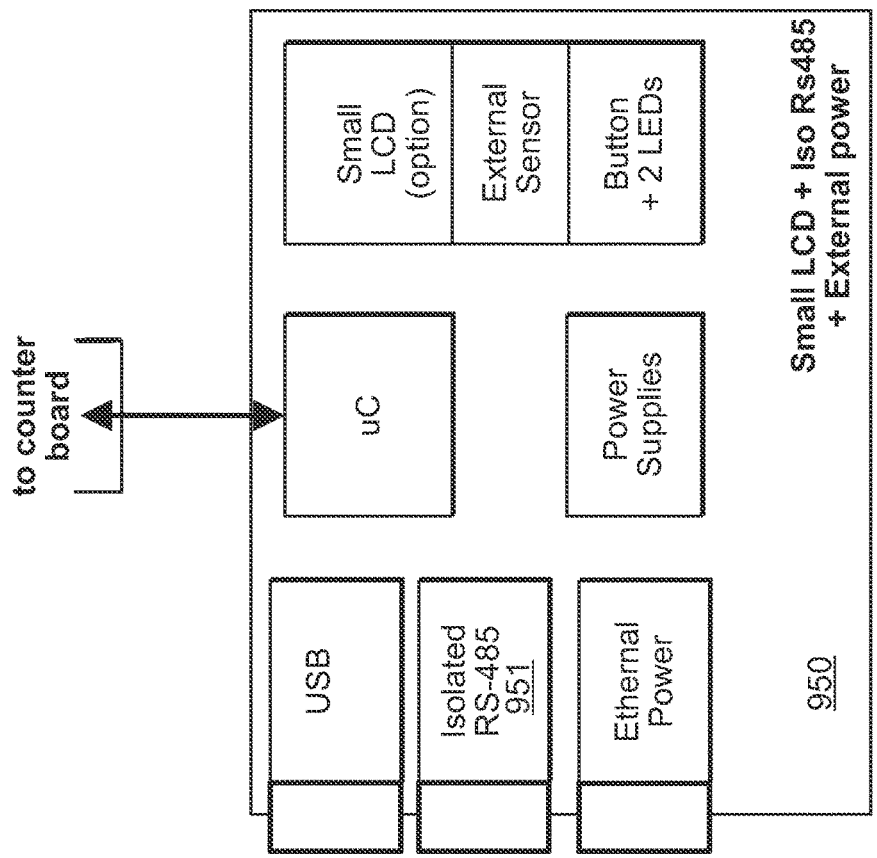

Likewise the system board 950 in FIG. 9D adds a digital data interface, an isolated RS-485 interface 951 (in combination with an external power connection and small LCD). The system board 952 depicted in FIG. 9E adds a critical orifice to go with the isolated RS-485 interface. The critical orifice simply describes a configuration where there is no pump. Instead the pump is replaced by an orifice with specific dimensions such that if the instrument is connected to a vacuum pump (of sufficient pressure) it will limit the air flow mechanically due to the orifice (like a rocket does when taking off, the orifice limits the flow from the nozzle so that there is controlled thrust). These various option boards can all have a critical orifice instead of a pump.

Figure 9G:
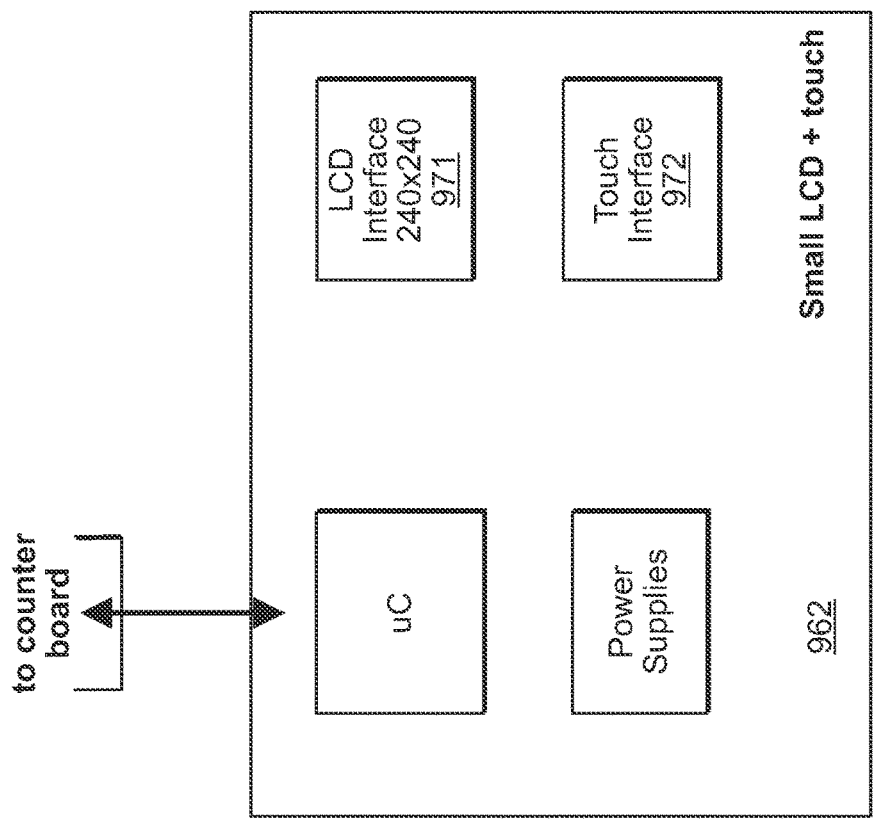
Figure 9F:
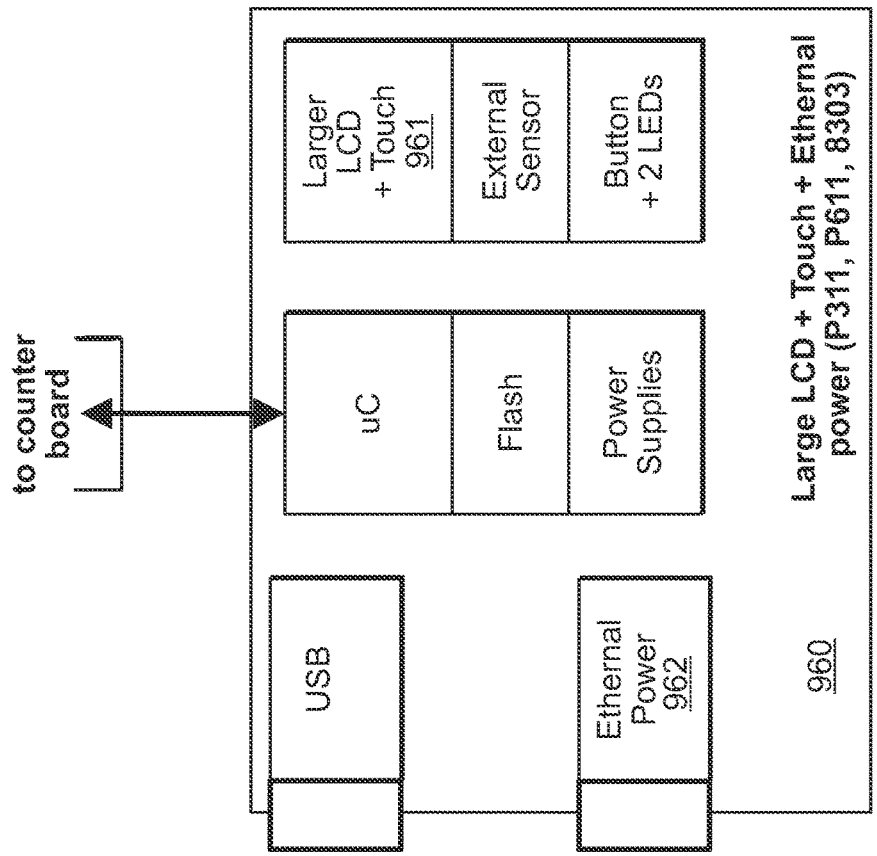

In contrast, on the system board 960 of FIG. 9F, a larger LCD with touch screen capability 961 replaces the small LCD and additional external power connections 962 (e.g. P311, P611 and 8303) are provided. Alternatively, the system board 970 depicted in FIG. 9G provides a smaller LCD interface 971 (e.g. 240×240) to go with a separate touch interface 972.

Figure 9I:
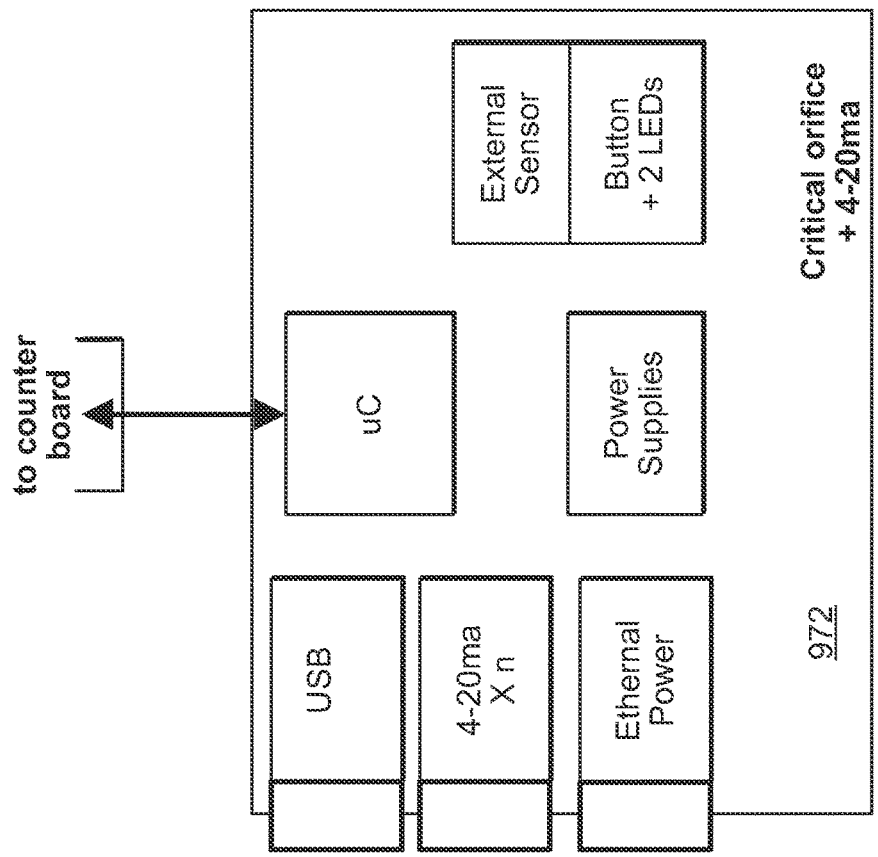
Figure 9H:
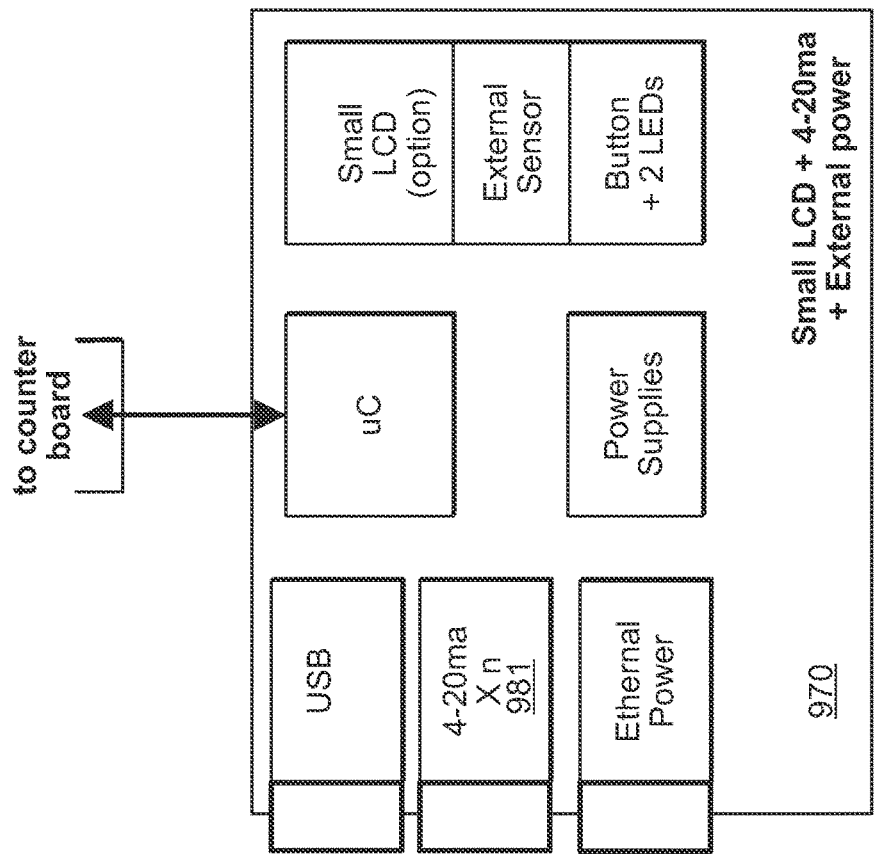

The system board 980 depicted in FIG. 9H adds a 4×20 ma signal transducer 981 that provides an analog output In this case some or all of the channels drive separate 20 ma current outputs. These types of signals are often used with building automation systems (since they are simpler to integrate and provide some inherent noise immunity) in combination with a small LCD and an external power interface. In FIG. 9I, the system board 990 includes a critical orifice that may be added to the 4×20 ma signal transducer.

FIG. 10 depicts a sequence of steps for using a modular optical particle counter to detect airborne particles in an exemplary embodiment. The method begins by operating a pump to draw in a stream of air into a modular optical particle counter that includes a counter main board and a manifold with an integrated Venturi (step 1002). A beam of light is projected from a laser diode through a chamber in a block sensor of the modular optical particle counter (step 1004) and reflected light from particles in the stream of air passing through the beam are detected with a photo detector (step 1006). An electrical signal is then transmitted from the photodetector to a threshold comparator for comparison to a threshold value, the signal representing a size of a detected particle (step 1008). Based on a successful comparison, a counter associated with a particular particle size is incremented (step 1010). Data from the counter is transmitted via an interface on the counter main board to a plug-in system board for further processing (step 1012). A command is also transmitted to adjust operation of the pump to adjust the flow rate of the stream of air through the modular optical particle counter when a differential pressure sensor determines that a differential pressure of the stream of air across the Venturi fails to meet a pre-determined value (step 1014).

Existing particle counters can be standalone units with a display and a user interface that operates remotely such as by downloading data to a computer via a USB memory stick or cable. Some particle counters (with and without displays, etc.) can also be connected via a communications port to one or more external devices. Preferred embodiments employ methods 1100 of using a plurality of communication interfaces as shown in the process flow diagram of FIG. 11A.

Some existing particle counters are only intended to be run as remote units in that they are completely idle unless controlled remotely. Most such counters allowing such remote units to reside on a communications network operate with all of them being controlled by one host controller. The control interface can use a Modbus control protocol, for example. The Modbus protocol is a register-based protocol in which each particle counter is given a unique Modbus address and the host controller interfaces with each counter by providing the device address and a register address that it either reads from, or writes to, to manage communication. Modbus can typically function on an Ethernet network. A register map is provided with the instrument to allow the integrator to design the host controller software to use those registers to control the instrument (writing parameters to registers) or read data and configuration information from the instrument (reading specific registers). The Modbus system generally is a master/slave system which restricts the data formats and the speed of communication. This system does not communicate deviations in the data, for example, which for particle counters can inhibit monitoring and remote control functions. The Modbus format does support data logging functions wherein data is read from one or more register addresses and can also write data to the one or more register addresses, so that a Modbus communication interface can provide useful functions for optical particle counter communications. Thus, the external communication channel can be configured for Modbus (either RTU or ASCII) or a binary message format. The latter can be used to significantly improve bandwidth in moving data from the ACM to an external device. The external device can request large blocks of data (in binary format (removing the need to convert it)) or subscribe to a stream of data from the instrument which is sent as it becomes available, thereby removing the need to poll the ACM to determine when such data might be ready and then retrieving it. This same interface is available over the diagnostic USB port. An auxiliary communication port offers a few additional communication options (one of the options below can be active on that port):

a. Radiosonde (this provides a compressed ASCII record whenever new data is present that is sent as telemetry records during remote collection (e.g. NASA™ balloons)), b. Environmental management board (this binary interface provides a link to an enclosure management board used to regulate outdoor enclosures), c. Serial printer in which an optional link for an integrated or external serial printer is provided to allow printing of records as they become available.

Preferred embodiments of instruments as described herein manage network communication in several distinct processes, including a first communication interface 1102, such as a Modbus interface as described herein, that can read and write data 1104 stored in the particle counter and additionally using a second communication interface that can employ a Java script object notation (JSON) formatted interface, for example, which generally involves pushing JSON formatted data packets 1106 to a user-specified server whenever new data is available. In this second communication interface, a particle counter can initiate a communication by forming data packets to identify or annotate data to alert a remote user operating an external computer device of a condition, such as an alarm condition, to signify that an unsafe condition or that a system failure may occur. Further embodiments can employ a third communication messaging interface 1108, such as a browser interface, that enables the user to employ the instrument's IP address such as a Uniform Resource Locator (URL) and to display the particle counter main screen and/or also to enable a remote user to start/stop sampling, for example, or perform other remote operations as described herein.

Figure 11B:
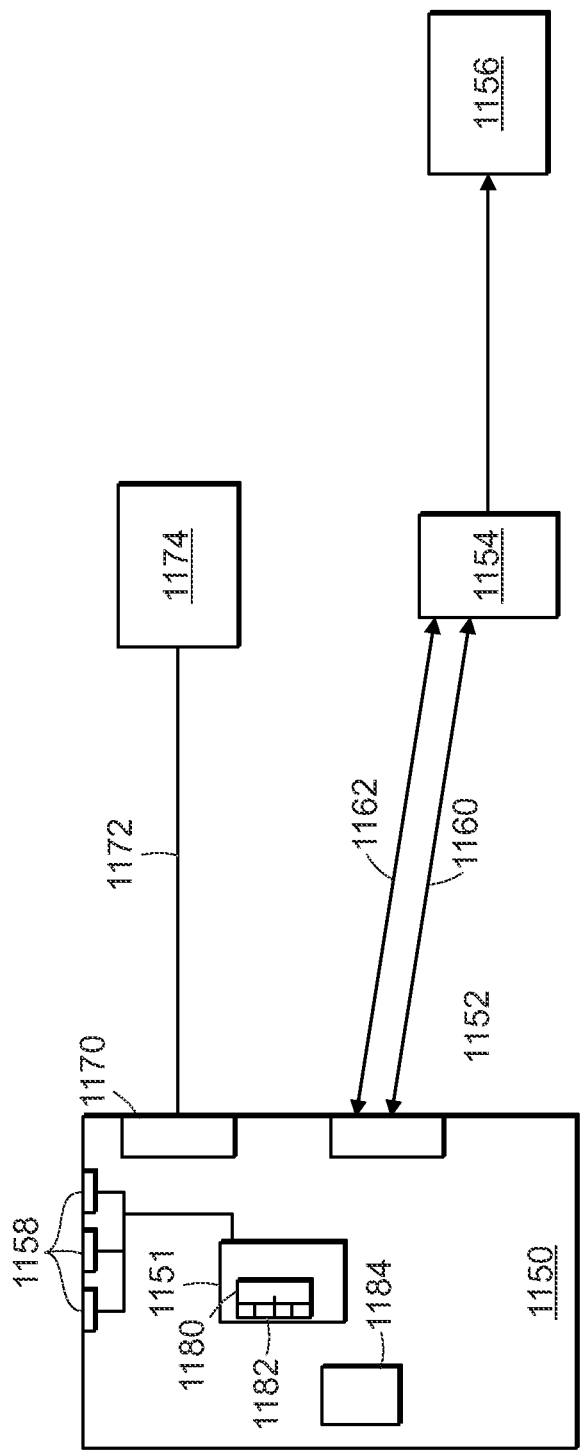
FIG. 11B illustrates an optical particle counter utilizing a shared memory system for a plurality of communication interfaces in an exemplary embodiment.

Further embodiments can employ a messaging interface with the remotely located particle counter instrument(s) that work over the universal serial bus (USB) port and optionally over a serial data port. This messaging interface provides a much more comprehensive interface to the internal structures of the particle counter(s). As shown in FIG. 11B, the messaging interface can run on a dedicated communications channel (or share the existing output communications channel) that is used for various functions including as an external support service and diagnostics with the instrument, a remote support service and diagnostics with the instrument, or one or more external support operations like alignment and calibration, and/or retrieval of statistical information where the system stores different kinds of statistics on the instrument (either over its lifetime or between calibrations). The system can retrieve these values (minimum, maximum and average values for a plurality of parameters) and either let them continue to operate or clear them for the next period. In this embodiment, a system circuit board 1150 such as those described in connection with FIGS. 1-4 herein, can have a controller 1151 connected to an auxiliary interface 1170 that is connected by cable or wireless interface 1172 to an external computer 1174. The controller 1151 can also control operation of an external header 1152 that can have two or more communication connections 1160, 1162 that can connect USB or serial ports to a communication network or server 1154 that can be connected to an external device or computer 1156. The controller can also be connected to, or have embedded therein, a shared memory 1180. Shared memory 1180 can be segmented into discrete segments or addresses 1182 to better facilitate access to a plurality of different programming applications. The different communication interfaces described herein can separately access the same information stored in the shared memory 1180. The shared memory can include a separate memory controller that arbitrates access to the shared memory among different interfaces seeking access to the data stored in the embedded shared memory. A second shared memory 1184 can also be accessed and controlled by controller 1151. The flash storage memory shown in FIG. 2A can also comprise a shared memory (which can include either volatile or non-volatile memory). In certain embodiments, the computer 1156 can be operated by service providers associated with manufacturers or sellers of particle counters that, for example, service the instruments. Computer 1156 can also be used by a remote operator of a network of connected particle counters used to monitor a plurality of locations at a monitoring site such as a building or manufacturing facility. Interface 1160 can be a first communication interface, such as a Modbus interface, the interface 1162 can be a second communication interface such as a messaging interface as described herein in connection with FIGS. 12A-12H. A Modbus system typically operates with registers having first-in-first-out (FIFO) functionality. The controller 1151 can have registers operating as the shared memory as described herein. The controller can optionally comprise an application specific integrated circuit (ASIC) that is configured to perform the control, data management and processing functions of optical particle counters as described herein. Thus, the system can thus employ one or more integrated circuits or a system-on-chip (SOC) architecture to implement a more compact and energy efficient system.

There are thousands of parameters that can be monitored in real-time, plotted, logged, and/or changed via the software to communicate with the particle counters as described herein over a messaging interface. FIGS. 12A-12H illustrate screenshots depicting the graphical user interface implementing the messaging interface software. These illustrate system parameters for system components such as the detector, the laser light source, the pump, the flow rate and the particle count data being acquired for one or more channels.

Thus, in contrast to prior interfaces that take a subset of the instrument internal structures and reformats these, this messaging interface provides direct links to nearly all of the internal structures and allows an unprecedented level of internal access for production instruments.

A production server can be used to provide software updates to the personal computer (PC) software operating with each particle counter so that it can serve as a proxy to pass messages from the interface software. An instrument connected to the software is sent with the instrument setup for remote diagnostics. When in this mode the instrument checks in with the production server and establishes a connection, the interface software can connect to that link and use it to provide the same level of internal monitoring and control that is available through a direct link. This enables an optical particle counter instrument to be accessed via the interface software from anywhere in the world to log data, monitor settings, change parameters, control and/or view operations including sampling modes.

This interface can be used to develop, test, and debug the software, or, during manufacturing, various procedures may use this software as part of the setup process, such as for subsystem testing, subsystem pass/fail/characterization, etc. During production, the instrument is calibrated using this interface, and enables the user to take a "snapshot" of all the settings in an instrument before shipment. Thus, the default or preset parameters, or parameters specified by the customer, can be recovered to the exact configuration in the event this becomes necessary to reset all or a portion of the instrument operations.

When intermittent issues arise prior to shipment to a user or in the field where the instrument is used, the logging feature allows the user to capture detailed data (many parameters) over an extended period for analysis in finding root cause issues of any deviations in performance that are encountered. During instrument service, the messaging interface can take a "snapshot" of instrument settings before attempting any changes and restore such settings afterwards, or restore the production snapshot to recover original settings that were stored in memory. The "snapshot" can be referred to as the initial or current operational state of the operating parameters of the device. A change in one or more operating parameters is a change of operational state. A snapshot results in the storage of the current operating parameters at a memory address such that a user can later retrieve the stored operational state at a specific time and date and reset the state of the particle counter to the previously stored operational state. The operational state can include the thresholds defining the plurality of particle size channels that are operating on the device. During service, the technician can verify the configuration, remotely control the instrument and observe various runtime values to diagnose issues or problems. If there is an issue that the user can identify and indicate where the problem is, a notation is generated on a report (RMA) to point service technicians to the problem when the unit arrives at a service location.

Figure 12A:
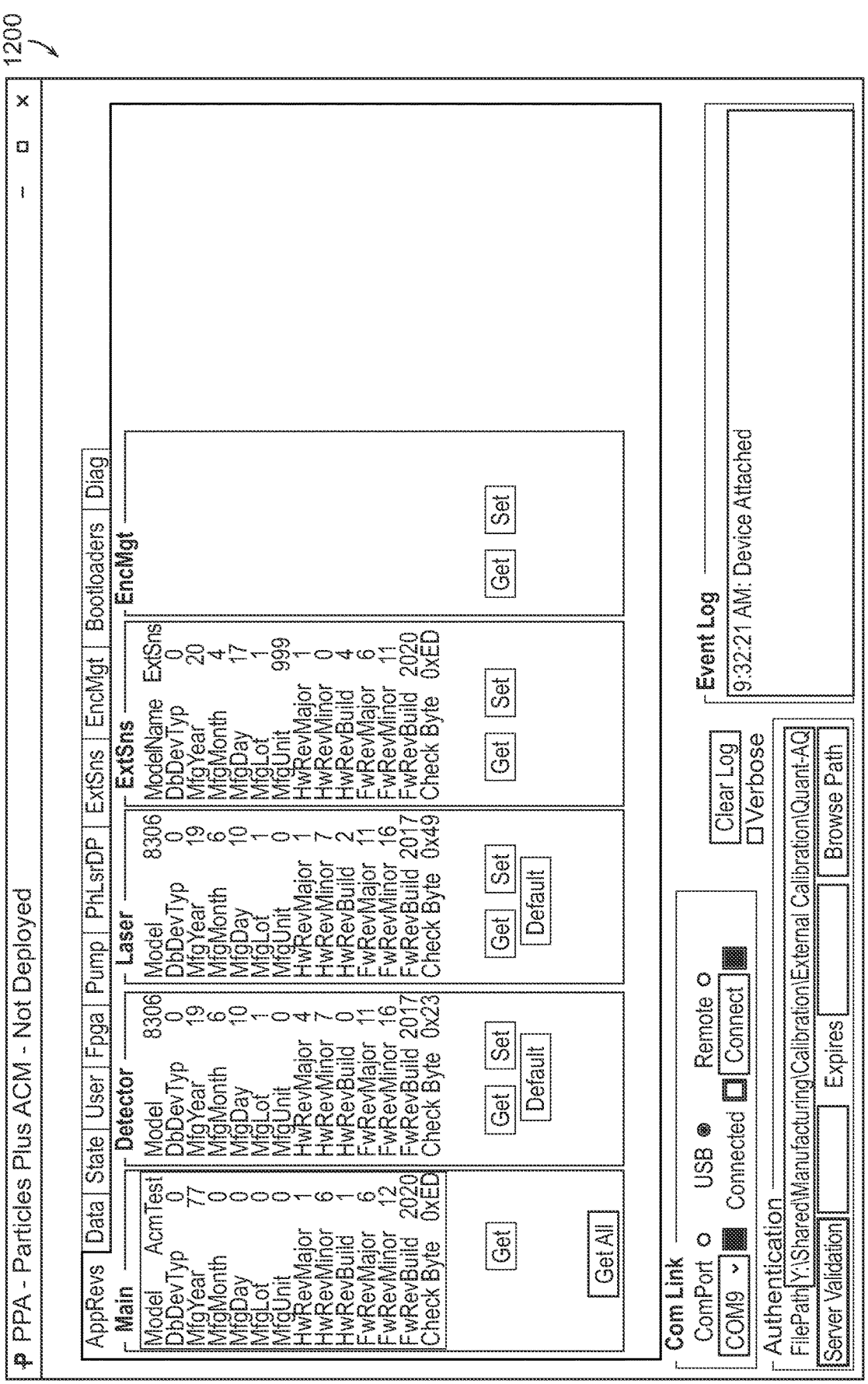
Figure 12B:
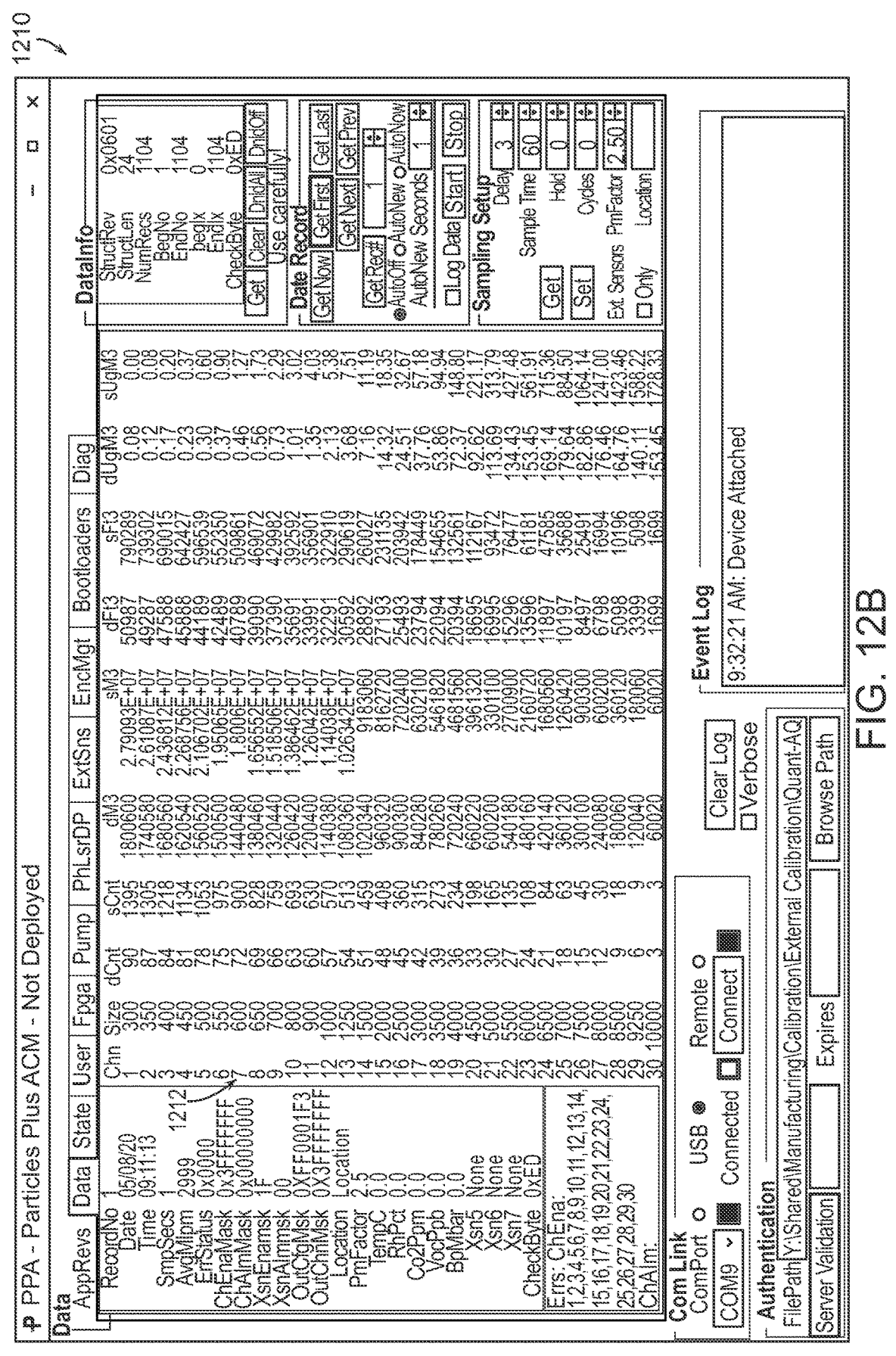
Figure 12C:
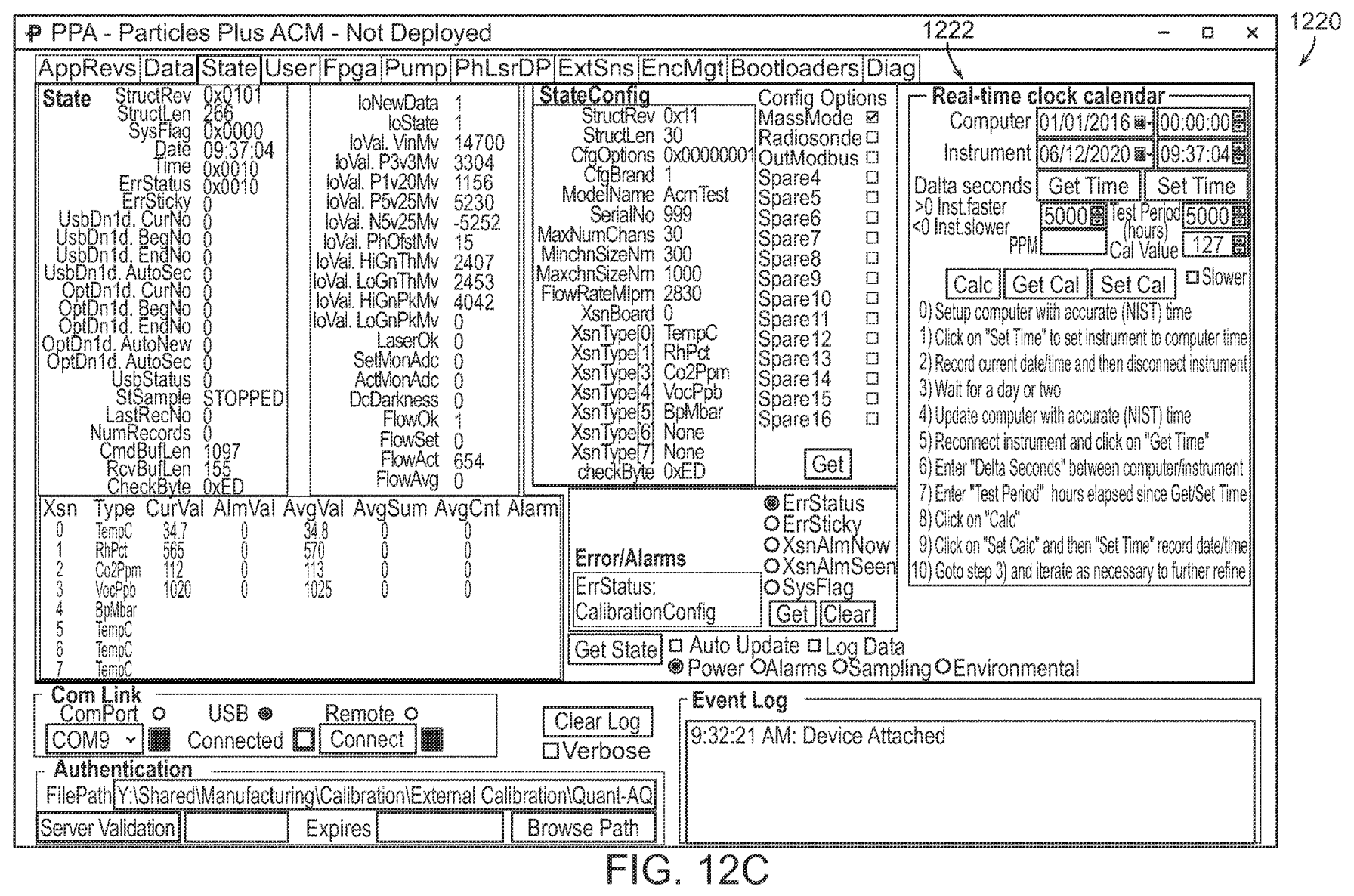
Figure 12D:
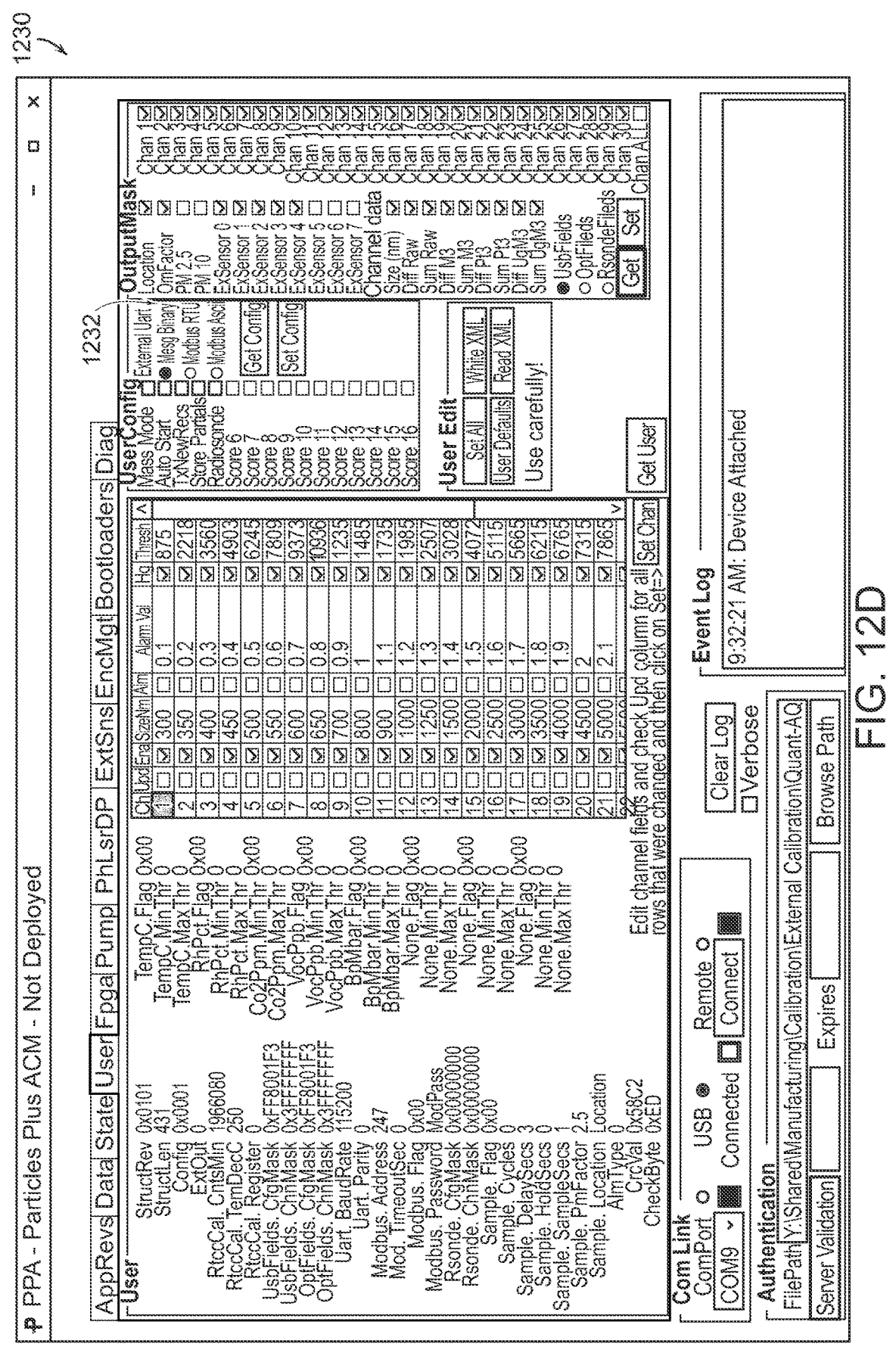
Figure 12E:
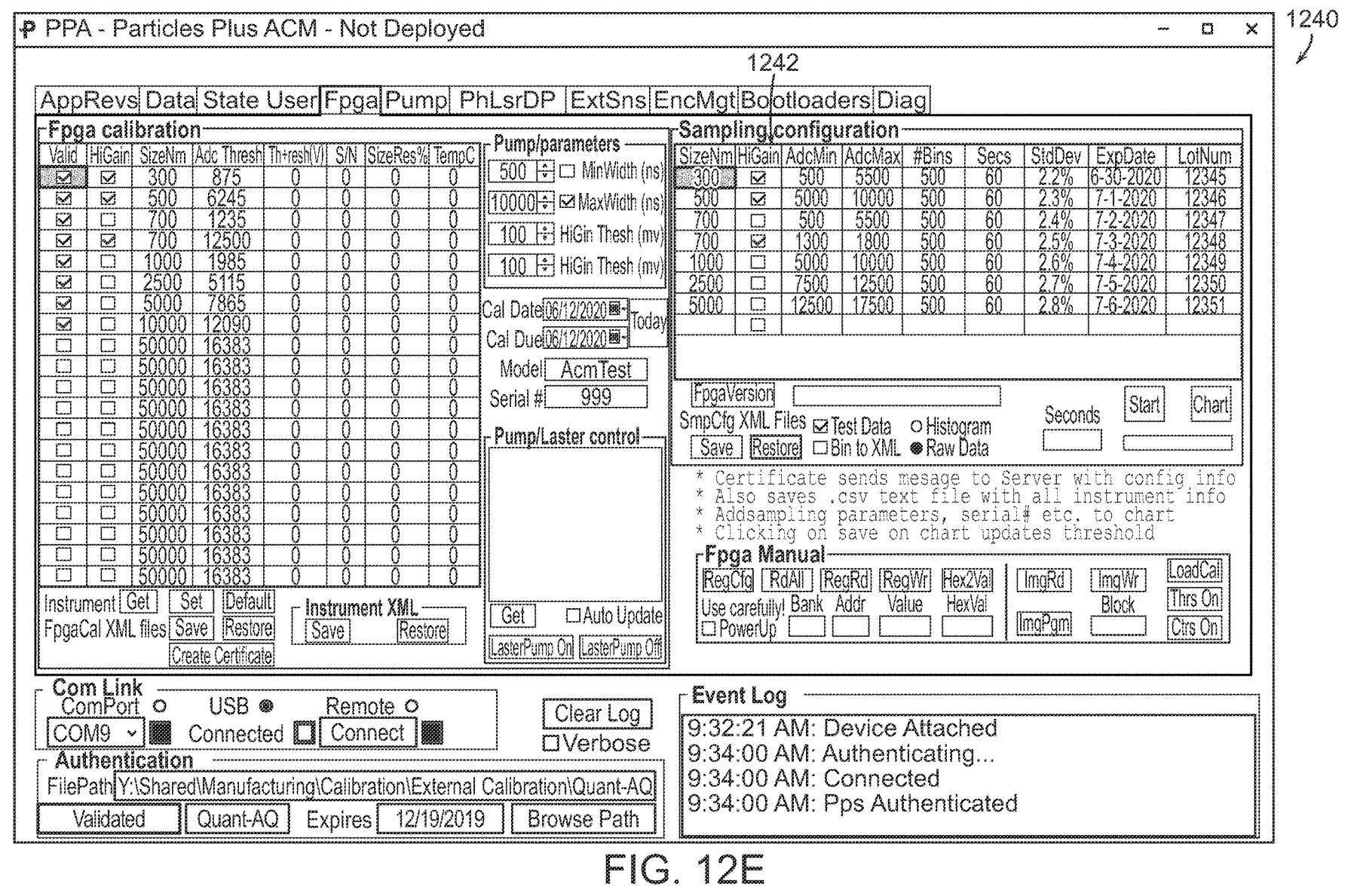
Figure 12F:
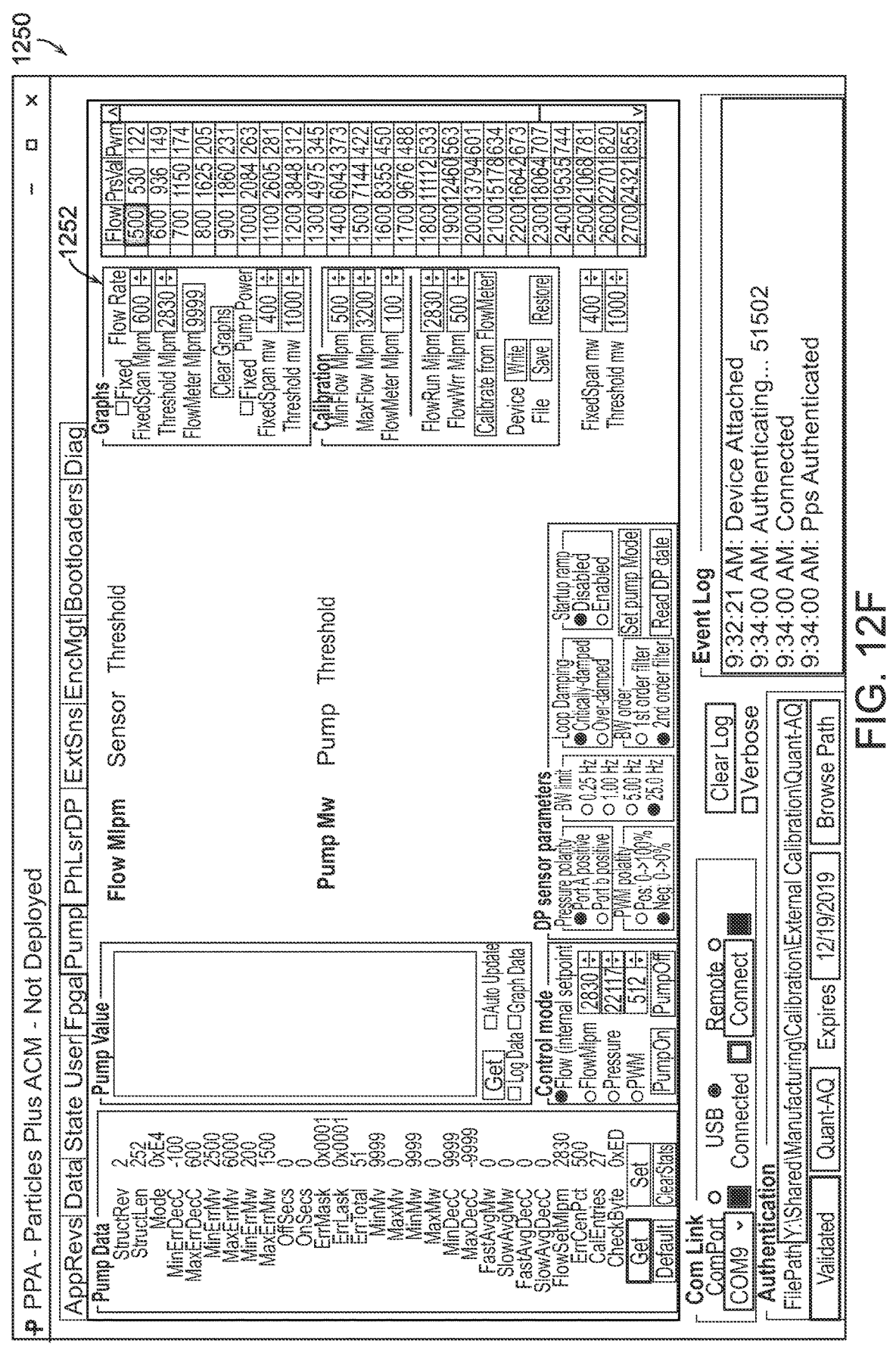
Figure 12G:
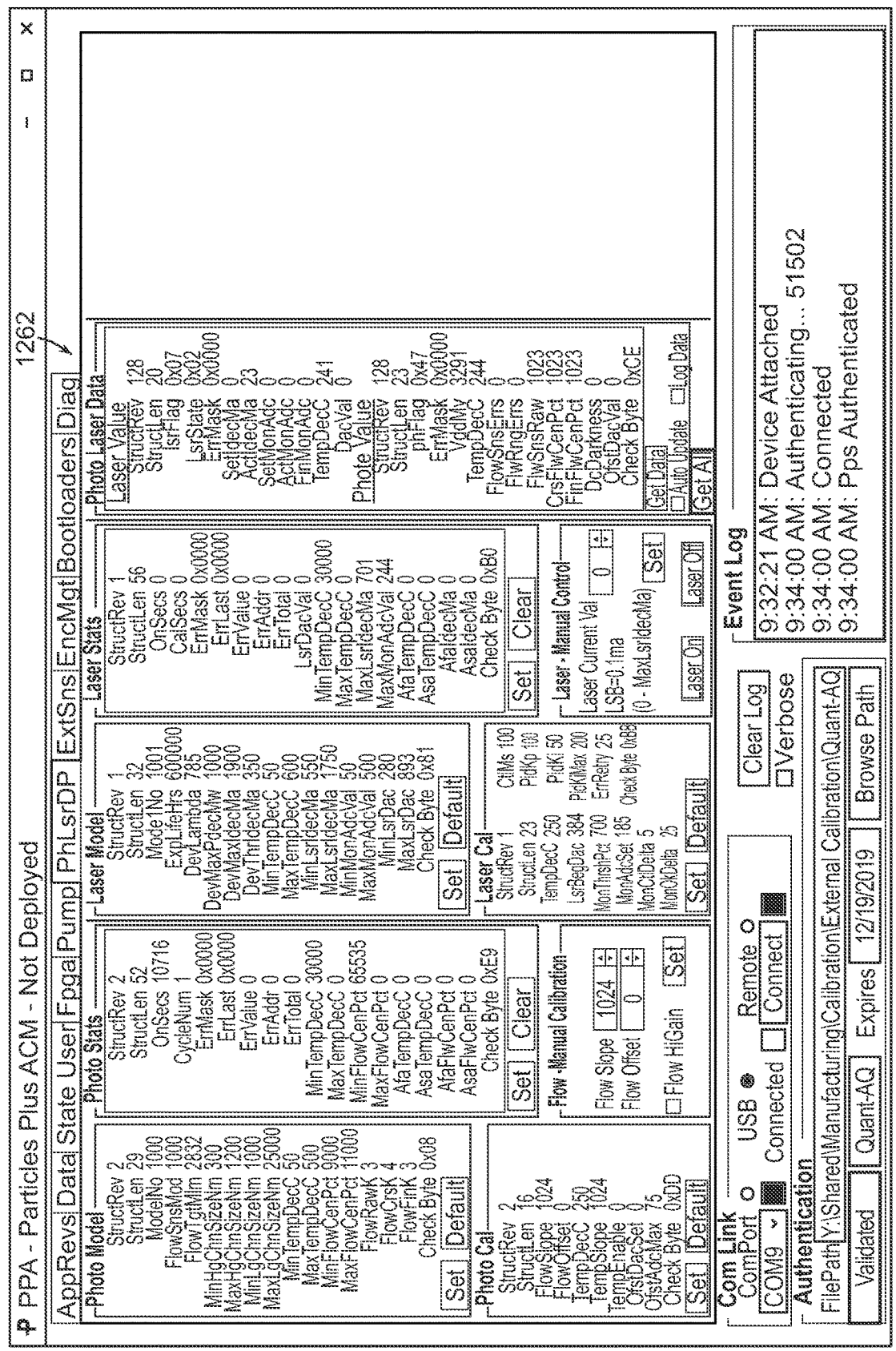
Figure 12H:
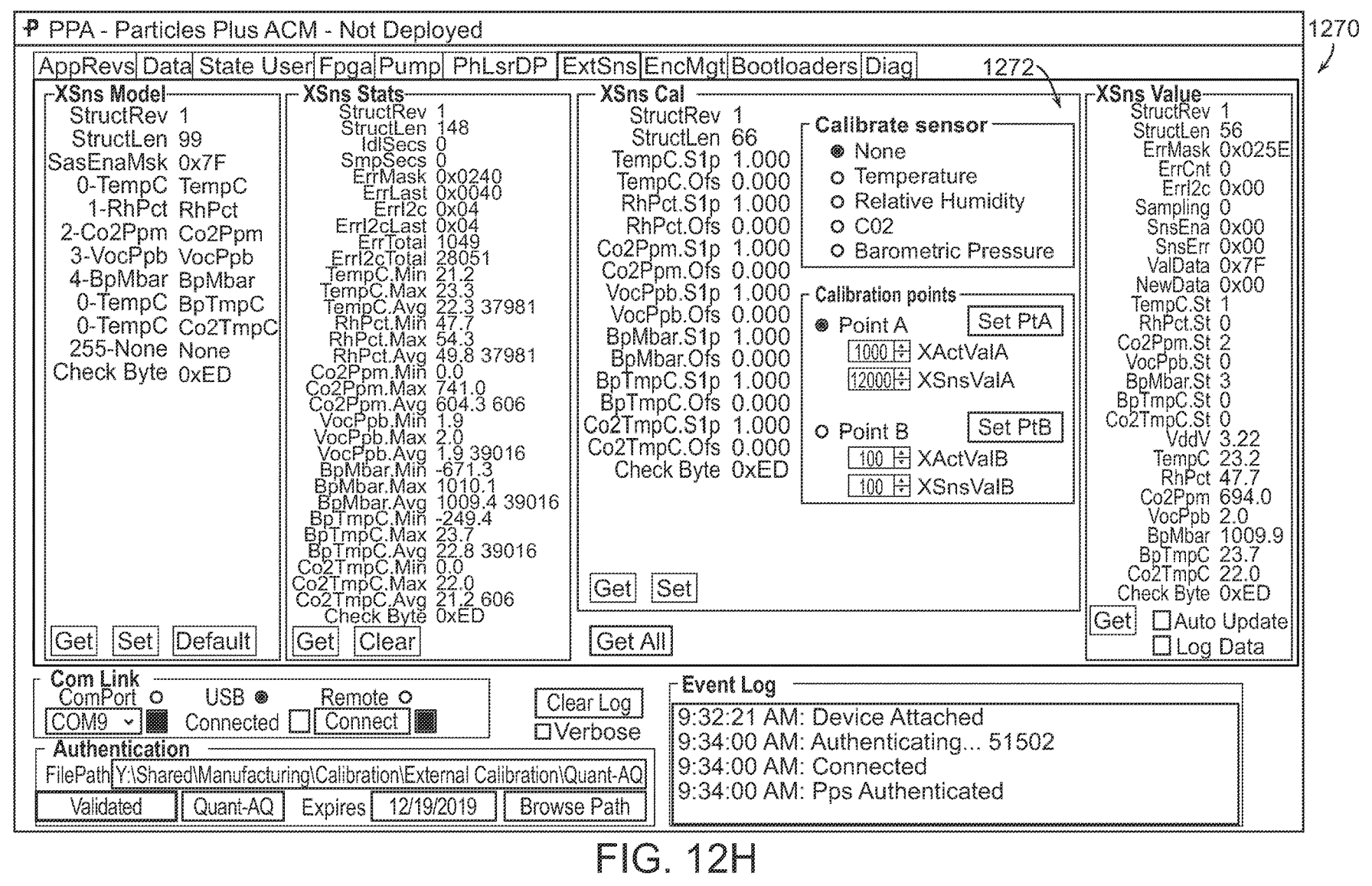

During training, the interface can be used to help with remote training since a trainer can see exactly what's going on in the instrument and can control the instrument remotely. Shown in FIG. 12A is screen shot 1200 which has a plurality of tags or icons 1202 which are selected to show operating parameters for the detector and laser light source of the particle counter. FIG. 12B shows screenshot 1210 which includes data 1212 for each channel of a 30 channel particle counter as described herein. FIG. 12C shows screenshot 1220 that includes a status 1222 or state of the real time clock calendar of an exemplary particle counter. FIG. 12D shows screenshot 1230 in which a communication interface 1232 utilizes a Modbus format that can access data for external sensors, for example. FIG. 12E shows a screen shot 1240 which can include FPGA calibration data and the sampling configuration 1242 of the particle counter. Shown in FIG. 12F is a screenshot 1250 in which graphical formats and calibration data 1252 are depicted. Illustrated in FIG. 12G is a screenshot 1260 in which laser light source and detector statistics 1262 are displayed. FIG. 12H shows a screenshot 1270 in which sensor statistics and sensor calibration data 1272 are shown.

Shown in FIG. 13 is a process flow diagram 1300 illustrating a plurality of optional operations performed in conjunction with the remote operation 1302 of one or more optical particle counters as described generally herein. Such systems are positioned in hospitals, clean rooms and rooms for clean room access where it is important to monitor and control airborne particulates. As it is desirable to limit access to such systems locally to reduce contamination of the site, maximizing remote operation of the system while maintaining full operation to monitor contamination events is critical. Systems described herein can be configured to perform a plurality of remote operations 1304 that optionally can include one or more of: a calibration operation wherein each ADC pulse value generated by the optical particle counter is added to a first-in-first-out (FIFO) circuit. The system continuously reads the FIFO during the calibration sample time and generates a graphical representation such as a histogram of the pulses using the ADC values. The data for the histogram can also be used to map a distribution of pulse heights for any selected particle size. Intermediate sizes can be interpolated or fitted to generate a mapping function; the remote controller can also transmit instruction signals to perform a remote sensor operation with one or more detectors or sensors on a particular optical particle counter; the remote controller can analyze a triggered alarm by a remotely operated particle counter that simultaneously also actuates one or more light emitters (LEDs) on the housing or optional display of the optical particle counter so that a local user can also see the status of the particle counter generating the alarm remotely; the remote controller can also retrieve statistical data from one or more remote particle counters including minimum, maximum and average value data for a plurality of operating parameters and/or sensed values stored in one or more shared memories. As described previously herein, the data stored in the one or more shared memories in each particle counter can be accessing remotely 1306 with a plurality of different communication interfaces. One of these shared memories can comprise an embedded register in a controller of each optical particle counter in the network.

Figure 14A:
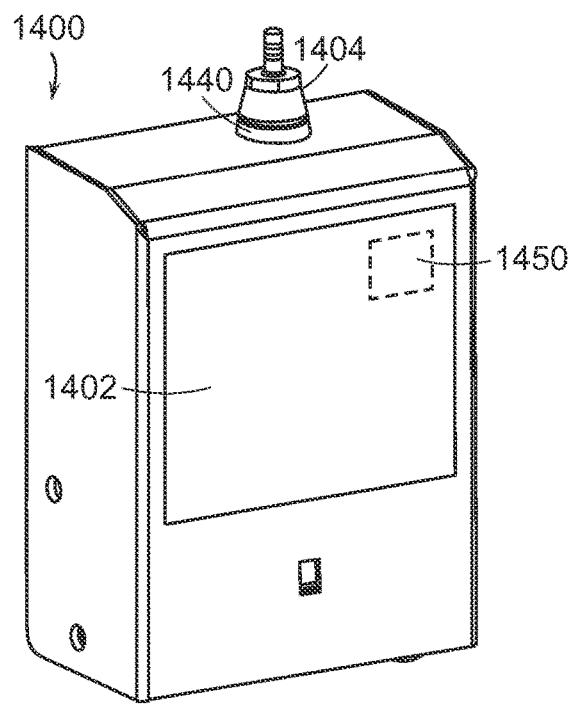
FIGS. 14A-14C illustrate housing assemblies for compact optical particle counters.
Figure 14B:
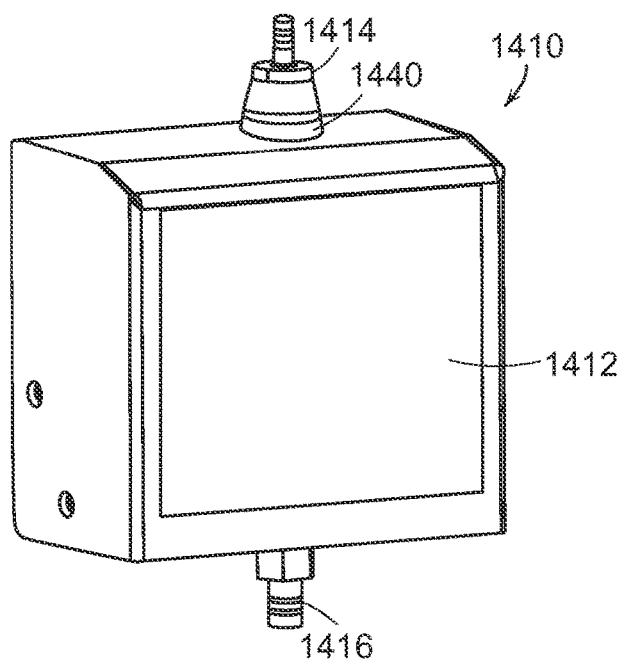
Figure 14C:
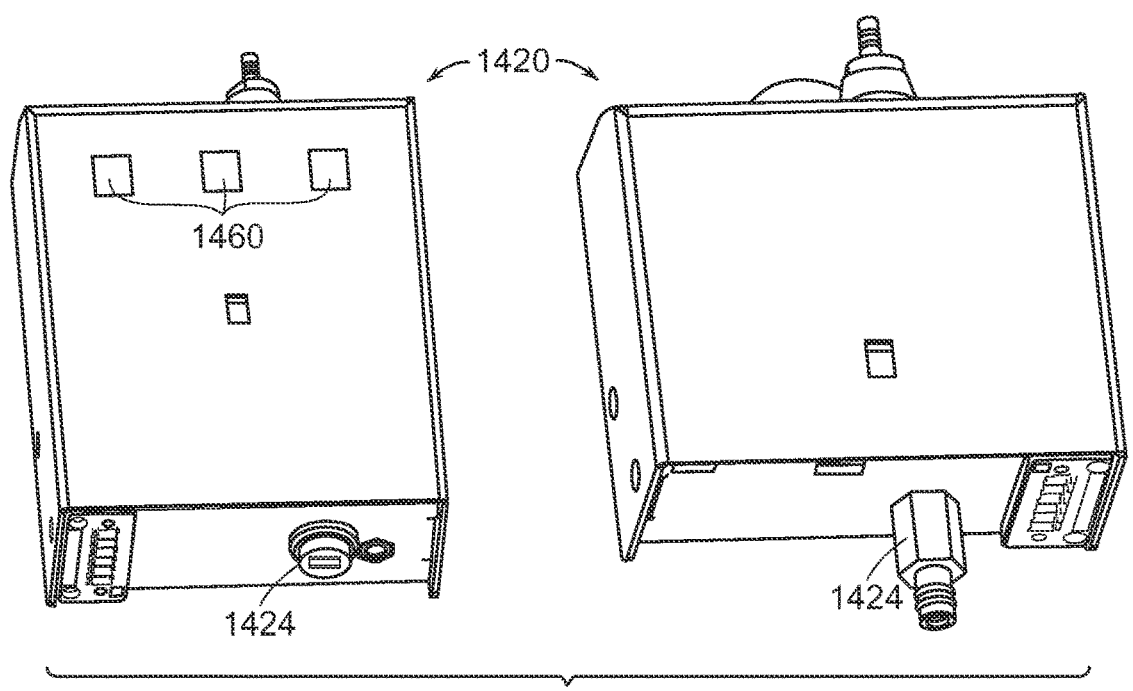

Further embodiments can include one or more light emitters to visually indicate a status condition on the housing of a remotely operated optical particle counter. The use of LED light emitters in battery operated optical particle counters to indicate a threshold alarm condition has been described in U.S. Pat. No. 9,667,990, the entire contents of which is incorporated herein by reference. This enables a local user of the system to simply verify the current status of the system without requiring the local user to electronically access the network on which the remotely operated system is functioning. As such systems are frequently operated from a remote location, local users will rarely access the network to check status. Remote operators may not monitor the status of all remotely operated systems on a frequent basis or effectively communicate with local users on a timely basis to address either faulty operation of a particle counter or a contamination event. Activation of the light emitter by the control system for a particular unit can also trigger an alarm signal to be sent using the network to both a local monitoring system (if available) and to the remote operating control unit. Exemplary housings for optical particle counter systems as described herein are shown in FIGS. 14A-14C. The example of FIG. 14A depicts a housing 1400 in which a gas flow inlet 1404 and outlet is used. This particle counter can include an onboard pump/fan or other fluid flow actuator to control air flow through the system as described herein. This system 1400 is the largest of the illustrated examples as it also includes an electronic display 1402 that can display numerous details and information regarding the state of operation and sensed data as shown and described herein including the screen images of FIGS. 12A-12H. A light emitter 1440 can be a fiber optic ring illuminator that emits to all sides of the unit and is dimensioned to be seen from a distance in the same room or can be seen through a window in a sealed room where the particle counter detects smaller amounts of airborne particulates. One, two or three LEDs (see 1158 in FIG. 11B) can be coupled to the ring illuminator so that a plurality of colors be activated in different combinations to emit a plurality of different colors. Red, green and blue LEDs can be coupled to the ring illuminator, for example, and these can be separately controlled by the on board system controller (e.g. 1151) in response to one or more detected threshold conditions. Green can indicate operating within normal limits, for example, orange or yellow can indicate that the system is operating but requires attention or maintenance, and red can indicate imminent or actual shut-off of the unit. The on board controller (106, 1151) of the optical particle counter can simultaneously transmit identical alarm or status conditions to a remote control system. The remote control station can also activate one or more emitted colors on the housing or the display to also indicate a state or condition of a particular unit. The display can have one or more regions 1450 designated to emit the same or a different color or colors to indicate an alarm or specific operational state of the unit. The optical particle counter 1410 of FIG. 14B illustrates a system that does not include the pump, fan or other flow actuator, but also includes a display 1412 and the light emitter 1440 at the inlet/outlet ports 1414, 1416 of the unit. Without the pump, for example, the unit can be smaller and weigh less than 1 pound (e.g less than about 0.5 kilograms). All the units described herein are generally less than 2 pounds (e.g. less than about 1 kilogram), however they are preferably less than 1 pound to reduce size, weight and power requirements. The units can include a handle for portable use and can be carried in one hand by a user and operated under battery power as described herein. Units such as those shown in FIG. 14B, can require a connection to an external flow actuator that can separately control air or gas flow through the unit, which can also be controlled by remote controller. FIG. 14C shows opposite sides of a single unit that does not include a display. Such a display-less unit can be used for remote operation where no local user needs a display. The housings shown in FIGS. 14A-14C can incorporate all of the optional plug-in boards of FIGS. 9A-9I except as described above. These embodiments can also employ discrete light emitters 1460 on one or more sides of the housing wall to further augment visibility of the status indicators and/or the alarms programmed into the software that operates the system. The size of a particular housing can vary from 500 cubic centimeters to 4000 cubic centimeters, but is preferably less than 2000 cubic centimeters for most applications.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and configurations depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

While various embodiments have been described above, it should be understood that they have been presented by way of example only, not limitation, and various changes in form and details may be made. Portions of the device, instrument, apparatus and/or methods described herein may be combined in combination, except mutually exclusive combinations. The aspects and embodiments described herein can include various combinations and/or sub-combinations of the functions, components and/or features of the different embodiments described.

Calibration Standard

There is currently a lack of a calibration standard for optical particle counter instrumentation for indoor and outdoor air quality and this has created significant challenges for the industry. It is largely impossible today to take instruments from multiple vendors, co-locate them and have them report similar results across varied conditions. Even more worrisome, there are few vendors that can do this with multiple units of their own instruments (at least without the use of opaque normalization algorithms in the cloud). To address this problem, embodiments of the present invention may comply with a calibration standard (hereinafter "standard") that modifies the ISO 21501-4 Calibration Standard to define a uniform calibration process so that various instruments calibrated under this modified standard report reasonably similar values under various air quality conditions. The standard provides a process specific to the calibration of optical particle counters (OPC) but does not address other types of air quality measurement sensors (e.g., photometers, nephelometers, etc.). It should be appreciated that in some circumstances, embodiments may comply with the entire standard described herein and in other circumstances embodiments may comply with only portions of the standard.

A high-level overview of the various tests and components of the standard is now provided followed by subsequent sections providing additional details.

A. Standard Overview

1) The standard provides several parameters that must be managed in real-time to ensure that an instrument is functioning correctly. These parameters include:
   a) Air flow: Volumetric air flow rate needs to be controlled during sampling, the instrument must be able to detect and report issues with flow rate.
   (b) Light intensity: Light intensity needs to be monitored during sampling, the instrument must be able to detect and report issues with light intensity.
   (c) Sampling time: Sampling time needs to be controlled during sampling, the instrument must be able to detect and report issues with sample timing.

2) During the calibration process the instrument must be able to pass the following tests:
   (a) Size channels and calibration sizes: The instrument must specify the particulate size range, which sizes are being calibrated and include these details on the calibration certificate.
   (b) Signal-to-noise: All calibrated size channels must be significantly above the noise floor to ensure the instrument is counting actual particles in that channel and not system noise.
   (c) Size resolution: All calibrated size channels must be reasonably narrow, with little or no overlap between calibration channels to ensure that particulates are being sized correctly.
   (d) Counting efficiency: Particle counts in the smallest calibrated channel must be compared against a NIST traceable reference instrument to ensure that these match reasonably well with that instrument.

The instrument needs to be reasonably accurate across a variety of particulate concentrations:
   (a) Clean-air counts: When an instrument is subjected to clean air, it needs to be able to count near zero particles across all size channels within a reasonable period and for as long as the clean air condition persists.
   (b) Response rate: When an instrument is taken from a high particle concentration environment into a much lower particle concentration environment the instrument needs to reasonably quickly adapt and report this change.
   (c) Maximum concentration: The instrument needs to report the maximum concentration it can accurately operate in.

4) Instruments must report the following information:
   (a) Calibration certificate: A calibration certificate must accompany each calibrated instrument (either a paper or electronic copy) and provide specific calibration details for the instrument.
   (b) Operational lifetime: The expected operational lifetime for the instrument must be reported. Serviceable components or consumables can be reported separately.
   (c) Calibration interval: The expected calibration interval for the instrument must be reported.
   (d) Algorithmic adjustments: Any algorithmic adjustments to the raw data collected by the instrument must be reported and the calculations for such be included or made available.

B. Standard Details

1) Air flow management:
   a) Tests must be completed on all production instruments claiming compliance,
   b) Target flow rate for the instrument needs to be specified in the calibration certificate,
   c) Actual calibration flow rate for the instrument needs to be recorded on the calibration certificate,
   d) A volumetric flow sensor used to measure and validate flow must be NIST traceable and the make, model # and serial #, sensor calibration date, must be included on the calibration certificate,
   e) Flow rate for the instrument must be maintained within +/−5% of the target flow rate whenever sampling and during the entire calibration process, and
   f) The instrument must detect and report a flow rate error in a status field and in the sample record (if data is recorded locally), if the average flow rate is outside the +/−5% during a sample or if the minimum or maximum flow rate is outside the +/−5% range for more than 3 seconds;

2) Light intensity:
   a) Tests must be completed on all production instruments claiming compliance,
   b) Light intensity for the instrument needs to be monitored during calibration and recorded on the calibration certificate (in whatever method makes sense for the instrument in question),
   c) Light intensity needs to be monitored during sampling, and
   d) The instrument must detect and report any light-intensity error in a status field and in the sample record (if data is recorded locally), if the average light-intensity is +/−10% from the calibration value;
3) Sampling time:
   a) Tests must be completed on a representative sample instrument,
   b) The minimum sample period for the instrument must be specified on the calibration certificate, and
   c) The minimum sample period must be measured and be within 1% for this specified period;
4) Size channels and calibration sizes (completed on all production instruments claiming compliance):
   a) Instrument must specify the minimum and maximum size channels on the calibration certificate,
   b) Calibration must use NIST traceable spheres for each calibration size. Details for the particulates used during the calibration must be included on the calibration certificate,
   c) One of these sizes must be smaller or equal to the minimum size channel specified for this instrument,
   d) If the user can change the size channels to intermediate values (not calibrated) the number of calibrated size channels must be adequate to accurately calculate the corresponding threshold for the user-defined size channel, and
   e) Thresholds for each calibration size must be included on the calibration certificate along with expanded uncertainty (see Appendix F),
5) Signal to noise (see Appendix A for measurement details):
   a) Tests must be completed on all production instruments claiming compliance,
   b) Signal to noise must be measured for all calibration sizes,
   c) Signal to noise for each calibrated size channels must be 2:1(1) or greater, and
   d) Signal to noise figures for all calibration size channels must be included on the calibration certificate,
6) Size resolution (see Appendix A for measurement details):
   a) Tests must be completed on all production instruments claiming compliance,
   b) Size resolution must be measured for all calibration sizes,
   c) Size resolution must be 15% or less, and
   d) Size resolution figures for all calibration size channels must be included on the calibration certificate,
7) Counting efficiency (see Appendix B for measurement details):
   a) Tests must be completed on all production instruments claiming compliance,
   b) Counting accuracy for accuracy test A must be 50%+/−20% of the reference instrument, and
   c) Counting accuracy for accuracy test B must be 100%+/−10% of the reference instrument.
8) Clean-air counts (see Appendix C for measurement details):
   a) Tests must be completed on all production instruments claiming compliance,
   b) Cumulative clean-air counts for the instrument must be <=10 counts/15 minutes,
   c) Cumulative clean-air counts for the instrument must be <=40 counts/60 minutes over 4 consecutive samples, and
   d) Any algorithmic subtraction of counts must be disclosed and described on the calibration certificate.
9) Response rate (see Appendix D for measurement details):
   a) Tests must be completed on a representative sample instrument,
   b) Response rate for the instrument must be <0.5%, and
   c) Any algorithmic adjustment of counts must be disclosed and described on the calibration certificate.
10) Maximum concentration (see Appendix E for measurement details):
    a) Tests must be completed on a representative sample instrument,
    b) Maximum concentration must be specified on the calibration certificate.

C. Calibration Certificates and Record Keeping

Histograms used for calibration and associated data that is relied on to generate the calibration certificate need to be saved to provide instrument traceability. Testing performed on a representative instrument also needs to be saved and needs to be available for review on request. The calibration certificate needs to include the following information:
   1) Instrument model # and serial number,
   2) Calibration ambient temperature and relative humidity,
   3) Date of calibration and suggested calibration due date,
   4) Calibration sizes (with signal-to-noise, size resolution and expanded uncertainty values for each),
   5) Target flow rate, calibration flow rate values and pass/fail result,
   6) Calibration light-intensity value,
   7) Counting efficiency values and pass/fail result,
   8) Clean air count values and pass/fail result,
   9) Representative instrument response rate pass/fail result,
   10) Representative instrument maximum concentration value,
   11) List of NIST traceable equipment used with model #, serial #, calibration date, calibration due date,
   12) List of particulates used with standard uncertainty, standard deviation, lot number expiration date and manufacturer,
   13) Name and signature of the person who performed the calibration,
   14) Note any algorithmic adjustments to raw data and either provide details or make such details available on request, and
   15) Provide details on conversion of particulate counts into mass estimation or make such details available on request.

APPENDIX A

Calibration Histograms

Instruments are typically calibrated with multiple NIST traceable sized particulate, typically polystyrene spheres. These spheres are nebulized and mixed with clean-air in order to provide a stream of particulates through the instrument being calibrated. As each particulate passes through the light beam within the instrument it will create a corresponding light pulse which will be converted by a detector and associated electronics into a voltage pulse within the instrument. In a well-designed instrument, the height of that pulse is tightly correlated with the size of the particulate that created that pulse.

To calibrate a particular size channel, the particles are streamed through the instrument and each of the pulse heights captured (either locally on the instrument if the hardware supports that) or via an external pulse-height-analyzer (PHA) if not. Each of these pulses are binned by height to create a histogram for the region of interest. The histogram can be a generally bell-shaped curve showing the number of particles for each bin size during a time period. Once a sufficient number of these particles have been recorded the histogram is displayed and a variety of metrics are used to determine the various parameters required for calibration.

For example, for a histogram for 0.3 um particles on a production instrument the horizontal axis may represent the histograms bins (with the shorter pulses on the left and taller pulses on the right). The histogram units can vary, for example, being shown as ADC counts or as voltage. The vertical axis may show the number of counts (pulses seen of that height) in each bin. A bump centered around 2000 may represent a noise floor on the instrument, and there would be an enormous number of counts to the left of this if pulses smaller than a cutoff value (on the left of this bump) were allowed to be processed. Note, however that in the case of the smallest size channel that noise counts must be present on the left side of the histogram in order to compute signal-to-noise.

To setup the cursors used for calibrating a histogram, a user may set the beginning cursor (bc) in the bottom of the valley between a noise peak on the left (~2000) and a calibration peak on the right (~3500). Then the ending cursor (ec) may be set on the right of the calibration peak at a count value roughly equivalent to the count value of the beginning cursor. The particle size threshold (st) cursor is placed on the median bin (in bin counts) between the bc and ec cursors. The two size resolution cursors (sl, sh) are set on the bins to the right and left of the size threshold (st) cursor so that they are on the first bin that has ~61% of the counts of the st cursor. The histogram data can be smoothed (averaged) to provide for a less choppy performance when setting the cursors, though all measurements need to be derived from one setup (smoothed or not).

Size threshold: The threshold for this particular size calibration is simply the st cursor (the median position in the histogram distribution). This is the value that is used within the instrument when processing particulates. If a channel of this size is setup on the instrument during normal operation then all particulates with a signal above this threshold would get counted in that size channel.

Signal-to-noise calculation: To calculate signal-to-noise take the counts for the st cursor bin and divide them by the counts for the bc cursor bin. So, in the case where the threshold counts are ~50 and the beginning cursor are ~2 this would yield a signal-to-noise ratio of ~25:1.

Size resolution: To calculate size resolution the characteristic calibration curve for the instrument being calibrated is required. Once the sl and sh cursors have been placed (see above) then the corresponding sizes (in microns) for these cursors are calculated using that characteristic curve. Once the sizes have been obtained, then the size that is the furthest from the threshold size (which is the calibration particle size) is used to compute size resolution. In the example above the sl cursor on the left side of the st cursor is further from it then the sh cursor so it would be used in this calculation. To calculate size resolution take the delta in particulate size between these cursors and divide it by the st size. If the sl cursor corresponded to a particle size of 0.29 um and the st size was 0.3 um (the size of calibration particles used) then the size resolution would be (0.3 um-0.29 um)/0.3 um or ~3.3%.

APPENDIX B

Counting Efficiency

Below are steps for measuring the instrument's counting efficiency:
1) The test is run with two particle sizes:
   a) one near the minimum detectable size for the instrument,
   b) the other 1.5-2.0 times that size,
2) Setup a NIST traceable reference instrument (calibrated to ISO 21501-4) with a minimum size detection at least 30% lower than the minimum detectable size for the unit under test,
3) Set the particle rate for the calibration particles at less than 25% of the maximum concentration rate for BOTH the reference and unit under test. Connect both instruments to this air stream via Y-tubing (less than 1 meter for each leg and roughly equivalent in length for the instrument legs),
4) Setup the smaller calibration particles at the flow rate described above and take 1-minute samples on both instruments,
   a) Record the cumulative counts for the reference (on a size channel<=30% below the particle size) as RefACnts and the cumulative counts on the smallest detectable size for the instrument under test as UutACnts,
   b) The test A value is UutACnts/RefACnts expressed as a percentage,
5) Setup the larger calibration particles at the flow rate described above and take 1-minute samples on both instruments,
   a) Record the cumulative counts for the reference (on the same size channel as above) as RefBCnts and the cumulative counts on the same size channel as above for the instrument under test as UutBCnts,
   b) The test B value is UutBCnts/RefBCnts expressed as a percentage.

APPENDIX C

Clean-Air Counts

Below are the steps for measuring the instrument's clean-air counts.
1) Ensure all the calibration size channels have been calibrated on the instrument,
2) Ensure clean-air is being supplied to the instrument,
3) Sample air on the instrument until it purges itself and the counts on all size channels near zero,
4) Setup the instrument for 15 minute samples, and
5) Sample until the cumulative counts from all size channels on the instrument are less than or equal to 10 counts/sample for at least 4 consecutive samples.

APPENDIX D

Response Rate

Below are the steps for measuring the instrument's response rate.
1) Create an environment with at least half the specified maximum particle concentration rate for the instrument,
2) Sample the air from this environment for at least 10 minutes taking 1-minute samples,
3) Record the last 1-minute sample for the minimum size channel of the instrument as MaxCnts,
4) Switch the instrument over to sample clean air and sample for 10 seconds to purge the instrument,
5) After the purge, immediately take a 1-minute sample,
6) Record the 1 minute sample for the minimum size channel for the instrument as CleanCnts, and
7) Response rate is equal to CleanCnts/MaxCnts (and expressed as a percentage)

APPENDIX E

Maximum Concentration

Below are the steps for measuring the instrument's maximum particle concentration.
1) This test is run with particles near the smallest detection size for the instrument,
2) Setup an environment where the particle rate of these calibration particles can be varied,
3) Use a NIST traceable instrument calibrated to ISO 21501-4 which has been validated at a maximum concentration at least 150% above the instrument under test maximum concentration limit,
4) Connect both instruments to the environment via Y-tubing (less than 1 meter for each leg and roughly equivalent in length for the instrument legs),
5) Start sampling on both instruments and setup to record the cumulative counts on the smallest size channel on the instrument under test and the same size channel on the reference instrument.
6) Take successive samples increasing the particle rate over time, and
7) The particle counts for the instruments should track reasonably closely over time until the instrument under test starts to read at 10% less than the reference instrument. Record the particle concentration on the reference instrument where this 10% deviation occurs as the maximum concentration.

APPENDIX F

Expanded Uncertainty

Below are the steps for calculating the expanded uncertainty for each calibration size channel.
1) Start with the standard uncertainty for each component and take the square of each percentage,
2) Add these squares up into a sum and then take the square root of that sum to arrive at the combined standard uncertainty,
3) Multiply the combined standard uncertainty by the K-factor (2 for this standard) to arrive at the expanded uncertainty for that size channel, For calibrations that use an external PHA, add in the tolerances for the external equipment in addition to the particulates and internal calibration curve tolerances.

With external Pulse Height Analyzer (PHA):

| Uncertainty Factor | Standard Uncertainty % | Standard Uncertainty $\%^2$ |
|---|---|---|
| Polystyrene Latex Spheres (PSL) | 2.5 | 6.25 |
| Pulse Height Analyzer (PHA) | 2.5 | 6.25 |
| Voltmeter | 0.1 | 0.01 |
| Offset Voltage | 0.5 | 0.25 |
| Calibration Curve | 1.5 | 2.25 |

Standard Uncertainty (Sum): 15.01
Combined standard Uncertainty (Square Root): 3.87
Expanded Uncertainty (K-Factor = 2): 7.75

With internal Pulse Height Analyzer (PHA):

| Uncertainty Factor | Standard Uncertainty % | Standard Uncertainty % |
|---|---|---|
| Polystyrene Latex Spheres (PSL) | 2.5 | 6.25 |
| Calibration Curve | 1.5 | 2.25 |

Standard Uncertainty (Sum): 8.5
Combined standard Uncertainty (Square Root): 2.92
Expanded Uncertainty (K-Factor = 2): 5.83

We claim:

1. A compact optical particle counter comprising:
a housing that contains a controller, a light source, a light detector, and a flow channel manifold to move a particle flow through a beam of light, wherein the flow channel manifold includes a Venturi used with a flow actuator to control a flow rate of the particle flow, wherein the controller is connected to a memory and a communication port connected to a communication network, and wherein the controller operates a communication interface that transmits operational state data for the optical particle counter regarding an operational mode to an external computing device;
a signal processing circuit to process detected signals above a threshold for at least one output channel, an analog to digital converter that converts analog signals above the threshold to digital signals to generate particle count data;
and
a core module circuit board assembly on which the signal processing circuit and the controller are mounted, the core module circuit board assembly further comprising at least one connector to electrically connect the controller to an attachable circuit board, wherein the attachable circuit board is an option board configured to control at least one of a power level and a sampling parameter of the optical particle counter.

2. The particle counter of claim 1 wherein the manifold further comprises an output for the Venturi that is connected to an input to a sensor chamber wherein the light beam traverses the sensor chamber and the flow actuator comprises a pump, the manifold further including a connector that directly connects the Venturi to a filter at a pump entry and a flow sensor.

3. The particle counter of claim 1 wherein the signal processing circuit further comprises:
a field programmable gate array (FPGA) or an application specific integrated circuit (ASIC) connected to the controller such that the FPGA or ASIC controls setting of pulse thresholds for an analog front end signal processing circuit.

4. The particle counter of claim 1 wherein the signal processing circuit further comprises a field programmable gate array (FPGA) connected to the controller such that the FPGA controls setting of pulse thresholds with one or more pulse width modulators (PWM).

5. The particle counter of claim 1 wherein an FPGA is mounted to the core module circuit board on which the controller, an analog front end circuit, an analog to digital converter and a power control circuit are mounted.

6. The particle counter of claim 5 wherein the FPGA includes a plurality of registers including a user register for a user to configure the particle counter for a particle counting operation.

7. The particle counter of claim 6 wherein the plurality of registers includes one or more of a sampling register to start and/or stop a sampling operation of an airflow through an airflow path within the housing, a calibration register to calibrate the particle counter, a configuration register to configure one or more circuit configurations of the particle counter, and/or a diagnostic register to monitor the particle counter or diagnose a condition of the particle counter.

8. The particle counter of claim 1 wherein the attachable circuit board comprises a display and a battery mounted in the housing.

9. The particle counter of claim 1 wherein the attachable circuit board comprises a universal serial bus (USB) connection.

10. The particle counter of claim 1 wherein the attachable circuit board comprises an environmental sensor.

11. The particle counter of claim 1 wherein the attachable circuit board further comprises an Ethernet connector.

12. The particle counter of claim 1 wherein the attachable circuit board comprises a power over Ethernet connector.

13. The particle counter of claim 1 wherein the attachable circuit board further comprises a touchscreen display, a power supply and a display controller.

14. The particle counter of claim 1 wherein the attachable circuit board further comprises a wireless transceiver.

15. The particle counter of claim 1 further comprising a light source circuit board on which the light source is mounted with a light detector and a light source controller and a real time clock calendar connected to the controller.

16. The particle counter of claim 1 wherein the housing has a volume of less than 2000 cubic centimeters such that the particle counter has a weight of less than 460 grams.

17. The particle counter of claim 1 wherein the particle counter has a weight of less than 910 grams.

18. A method of operating a particle counter comprising:
connecting a circuit module to a connector on an optical particle counter base unit, the optical particle counter base unit including an airflow inlet, an airflow outlet and an airflow path through a housing including a Venturi, and controller that controls a pulse threshold circuit to process analog signals received from a light detector, the controller being connected to a light source controller for a light source that emits light through the airflow path, wherein the Venturi is used with a flow actuator to control a flow rate of airflow in the airflow path; and
communicating with an external device with at least one of a plurality of communication channels connected to the controller, the controller being connected to the circuit module to control a circuit module operation.

19. The method of claim 18, further comprising:
selecting the circuit module from a plurality of circuit modules that are connectable to the connector wherein the base unit includes a field programmable gate array (FPGA) or application specific integrated circuit (ASIC) connected to the controller.

20. The method of claim 18, further comprising:
using a pump in the base unit to control air flow through the housing.

21. The method of claim 18, further comprising:
selecting a switch in the base unit to select between communication interfaces.

22. The method of claim 21 wherein the communication interface selectable by the switch is one of an isolated RS-485 interface, UART interface or controls a Modbus used to control and monitor the particle counter, wherein the Modbus is a Modbus RTU or Modbus ASCII.

23. The method of claim 18 further comprising an analog front end connected to the detector and an analog to digital converter and wherein particle counting is implemented on the controller and a flow sensor connected to the controller senses a particle flow to provide closed loop pump control of an airflow rate through the manifold.

24. The method of claim 18 wherein the particle counter includes one, two, three or four particle channels, has a volume of less than 2000 cubic cm and a weight of less than 910 grams.

25. The method of claim 24 wherein a particle size range of the particle channels is fixed during particle operation and is changeable only during calibration.

26. The method of claim 18, further comprising:
communicating with an external system that provides data storage.

27. The method of claim 18 further comprising programming the particle counter to control particle counting operations with an internal clock and controlling operations of the particle counter with a clock calendar mounted on a printed circuit board with the controller and an analog front end circuit that applies thresholds to detected signals from the light detector.

28. The method of claim 18, further comprising:
configuring a server to transmit a plurality of operating parameters to the optical particle counter.

29. The method of claim 18, further comprising:
configuring an external computing device to select an alarm indicator state for each of a plurality of operational states of the device.

* * * * *